US008654245B2

(12) United States Patent
Takahata et al.

(10) Patent No.: US 8,654,245 B2
(45) Date of Patent: Feb. 18, 2014

(54) IMAGING DEVICE

(75) Inventors: Junji Takahata, Osaka (JP); Takahiro Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 191 days.

(21) Appl. No.: 13/361,968

(22) Filed: Jan. 31, 2012

(65) Prior Publication Data
US 2012/0249861 A1 Oct. 4, 2012

(30) Foreign Application Priority Data

Mar. 28, 2011 (JP) ................................. 2011-070013
Jun. 17, 2011 (JP) ................................. 2011-135305

(51) Int. Cl.
*G03B 7/00* (2006.01)
*H04N 5/225* (2006.01)

(52) U.S. Cl.
USPC ........................................................ 348/362

(58) Field of Classification Search
USPC ........................................................ 348/362
See application file for complete search history.

(56) References Cited

U.S. PATENT DOCUMENTS

| 4,864,336 | A | 9/1989 | Fukahori et al. |
| 6,749,348 | B2 | 6/2004 | Seita |
| 7,458,738 | B2 | 12/2008 | Tomatsu |
| 7,980,772 | B2 | 7/2011 | Tanaka et al. |
| 2005/0110897 | A1 | 5/2005 | Wakabayashi |
| 2009/0028545 | A1 | 1/2009 | Sakai et al. |
| 2010/0077893 | A1 | 4/2010 | Kato et al. |
| 2010/0321556 | A1 | 12/2010 | Misawa |

FOREIGN PATENT DOCUMENTS

| JP | H2-131735 U | 11/1990 |
| JP | H4-274418 A | 9/1992 |
| JP | S63-169627 A | 7/1998 |
| JP | H11-95083 A | 4/1999 |
| JP | 2004-61865 A | 2/2004 |
| JP | 2009-88825 A | 4/2009 |
| JP | 2010-82743 A | 4/2010 |
| JP | 2010-107635 A | 5/2010 |

OTHER PUBLICATIONS

Nakai, "Imaging Device" filed on Jan. 31, 2012, co-pending U.S. Appl. No. 13/361,959.

*Primary Examiner* — Roberto Velez
*Assistant Examiner* — Stephen Coleman
(74) *Attorney, Agent, or Firm* — Shinjyu Global IP

(57) ABSTRACT

An imaging device includes an imaging element, a shutter mechanism, an actuator, a rotatable transmission member, a position detector, and a drive controller. The shutter mechanism is switchable between an open and a closed state to control the light incident on the imaging element. The transmission member is configured to transmit a driving force produced by the actuator to the shutter mechanism. The position detector is configured to detect the rotational position of the transmission member. The drive controller is configured to direct the actuator to begin storing the driving force while image data is being read from the imaging element, to control the timing at which the actuator begins driving the shutter mechanism based on the position of the transmission member detected by the position detector, and to switch the shutter mechanism from the closed state to the open state after the actuator has stopped storing the driving force.

12 Claims, 42 Drawing Sheets

Travel completed

Charging in progress

Charging completed travel preparation completed

IMAGING DEVICE

CROSS-REFERENCE TO RELATED APPLICATIONS

This application claims priority under 35 U.S.C. §119 to Japanese Patent Application No. 2011-70013, filed on Mar. 28, 2011 and Japanese Patent Application No. 2011-135305, filed on Jun. 17, 2011. The entire disclosure of Japanese Patent Application No. 2011-70013 and Japanese Patent Application No. 2011-135305 are hereby incorporated herein by reference.

BACKGROUND

1. Technical Field

The technology disclosed herein relates to an imaging device having a shutter device.

2. Background Information

A shutter device for adjusting the exposure of an imaging element is installed in an imaging device. The imaging element converts light into an electrical charge, so light that would be incident on the imaging element must be blocked off while the electrical change is being read as image data from the imaging element. Therefore, light that would be incident on the imaging element is usually blocked by a shutter device while image data is being read from the imaging element.

Meanwhile, most imaging devices employ a live-view function in which a real-time image of the subject is displayed on a display component. In live view, light must be incident on the imaging device, so the shutter device must be kept in an open state.

However, with the normally-closed type of shutter device that is generally used, the electricity must be sent to an electromagnet to hold the shutter curtain in the open position in order to maintain the open state of the shutter device. The longer electricity is sent to the electromagnet, the more power consumption rises, so employing a normally-closed type of shutter device in an imaging device having a live-view function is undesirable from the standpoint of power consumption.

In view of this, a normally-open type of shutter device has been proposed that takes the live-view function into account (see, for example, Japanese Laid-Open Patent Application 2004-061865).

SUMMARY

With an imaging device equipped with a normally-open type of shutter device, the closed state of the shutter device is maintained while image data is being read. Once the reading of the image data is complete, the shutter device switches to its open state to provide a live-view display. Since an open state is maintained mechanically with a normally-open type of shutter device, the power consumption of the shutter device does not increase no matter how long the live view is continued.

Meanwhile, it has been proposed that charging be performed while maintaining the closed state of a shutter device during the reading of image data, for the purpose of speeding up the start of live view or raising the speed in continuous capturing. In this case, since the shutter device can be charged during the reading of image data, the shutter device can be switched to the open state soon after the completion of the reading of the image data. Therefore, it takes less time to start live view after the completion of the reading of image data, and also takes less time until the next imaging. Similarly, the imaging interval can be shortened in the case of continuous capturing.

However, it has been discovered that the drive members such as gears or cams that are installed in a shutter device tend, for various reasons, not to stop at the same position every time. For example, the output of the actuator used for charging tends to fluctuate with the ambient temperature. If the output of the actuator fluctuates, when the actuator is stopped the drive members may move too far due to inertia, or the drive members may stop short of their intended position. If the stopping position of drive members fluctuates, then even if charging is started at the same timing, the timing at which the charging ends or the timing at which the shutter device leaves its closed state may deviate from what was intended. If this happens, the shutter device may leave its closed state prior to the completion of the reading of the image data, and there is the risk of diminished stability in image data read-out.

One object of the technology disclosed herein is to provide an imaging device in which the reading of image data can be kept stable while the imaging interval is shortened.

In accordance with one aspect of the technology disclosed herein, an imaging device is provided that includes an imaging element, a shutter mechanism, an actuator, a transmission member, a position detector, and a drive controller. The imaging element is configured to produce image data of a subject by opto-electrical conversion. The shutter mechanism is switchable between an open state and a closed state to control the light incident on the imaging element. The actuator is configured to produce and store a driving force. The transmission member is configured to transmit the driving force produced by the actuator to the shutter mechanism. The position detector is configured to detect the rotational position of the transmission member. The drive controller is configured to direct the actuator to begin storing the driving force while image data is being read from the imaging element, to control the timing at which the actuator begins driving the shutter mechanism based on the position of the transmission member detected by the position detector, and to switch the shutter mechanism from the closed state to the open state after the actuator has stopped storing the driving force.

These and other objects, features, aspects and advantages of the present invention will become apparent to those skilled in the art from the following detailed description, which, taken in conjunction with the annexed drawings, discloses example embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1: Digital Camera 1

A digital camera 1 will be described through reference to the drawings.

Figure 1:
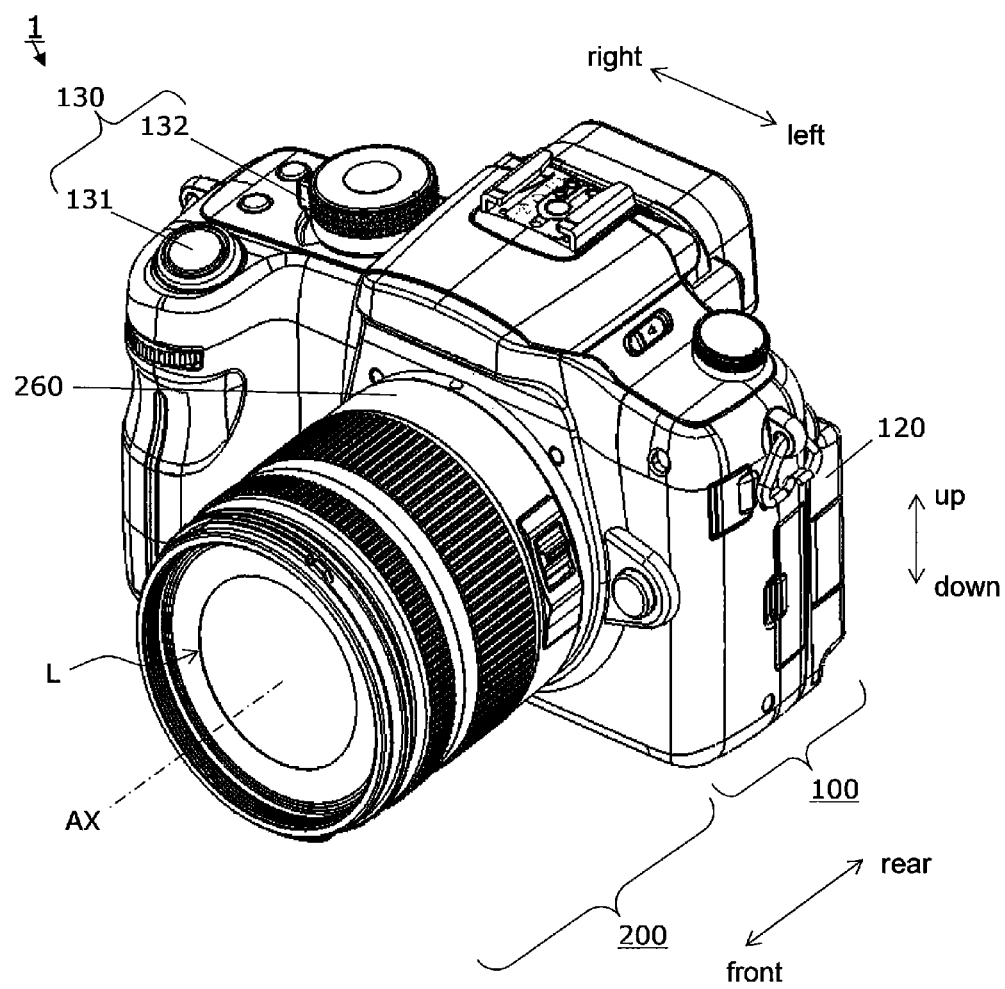
FIG. 1 is an oblique view of a digital camera 1.

As shown in FIG. 1, in the following description, using the digital camera 1 in its normal orientation (hereinafter referred to as landscape orientation) as a reference, the direction facing the subject will be referred to as "to the front," the direction facing away from the subject as "to the rear," the vertically upward direction as "upward," the vertically downward direction as "downward," to the right when facing the subject as "to the right," and to the left when facing the subject as "to the left." The optical axis AX of an interchangeable lens unit 200 is disposed substantially parallel to the longitudinal direction.

Similarly, "front," "rear," "top," "bottom," "right," and "left" use as a reference a digital camera in landscape orientation and facing a subject straight on. The term "landscape orientation" here refers to the orientation of the digital camera 1 when the long-side direction of a rectangular image that is wider than it is tall substantially coincides with the horizontal direction in the image.

These terms are not intended to limit the layout of the various constituent elements of the digital camera 1 or the orientation in which the digital camera 1 pertaining to this embodiment is used.

As shown in FIG. 1, the digital camera 1 (one example of an imaging device) is an interchangeable lens type of digital camera, and comprises a camera body 100 and an interchangeable lens unit 200 that can be mounted to the camera body 100.

2: Camera Body 100

Figure 2:
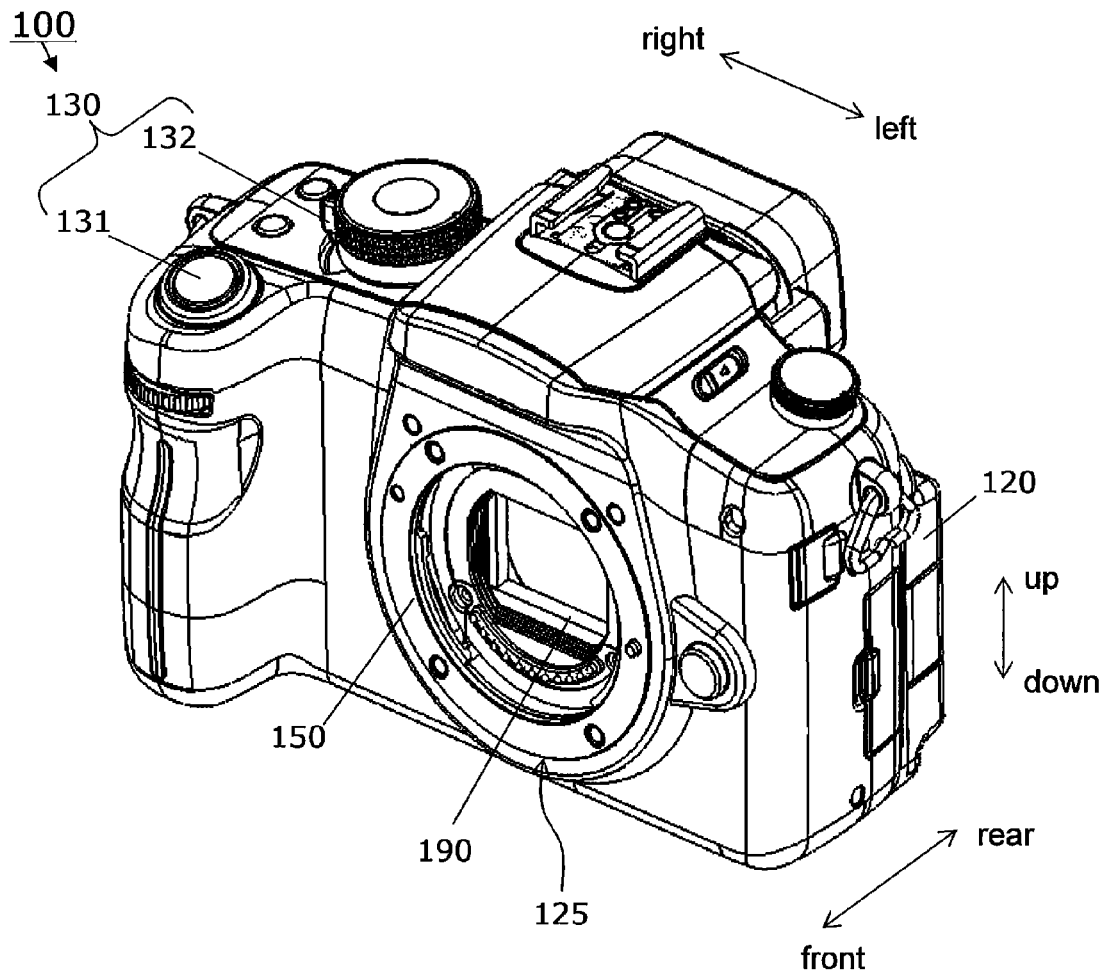
FIG. 2 is an oblique view of a camera body 100.
Figure 4:
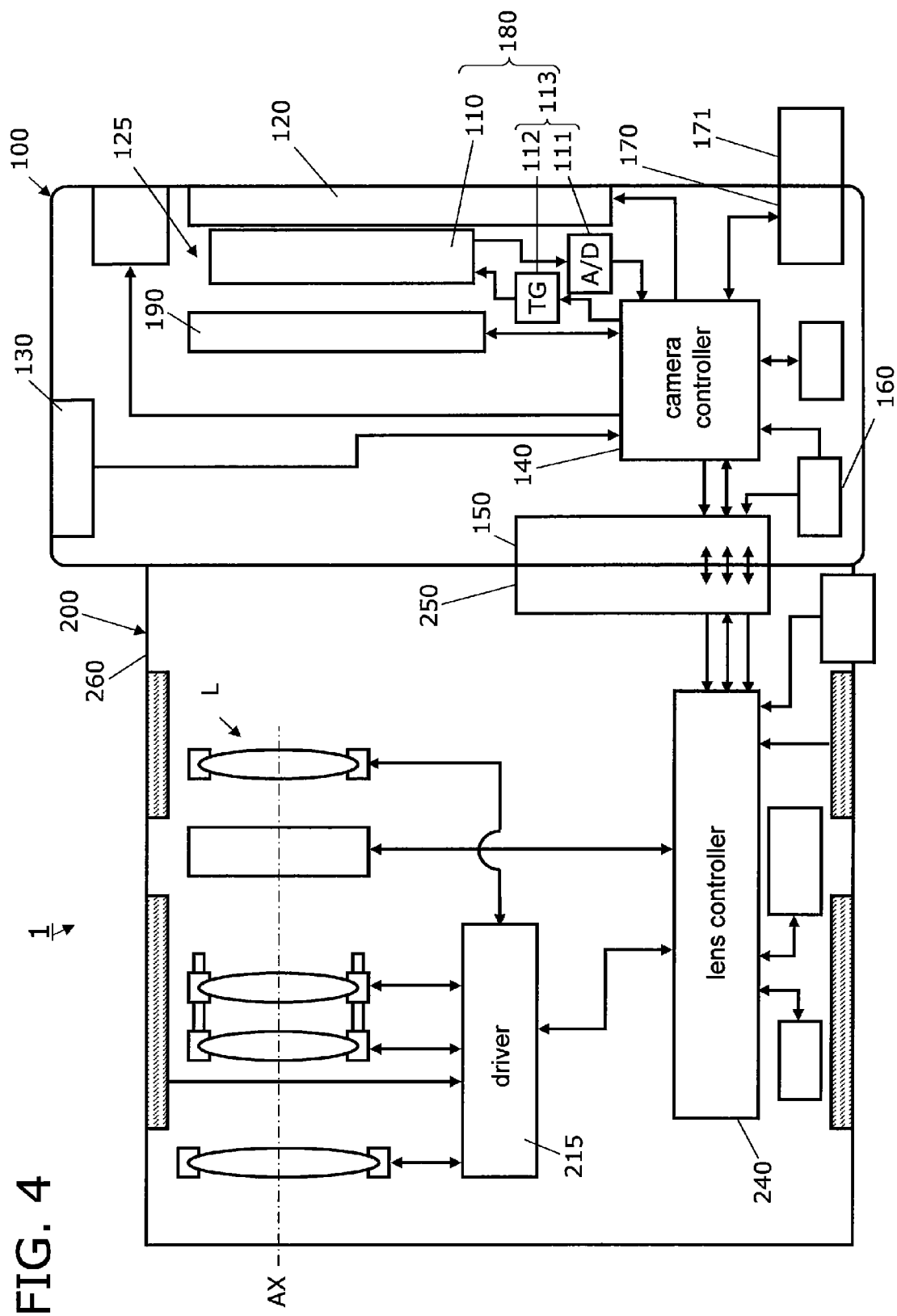
FIG. 4 is a block diagram of the digital camera 1.

As shown in FIG. 2, the camera body 100 (another example of an imaging device) comprises an imaging unit 125 (an example of an imaging unit), a camera monitor 120, and a manipulation component 130. As shown in FIG. 4, the camera body 100 further comprises a camera controller 140 (an example of a drive controller), a power supply 160, and a card slot 170.

2.1: Imaging Unit 125

Figure 5:
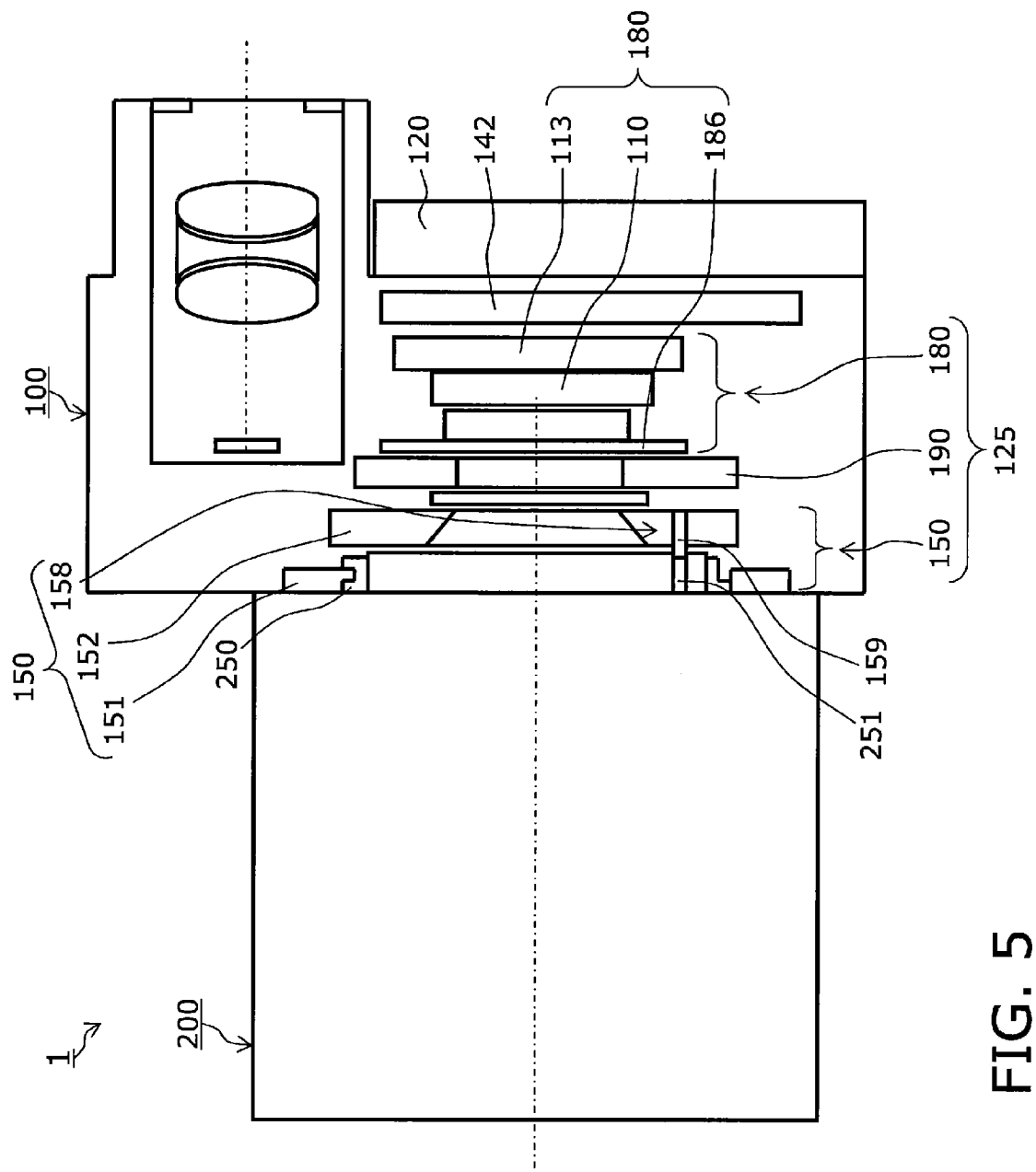
FIG. 5 is a simplified cross section of the digital camera 1.

As shown in FIG. 5, the imaging unit 125 has a mount unit 150 (an example of a mount unit), an imaging element unit 180 (an example of an imaging unit), and a focal plane shutter device 190 (an example of a shutter device). The mount unit 150, the focal plane shutter device 190, and the imaging element unit 180 are disposed in that order starting from the subject side. A lens mount 250 of the interchangeable lens unit 200 can be mounted to the mount unit 150. The imaging element unit 180 and the focal plane shutter device 190 are mounted to the mount unit 150. The focal plane shutter device 190 adjusts the amount of light incident on the imaging element unit 180. The focal plane shutter device 190 is disposed on the subject side of the imaging element unit 180, and is disposed between the mount unit 150 and the imaging element unit 180.

The digital camera 1 is what is known as a mirror-less single-lens camera, which has no quick return mirror between the mount unit 150 and the imaging element unit 180.

As shown in FIGS. 5 to 9, the mount unit 150 has a body mount 151, a contact unit 158, and a mount base 152. The lens mount 250 of the interchangeable lens unit 200 can be bayonet-coupled to the body mount 151. The body mount 151 is fixed to the mount base 152. The mount base 152 is fixed to the main frame (not shown) of the camera body 100. When the interchangeable lens unit 200 has been mounted to the body mount 151, the interchangeable lens unit 200 is supported by the mount unit 150.

Figure 6:
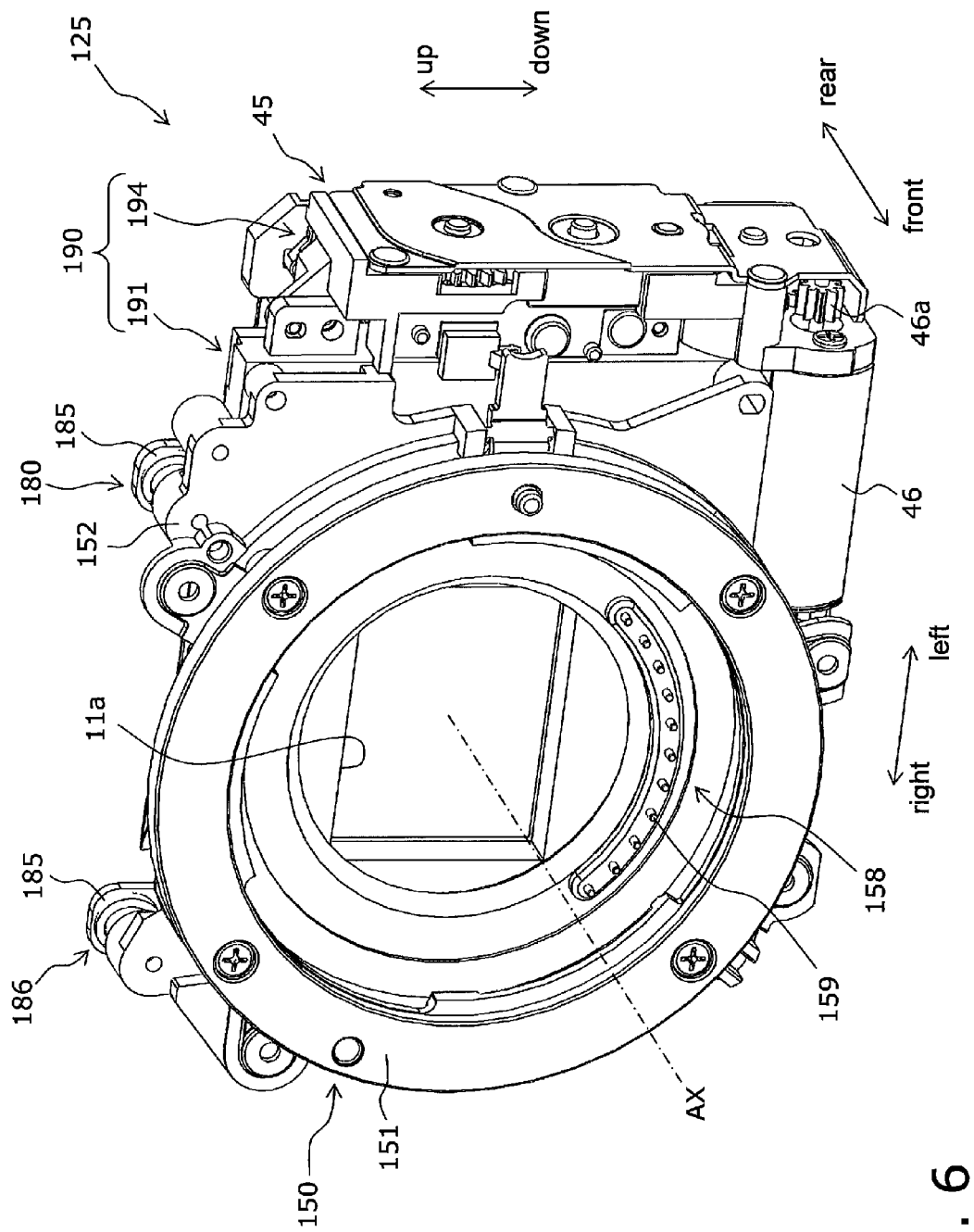
FIG. 6 is an oblique view of an imaging unit 125.

As shown in FIG. 6, for example, the contact unit 158 has a plurality of contact points 159, and is fixed to the mount base 152. When the lens mount 250 has been mounted to the mount unit 150, the camera body 100 and the interchangeable lens unit 200 are electrically connected. More specifically, as shown in FIG. 5, when the lens mount 250 has been mounted to the mount unit 150, the contact points 159 of the contact unit 158 are in contact with contact points 251 of the interchangeable lens unit 200. Therefore, the camera body 100 can send and receive data and/or control signals to and from the interchangeable lens unit 200 via the contact unit 158.

As shown in FIG. 6, the body mount 151, the contact unit 158, and the mount base 152 each have an opening, and light is incident on the focal plane shutter device 190 and the imaging element unit 180 through these openings.

As shown in FIG. 5, the imaging element unit 180 has a CMOS (complementary metal oxide semiconductor) image sensor 110, a CMOS circuit board 113, and a heat radiating plate 186.

The CMOS image sensor 110 (one example of an imaging element) produces image data by opto-electrical conversion of an optical image of a subject formed by the interchangeable lens unit 200 (hereinafter also referred to as a subject image). Image data for a subject is produced by reading the charges stored by the various opto-electrical conversion elements of the CMOS image sensor 110. As shown in FIG. 4, the image data read from the CMOS image sensor 110 is digitized by an A/D converter 111 of the CMOS circuit board 113. The image data digitized by the A/D converter 111 is subjected to various kinds of image processing by the camera controller 140. Examples of the "various kinds of image processing" referred to here include gamma correction processing, white balance correction processing, scratch correction processing, YC conversion processing, electronic zoom processing, and JPEG compression processing.

The CMOS image sensor 110 operates on the basis of timing signals produced by a timing generator 112 of the CMOS circuit board 113. The CMOS image sensor 110 can acquire still and moving picture data by controlling the CMOS circuit board 113. The acquired moving picture data is also used for display of a through-image.

A "through-image" here is an image out of the moving picture data that is not recorded to a memory card 171, and means a real-time image of a subject in live-view display. A through-image is mainly a moving picture, and is display in real time on the camera monitor 120 to decide on the field angle of a moving or still picture.

The CMOS image sensor 110 is able to acquire a low-resolution moving picture used as a through-image, and to acquire a high-resolution moving picture used for recording. An HD-size (high definition size: 1920×1080 pixels) moving picture is one of a moving picture of high resolution.

The CMOS circuit board 113 controls the CMOS image sensor 110. The CMOS circuit board 113 is a circuit board that subjects the image data outputted from the CMOS image sensor 110 to specific processing, and as shown in FIG. 4, includes the timing generator 112 and the A/D converter 111. The CMOS circuit board 113 is included in the drive controller that controls the imaging element.

Figure 9:
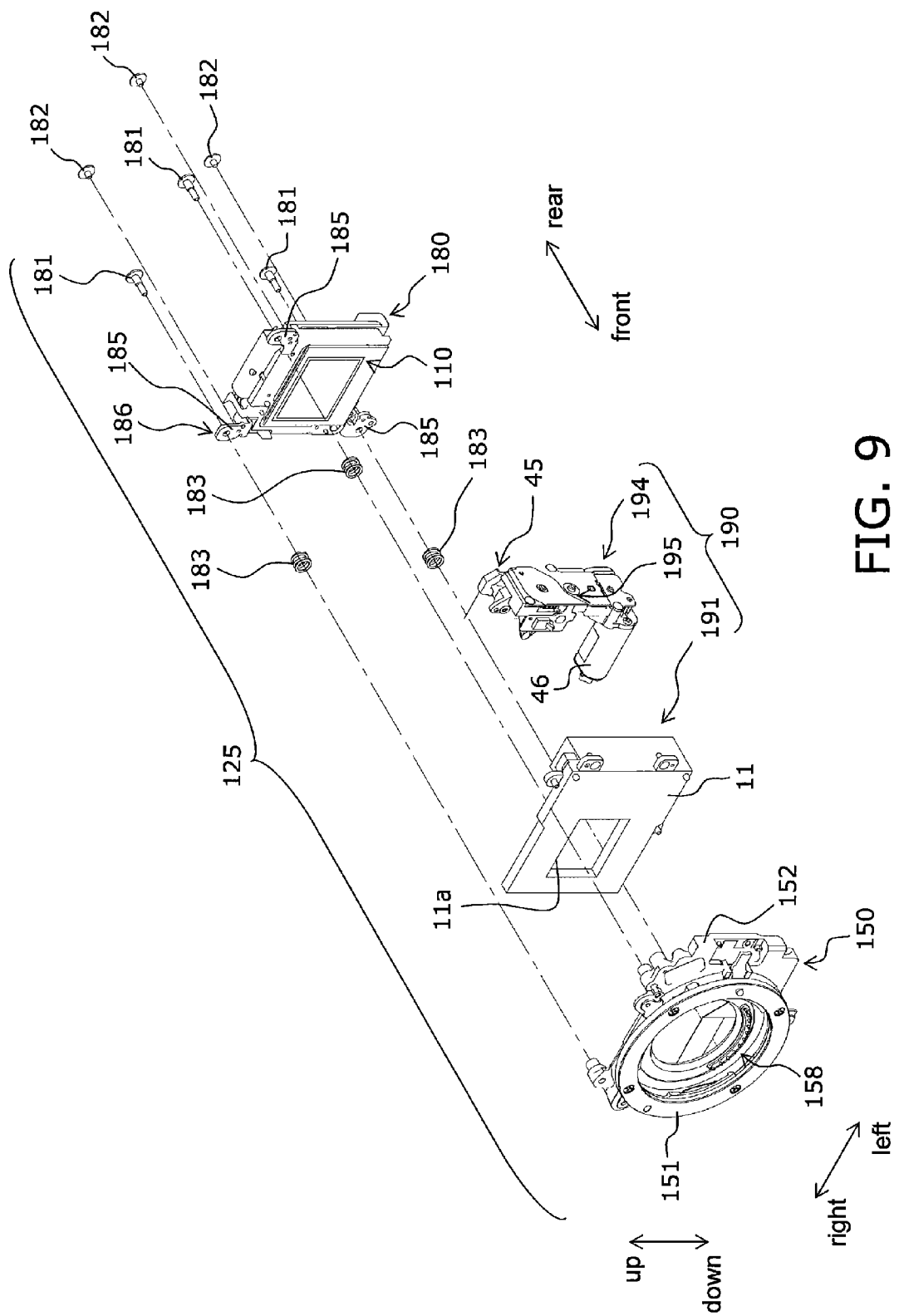
FIG. 9 is an exploded oblique view of the imaging unit 125.

The heat radiating plate 186 shown in FIG. 9 (an example of a plate member) is provided to allow the escape of heat generated from the CMOS image sensor 110, and is connected to the CMOS image sensor 110. More precisely, the heat radiating plate 186 is mounted to the mount unit 150, and is disposed with a gap between itself and the mount unit 150 (see, for example, FIGS. 11A and 11B). The heat radiating plate 186 will be discussed in detail below.

As shown in FIG. 9, the focal plane shutter device 190 (an example of a shutter device) is disposed in front (on the subject side) of the CMOS image sensor 110, and controls the exposure of the CMOS image sensor 110. The focal plane shutter device 190 has an open state in which light is incident on the CMOS image sensor 110, and a closed state in which light that would otherwise be incident on the CMOS image sensor 110 is blocked. The focal plane shutter device 190 will be discussed in detail below.

2.2: Camera Monitor 120

Figure 3:
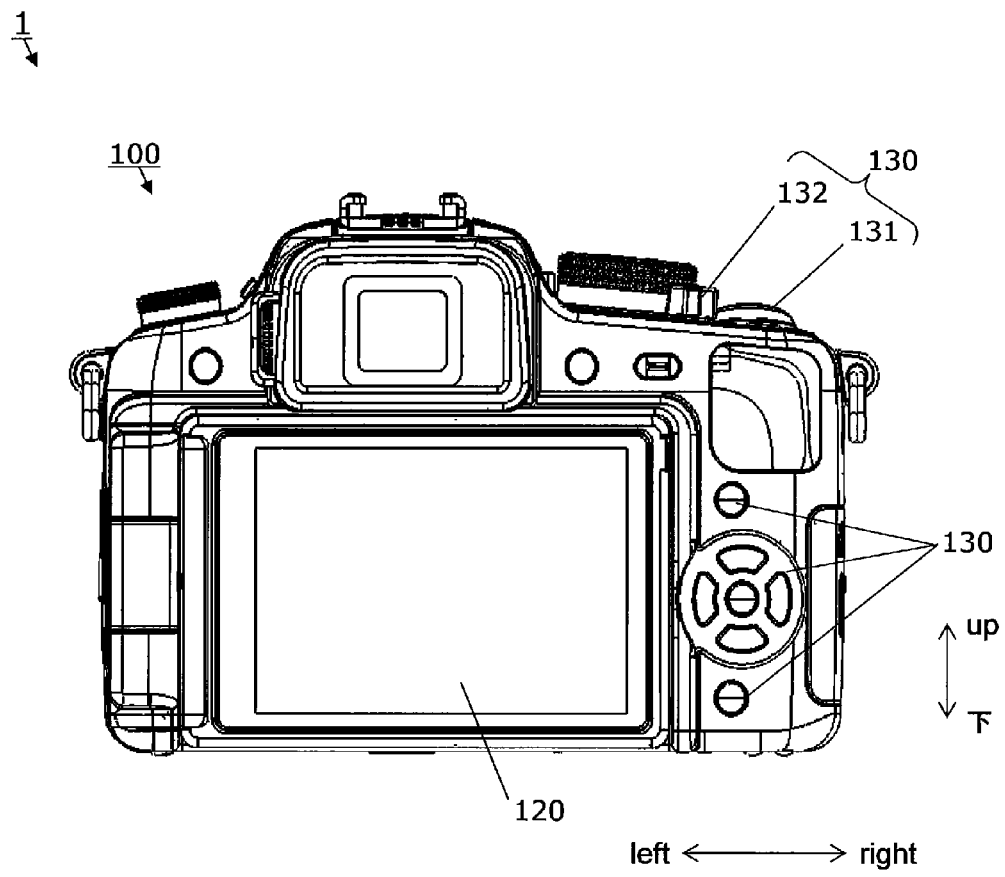
FIG. 3 is a rear view of the camera body 100.

The camera monitor 120 shown in FIGS. 1 to 3 is a liquid crystal display, for example, and displays an image on the basis of display-use image data. This display-use image data is produced by the camera controller 140 shown in FIG. 4. The display-use image data is, for example, image data that has undergone image processing, or data used to display the imaging conditions of the digital camera 1, operation menus, and so forth as images. The camera monitor 120 is able to selectively display both moving and still pictures. As shown in FIG. 3, in this embodiment the camera monitor 120 is disposed on the rear face of the camera body 100.

The camera monitor 120 is an example of a display component provided to the camera body 100. In addition to being a liquid crystal display, the display component can be an organic electroluminescence device, an inorganic electroluminescence device, a plasma display panel, or any other device that can display images. Also, the display component can be provided to a side face, the top face, or another location instead of the rear face of the camera body 100.

2.3: Manipulation Component 130

As shown in FIG. 4, the manipulation component 130 is connected to the camera controller 140 and is operated by the user. More specifically, as shown in FIGS. 1 to 3, the manipulation component 130 has a release button 131 and a power switch 132 (a rotary dial switch) provided to the top face of the camera body 100. The release button 131 is a two-stage push button, and can detect whether it has been pushed half-way or all the way down. When pressed half-way down, auto-focusing or another such imaging preparation operation is executed, and when pressed all the way down, exposure, the reading of image data, or another such imaging operation is executed.

The camera can be switched between single capture mode and continuous capture mode via the manipulation component 130. In single capture mode, the release button 131 is pressed all the way down one time to acquire a signal set of image data. In continuous capture mode, the release button 131 is pressed all the way down one time to continuously acquire a plurality of sets of image data.

As long as it can be operated by the user, the manipulation component 130 can be in the form of a button, a lever, a dial, a touch panel, or any other configuration.

2.4: Camera Controller 140

The camera controller 140 shown in FIG. 4 controls the various components of the camera body 100, and also controls the entire digital camera 1 when the interchangeable lens unit 200 has been mounted to the camera body 100. The camera controller 140 is electrically connected to the manipulation component 130, and can recognize operation information inputted to the manipulation component 130. The camera controller 140 controls the various components of the digital camera 1 on the basis of the operation information inputted to the manipulation component 130. The camera controller 140 sends a signal for controlling the interchangeable lens unit 200 through the body mount 151 and the lens mount 250 to a lens controller 240, and controls the various components of the interchangeable lens unit 200 via the lens controller 240.

For example, the camera controller 140 controls the CMOS image sensor 110 along with the CMOS circuit board 113. More specifically, the camera controller 140 sends the CMOS circuit board 113 a read start signal instructing it to start reading the image data from the CMOS image sensor 110, and the CMOS circuit board 113 controls the CMOS image sensor 110 on the basis of the read start signal that is received. The CMOS circuit board 113 also sends the camera controller 140 a read end signal telling it to end the reading of image data from the CMOS image sensor 110. Thus, the camera controller 140 can recognize the start and end of the reading of image data from the CMOS image sensor 110.

Also, the camera controller 140 acquires image data that is provided by the CMOS image sensor 110 and has undergone specific processing such as A/D conversion by the CMOS circuit board 113, and subjects the image data to further processing. For example, the camera controller 140 produces display-use image data, recording-use image data, or the like based on image data processed by the CMOS circuit board 113.

Also, the camera controller 140 can recognize a switch between single capture mode and continuous capture mode via the manipulation component 130, and can change the control of the various components according to single capture mode or continuous capture mode.

Further, the camera controller 140 controls the focal plane shutter device 190 (discussed below). The control of the focal plane shutter device 190 by the camera controller 140 will be discussed in detail below.

2.5: Card Slot 170

The card slot 170 shown in FIG. 4 allows the memory card 171 to be inserted. The card slot 170 controls the memory card 171 on the basis of a control signal sent from the camera controller 140. More specifically, the card slot 170 can store image data (still and moving picture data) on the memory card 171, and output image data from the memory card 171.

The image data outputted from the memory card 171 undergoes image processing by the camera controller 140. For instance, the camera controller 140 subjects the image data acquired from the memory card 171 to expansion processing, and produces display-use image data.

The memory card 171 is an example of a memory component. A memory component can be one that can be mounted to the camera body 100, such as the memory card 171, or can be one that is fixed to the digital camera 1.

2.6: Power Supply 160

The power supply 160 shown in FIG. 4 supplies power to the various components of the digital camera 1. The power supply 160, for example, can be a dry cell or a rechargeable cell. Also, the power supply 160 can be a unit that takes power from an external power supply via a power cord or the like and supplies that power to the digital camera 1.

3: Interchangeable Lens Unit 200

The interchangeable lens unit 200 shown in FIG. 4 can be mounted to the camera body 100, and forms an optical image of a subject. More specifically, the interchangeable lens unit 200 has an optical system L, a lens barrel 260, a driver 215, the lens mount 250, and the lens controller 240.

The optical system L forms an optical image of a subject on the light receiving face of the CMOS image sensor 110. The lens mount 250 is fixed to the lens barrel 260. The driver 215 drives an aperture unit or lens group of the optical system L. The lens controller 240 controls the entire interchangeable lens unit 200 on the basis of control signals sent from the camera controller 140. For example, the lens controller 240 controls the driver 215 on the basis of a control signal sent from the camera controller 140. The optical image formed by the interchangeable lens unit 200 is incident on the imaging unit 125.

4: Detailed Configuration of Imaging Unit 125

The detailed configuration of the imaging unit 125 will now be described.

For example, mounting the imaging element unit 180 to the mount unit 150 by a screw is favorable as an attachment structure.

However, when dimensional error is taken into account for the various components of the mount unit 150 and the imaging element unit 180, there can be variance in the flange back for the product as a whole if the imaging element unit 180 is merely mounted to the mount unit 150.

In view of this, with the camera body 100, the design allows for adjustment of the distance between the mount unit 150 and the imaging element unit 180.

More specifically, as shown in FIG. 9, the imaging element unit 180 is mounted to the mount unit 150 with three adjusting screws 181 and three adjusting springs 183. In this embodiment, the three adjusting screw 181 and the three adjusting springs 183 are used to mount the heat radiating plate 186 of the imaging element unit 180 to the mount base 152.

Figures 11A, 11B:
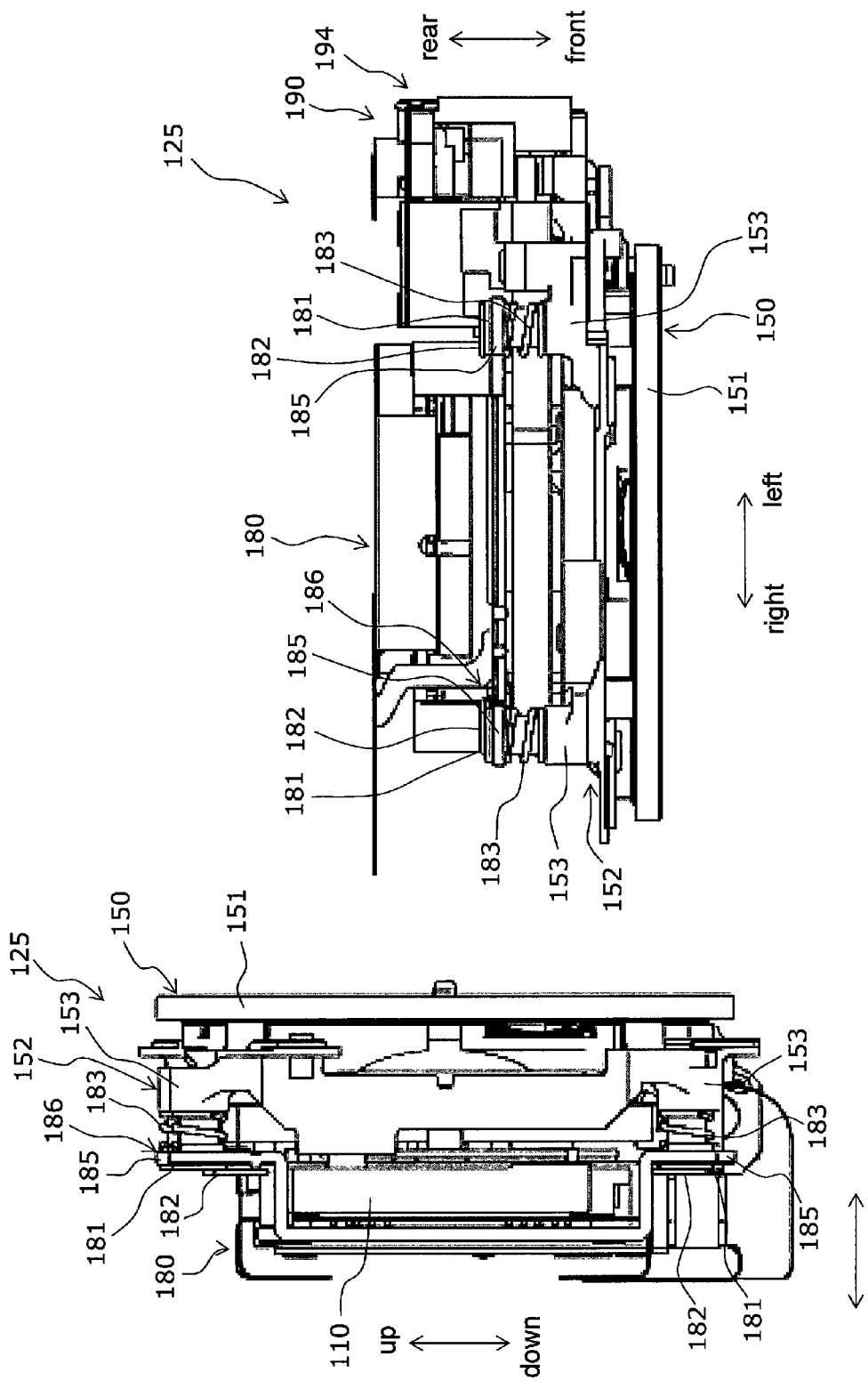
FIG. 11A is a side view of the imaging unit 125.
FIG. 11B is a top view of the imaging unit 125.

As shown in FIGS. 11A and 11B, the three adjusting springs 183 (an example of elastic members) are disposed in a compressed state between the mount unit 150 and the imaging element unit 180. Three flanges 185 are formed on the heat radiating plate 186 of the imaging element unit 180. The adjusting springs 183 are disposed in a compressed state between the flanges 185 of the imaging element unit 180 and the mount base 152 of the mount unit 150.

Figures 12A, 12B:
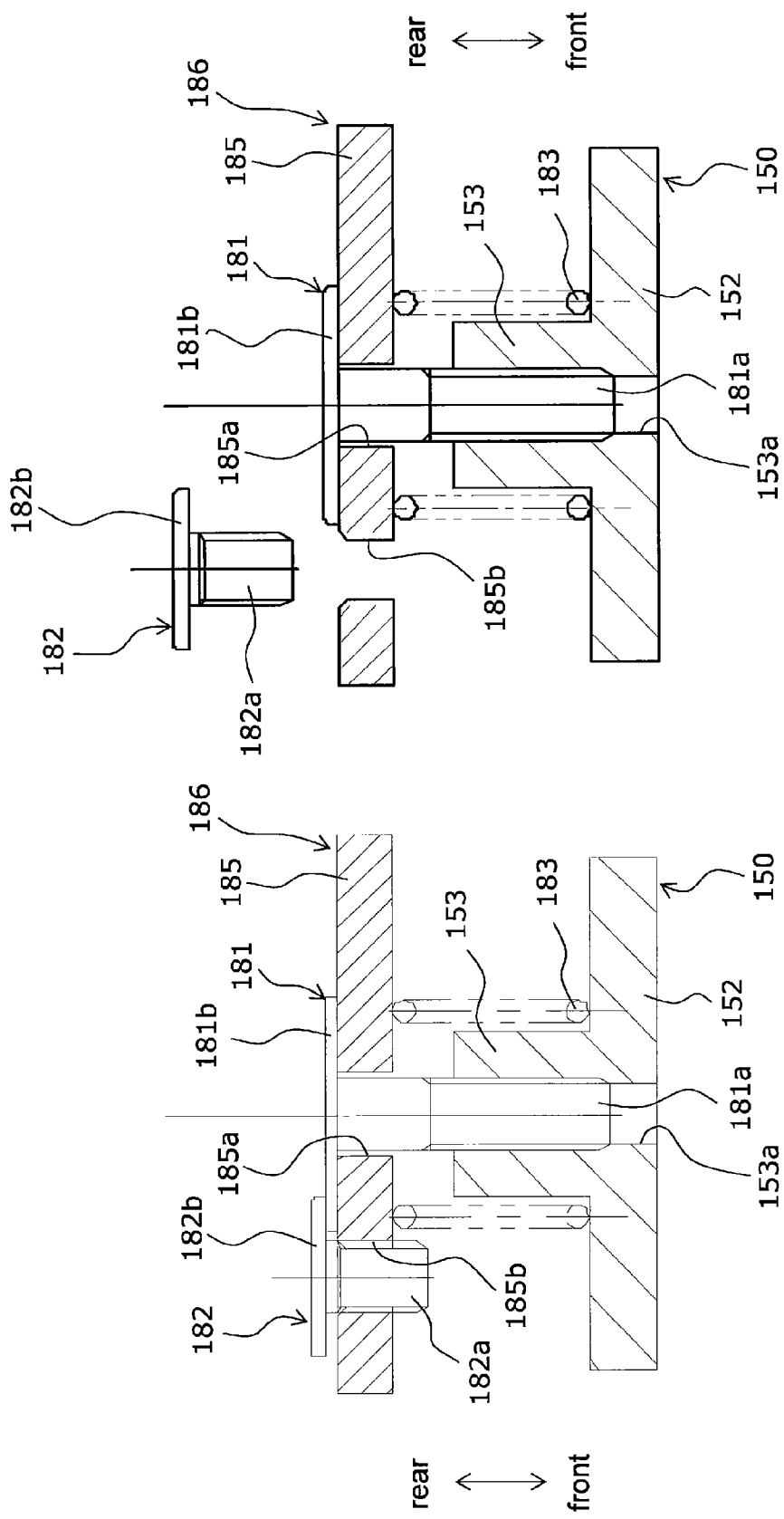
FIG. 12A is a cross section of the area around an adjusting screw 181.
FIG. 12B is a cross section of the area around the adjusting screw 181.

The three adjusting screws 181 (an example of adjusting screws) are provided in order to adjust the distance between the mount unit 150 and the imaging element unit 180. More specifically, as shown in FIGS. 12A and 12B, the adjusting screws 181 are threaded into the mount base 152 of the mount unit 150. The adjusting screws 181 have a thread portion 181a that is threaded into the mount unit 150, and a head portion 181b formed at the end of the thread portion 181a. Through-holes 185a are formed in the flanges 185. The thread portions 181a are inserted into the through-holes 185a of the flanges 185. The heat radiating plate 186 (more precisely, the flanges 185) of the imaging element unit 180 come into contact with the head portions 181b.

As shown in FIGS. 12A and 12B, the mount base 152 has three bosses 153. Screw holes 153a are formed in the bosses 153. The thread portions 181a of the adjusting screws 181 are threaded into the screw holes 153a of the bosses 153. Also, the bosses 153 are inserted into the adjusting springs 183, and the adjusting springs 183 are positioned up and down, and left and right, by the bosses 153.

As shown in FIGS. 12A and 12B, the flanges 185 of the heat radiating plate 186 are pressed against the head portions 181b of the adjusting screws 181 by the elastic force of the adjusting springs 183, so positioning of the imaging element unit 180 in the longitudinal direction with respect to the mount unit 150 is accomplished by the adjusting screws 181 and the adjusting springs 183.

Figure 7:
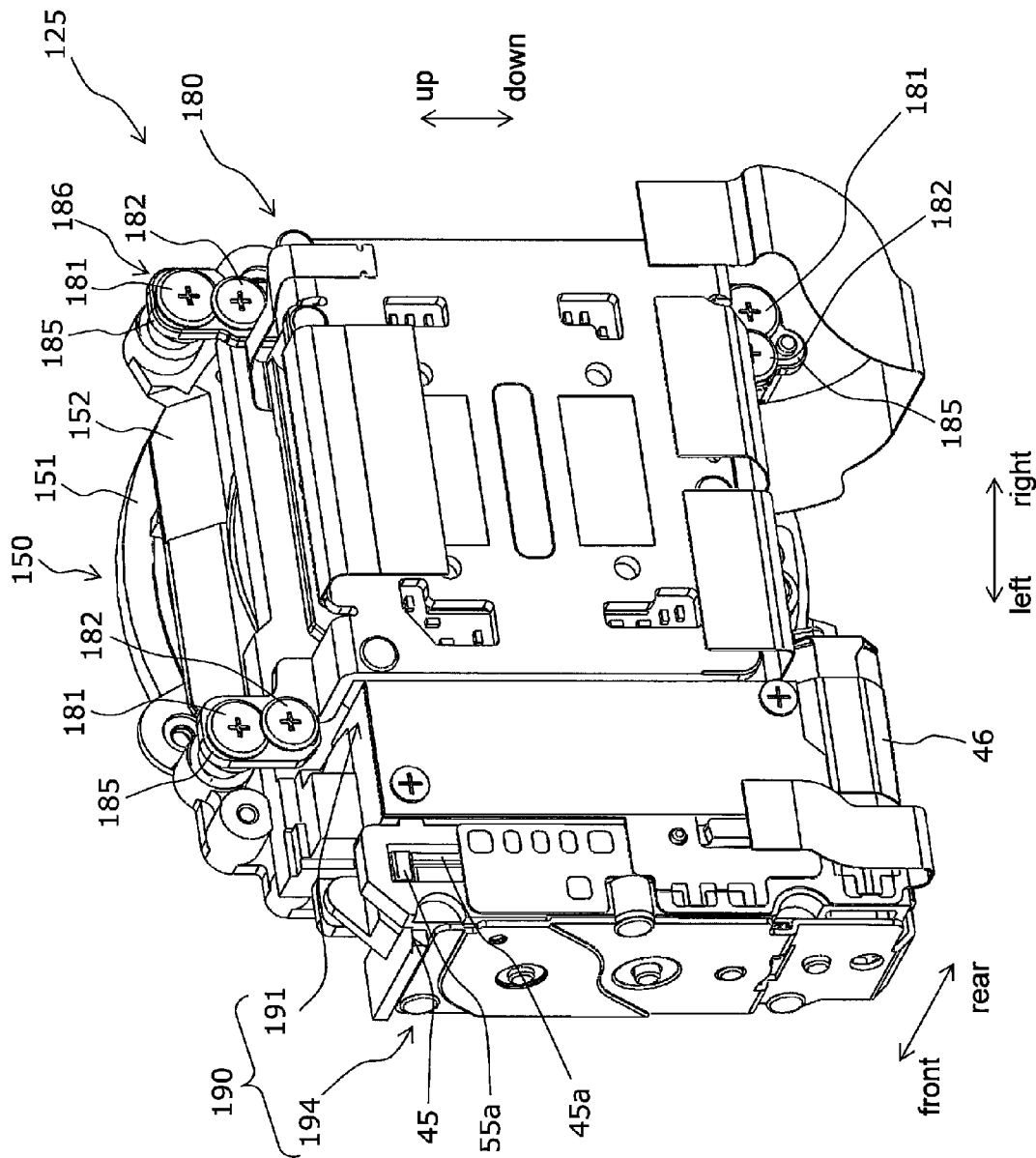
FIG. 7 is an oblique view of the imaging unit 125.
Figure 8:
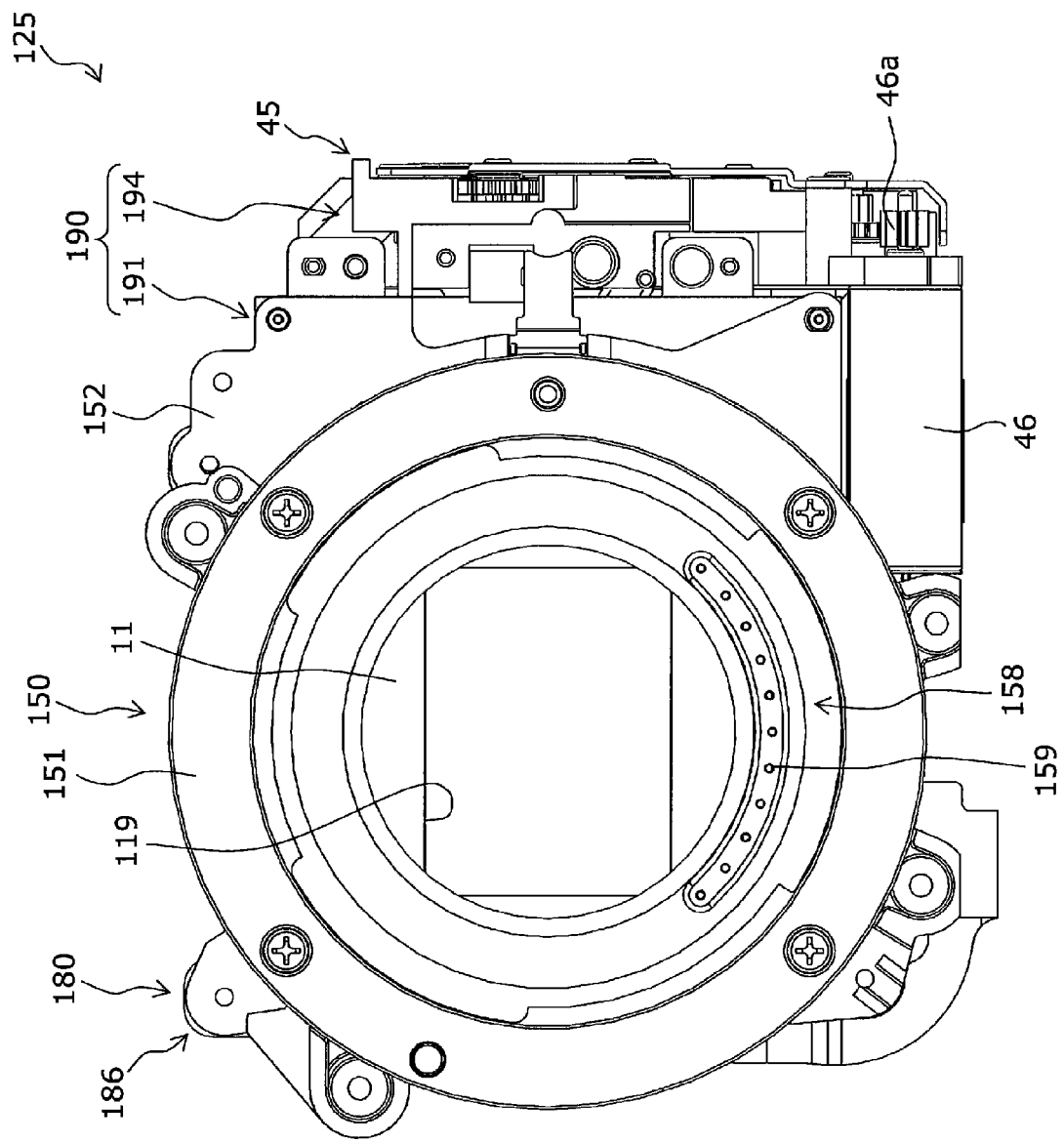
FIG. 8 is a plan view of the imaging unit 125.

Further, in order to restrict the heat radiating plate 186 from coming close to the mount unit 150, three restricting screws 182 (an example of restricting members) are installed on the heat radiating plate 186 (see FIGS. 7 and 9). The three restricting screws 182 are respectively provided to the three adjusting screws 181. As shown in FIGS. 12A and 12B, the restricting screws 182 have thread portions 182a that are threaded into the heat radiating plate 186, and head portions 182b formed at the ends of the thread portions 182a. Threaded through-holes 185b are formed adjacent to through-holes 185a. The thread portions 182a of the restricting screws 182 are threaded into the threaded through-holes 185b. In this embodiment, the thread portions 182a of the restricting screws 182 and the threaded through-holes 185b are disposed on the outer peripheral side of the adjusting springs 183.

As shown in FIG. 12A, the head portions 181b of the adjusting screws 181 are sandwiched between the restricting screws 182 and the heat radiating plate 186. More precisely, the head portions 181b of the adjusting screws 181 are sandwiched between the heat radiating plate 186 and the head portions 182b of the restricting screws 182. The restricting screws 182 prevent the imaging element unit 180 from moving close to the mount unit 150, and the imaging element unit 180 can be prevented from interfering with the mount unit 150 even if an external force is exerted on the imaging unit 125.

5: Detailed Configuration of Focal Plane Shutter Device 190

The focal plane shutter device 190 will now be described in detail.

As shown in FIG. 9, the focal plane shutter device 190 is a normally-open type with which the open state of the shutter mechanism 191 can be maintained even when no power is being supplied, and has the shutter mechanism 191, the shutter drive device 194, and a position detecting sensor 195.

5.1: Shutter Mechanism 191

Figure 14:
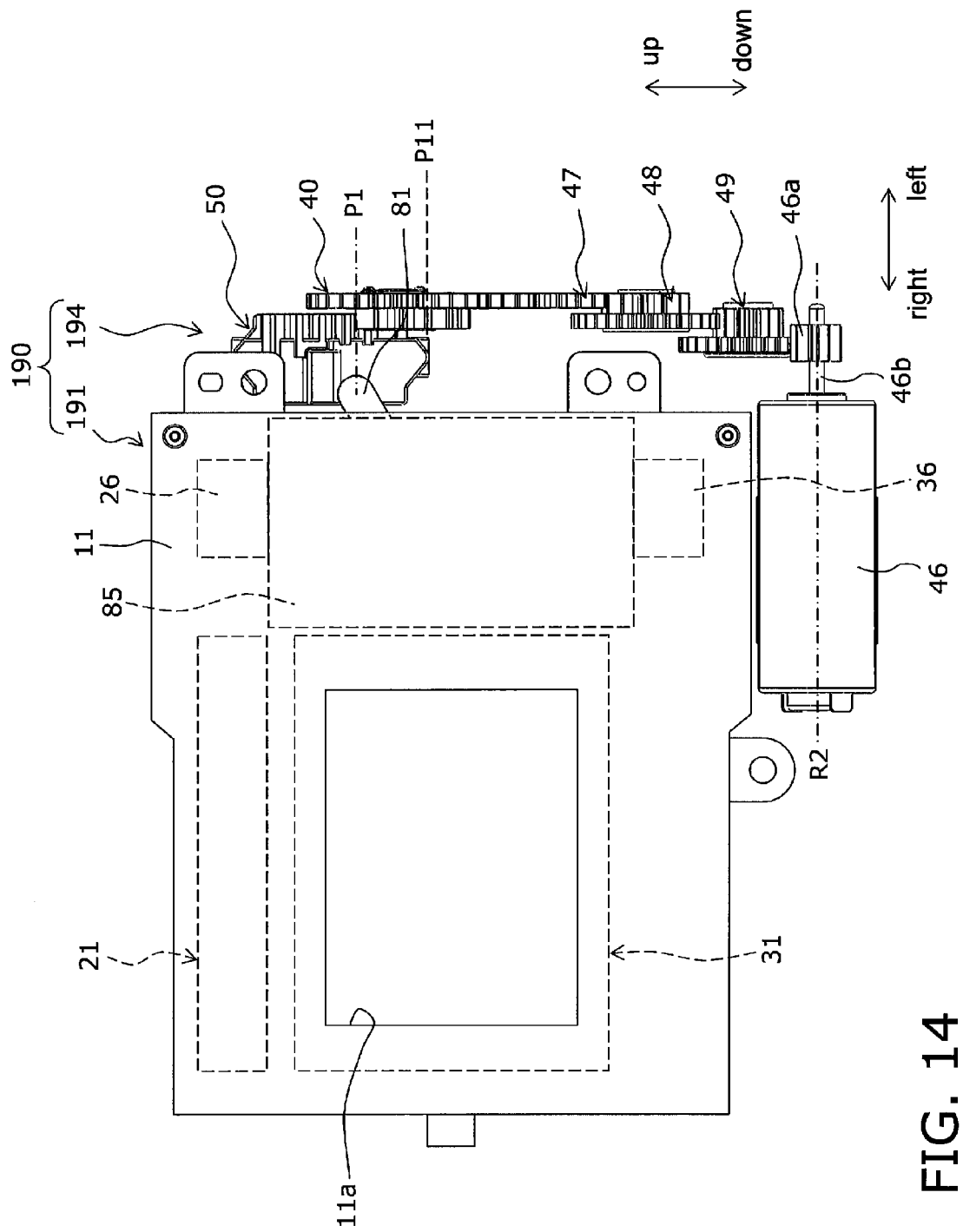
FIG. 14 is a plan view of a focal plane shutter device 190 in which some of the members are omitted (state of completed travel)

The shutter mechanism 191 (an example of a shutter mechanism) has an open state in which light is incident on the CMOS image sensor 110 (the state shown in FIG. 15) and a closed state in which light that would be incident on the CMOS image sensor 110 is blocked (the state shown in FIG. 14). The shutter mechanism 191 is driven by the shutter drive device 194.

The "open state" referred to here means a state in which the opening 11a of the shutter mechanism 191 is completely open. The "closed state" means a state in which the opening 11a of the shutter mechanism 191 is completely covered by a shutter curtain (a front curtain 21 or rear curtain 31), and also means a state in which light that would be incident on the CMOS image sensor 110 is completely blocked by the shutter mechanism 191. The term "charging", as in charging the shutter mechanism, refers to the shutter motor 46 producing a driving force to be stored in the shutter mechanism 191 so as to move or drive the shutter curtains 21, 31 in the shutter mechanism 191.

Figure 15:
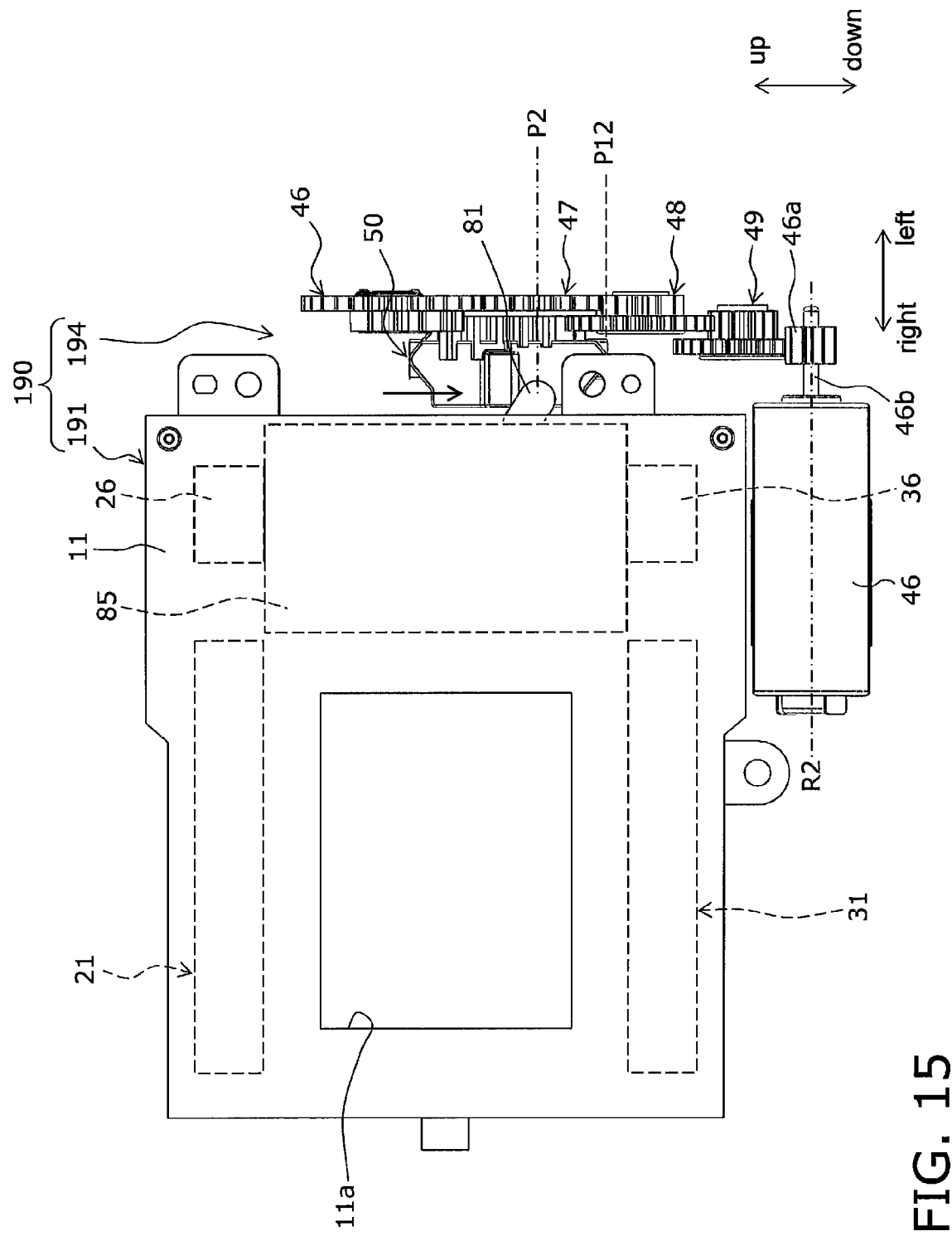
FIG. 15 is a plan view of the focal plane shutter device 190 in which some of the members are omitted (state of completed charging)

As shown in FIGS. 14 and 15, the shutter mechanism 191 (an example of a shutter mechanism) has a shutter holder 11, the front curtain 21, the rear curtain 31, a shutter drive mechanism 85, a front curtain electromagnet 26, and a rear curtain electromagnet 36.

The shutter holder 11 has two plates. The front curtain 21 and the rear curtain 31 are held so that they can travel between the two plates. The shutter holder 11 has the opening 11a for guiding light from the optical system L to the CMOS image sensor 110.

As shown in FIGS. 14 and 15, the front curtain 21 (an example of a front curtain) is disposed movably in the up and down direction with respect to the shutter holder 11. The front curtain 21 is supported movably in the up and down direction by the shutter drive mechanism 85. The rear curtain 31 (an example of a rear curtain) is also disposed movably along the up and down direction with respect to the shutter holder 11. The rear curtain 31 is supported movably along the up and down direction by the shutter drive mechanism 85. In this embodiment, the front curtain 21 retracts above the opening 11a, and the rear curtain 31 retracts below the opening 11a, but the layout of the front curtain 21 and rear curtain 31 can be reversed.

The shutter drive mechanism 85 supports the front curtain 21 and the rear curtain 31 movably with respect to the shutter holder 11. The shutter drive mechanism 85 has a front curtain travel spring (not shown), a front curtain set spring (not shown), a rear curtain travel spring (not shown), a rear curtain set spring (not shown), and a drive lever 81. The front curtain travel spring imparts an elastic force to the front curtain 21 for moving the front curtain 21 upward. The front curtain set spring imparts an elastic force to the front curtain 21 for moving the front curtain 21 downward. The elastic force of the front curtain travel spring is greater than the elastic force of the front curtain set spring, so the front curtain 21 can travel upward against the elastic force of the front curtain set spring. The rear curtain travel spring imparts a biasing force to the rear curtain 31 for moving the rear curtain 31 upward.

The drive lever 81 is provided rotatably with respect to the shutter holder 11, and protrudes from the shutter holder 11. As shown in FIG. 14, when the drive lever 81 is disposed at a first lever position P1, the opening 11a of the shutter holder 11 is covered by the rear curtain 31. In a state in which no external force is acting on the drive lever 81, the drive lever 81 is held at the first lever position P1 by the travel springs and set springs.

When the end of the drive lever 81 is driven from the first lever position P1 to a second lever position P2, the front curtain travel spring and the rear curtain travel spring are compressed, the front curtain travel spring and the rear curtain travel spring are charged with an elastic force for moving the front curtain 21 and the rear curtain 31, and, as shown in FIG. 15, the front curtain 21 and the rear curtain 31 both retract from the opening 11a. If the drive lever 81 is mechanically held at the second lever position P2, the state in which the front curtain 21 and the rear curtain 31 are retracted from the opening 11a can be maintained mechanically, regardless of whether or not power is being supplied. As will be discussed below, the shutter drive device 194 can mechanically hold the drive lever 81 at the second lever position P2, so with this focal plane shutter device 190, the shutter mechanism 191 can be held in its open state even when no power is being supplied.

The front curtain electromagnet 26 maintains a charging completed state in which the front curtain travel spring has been compressed. For example, a front curtain chucking piece (not shown) is fixed to a front curtain drive arm (not shown) that supports the front curtain 21. When the end of the drive lever 81 is driven from the first lever position P1 to the second lever position P2, the front curtain travel spring begins to compress, and the front curtain chucking piece approaches the front curtain electromagnet 26. In a state in which the end of the drive lever 81 is disposed at the second lever position P2, the front curtain travel spring is charged with a biasing force that moves the front curtain 21, and the front curtain chucking piece comes into contact with the front curtain electromagnet 26. When current is sent to the front curtain electromagnet 26 in this state, the front curtain electromagnet 26 chucks the front curtain chucking piece by electromagnetic force. Consequently, the charging completed state of the front curtain 21 can be maintained even when the force pressing it against the drive lever 81 has been released.

The rear curtain electromagnet 36 maintains a charging completed state in which the rear curtain travel spring has been compressed. For example, a rear curtain chucking piece (not shown) is fixed to a rear curtain drive arm (not shown) that supports the rear curtain 31. When the end of the drive lever 81 is driven from the first lever position P1 to the second lever position P2, the rear curtain travel spring begins to compress, and the rear curtain chucking piece approaches the rear curtain electromagnet 36. In a state in which the end of the drive lever 81 is disposed at the second lever position P2, the rear curtain travel spring is charged with a biasing force that moves the rear curtain 31, and the rear curtain chucking piece comes into contact with the rear curtain electromagnet 36. When current is sent to the rear curtain electromagnet 36 in this state, the rear curtain electromagnet 36 chucks the rear curtain chucking piece by electromagnetic force. Consequently, the charging completed state of the rear curtain 31 can be maintained even when the force pressing it against the drive lever 81 has been released.

The supply of current to the front curtain electromagnet 26 and the rear curtain electromagnet 36 is controlled by the camera controller 140.

The operation of the shutter mechanism 191 will now be described in detail.

Figure 36A:
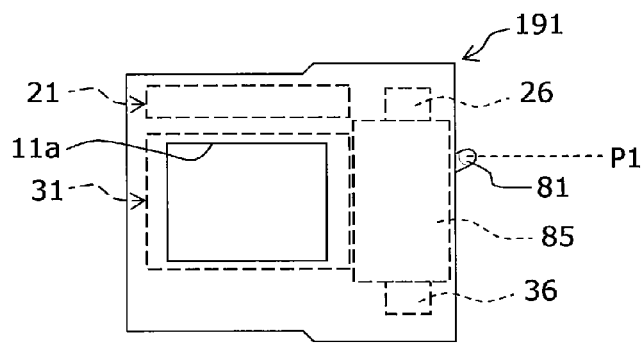
FIG. 36A is a diagram illustrating the operation of a shutter mechanism 191 in a state of completed travel.

As shown in FIG. 36A, in a state in which the travel of the front curtain 21 and the rear curtain 31 is complete, the front curtain 21 retracts from the opening 11a, and the rear curtain 31 covers the opening 11a. This state is called the travel completed state of the shutter mechanism 191. In this travel completed state, the drive lever 81 is disposed at the first lever position P1.

Figure 36B:
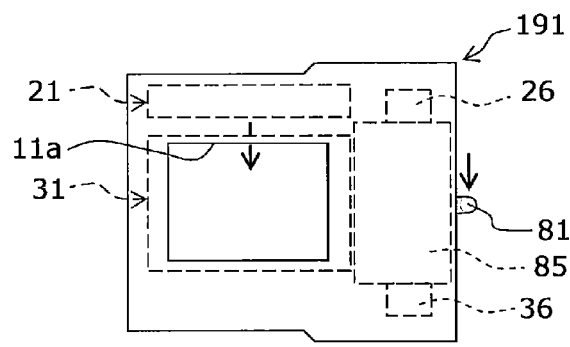
FIG. 36B is a diagram illustrating the operation of the shutter mechanism 191 during charging.
Figure 36C:
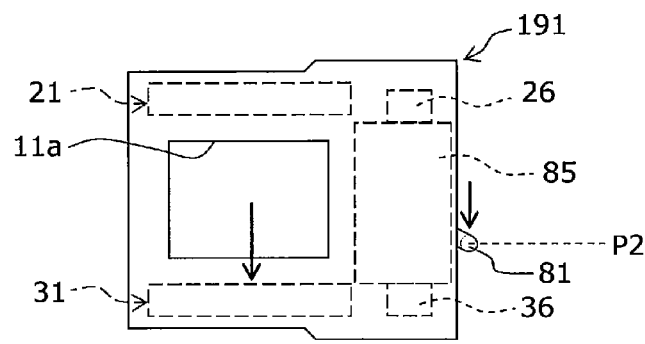
FIG. 36C is a diagram illustrating the operation of the shutter mechanism 191 in a state of completed charging.

When the drive lever 81 is driven to the second lever position P2 from the travel completed state, the shutter mechanism 191 is charged. When the drive lever 81 is pushed toward the second lever position P2, the elastic force of the front curtain travel spring and the rear curtain travel spring is exerted on the drive lever 81. As shown in FIG. 36B, the rear curtain 31 begins retracting downward from the opening 11a immediately prior to the arrival of the drive lever 81 at the second lever position P2. As shown in FIG. 36C, when the drive lever 81 reaches the second lever position P2, this results in a state in which the rear curtain 31 has retracted downward from the opening 11a. In a state in which the drive lever 81 is held at the second lever position P2, the front curtain 21 and the rear curtain 31 both retract from the opening 11a. This state is called a charging completed state.

Figure 36D:
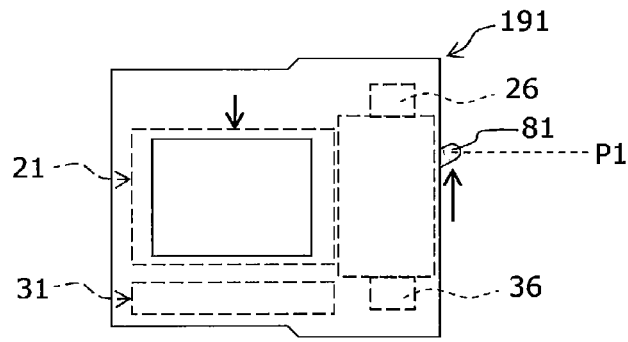
FIG. 36D is a diagram illustrating the operation of the shutter mechanism 191 in a state of completed travel preparation.

In this charging completed state, the front curtain chucking piece hits the front curtain electromagnet 26, and the rear curtain chucking piece hits the rear curtain electromagnet 36. Therefore, when current is sent to the front curtain electromagnet 26 and the rear curtain electromagnet 36 in a state in which the drive lever 81 is held at the second lever position P2, the front curtain chucking piece is chucked by the front curtain electromagnet 26, and the rear curtain chucking piece is chucked by the rear curtain electromagnet 36. When the drive lever 81 is released in a state in which current is sent to the front curtain electromagnet 26 and the rear curtain electromagnet 36, as shown in FIG. 36D, the front curtain 21 moves downward and covers the opening 11a under the elastic force of the front curtain set spring in a state of being charged by the biasing force of the front curtain travel spring and the rear curtain travel spring. This state is called the travel preparation completed state. In this travel preparation completed state, the drive lever 81 is also pushed by the elastic force of the front curtain set spring from the second lever position P2 to the first lever position P1, and the drive lever 81 is held at the first lever position P1.

When the supply of power to the front curtain electromagnet 26 and the rear curtain electromagnet 36 is cut off in the travel preparation completed state, the front curtain 21 travels upward under the elastic force of the front curtain travel spring, and the rear curtain 31 travels upward under the elastic force of the rear curtain travel spring. Once the travel is complete, the shutter mechanism 191 enters the state shown in FIG. 36A.

Thus, as shown in FIG. 36A, when the drive lever 81 is disposed at the first lever position P1, the front curtain 21 maintains its open state and the rear curtain 31 maintains its closed state. As shown in FIG. 36C, when the drive lever 81 is disposed at the second lever position P2, the front curtain 21 and the rear curtain 31 maintain an open state.

5.2: Shutter Drive Device 194

The shutter drive device 194 (an example of a shutter drive device) shown in FIGS. 14 and 15 is provided to the focal plane shutter device 190 in order to drive the shutter mechanism 191 described above. The shutter drive device 194 charges the shutter mechanism 191 and mechanically maintains the charging completed state (see FIG. 36C) and the open state of the shutter mechanism 191. For example, during charging, the shutter drive device 194 drives the drive lever 81 from the first lever position P1 to the second lever position P2, and mechanically holds the drive lever 81 at the second lever position P2 in order to maintain the open state of the shutter mechanism 191. The shutter drive device 194 can also release the drive lever 81 from being held at the second lever position P2. The configuration of the shutter drive device 194 will now be described in detail.

Figure 10:
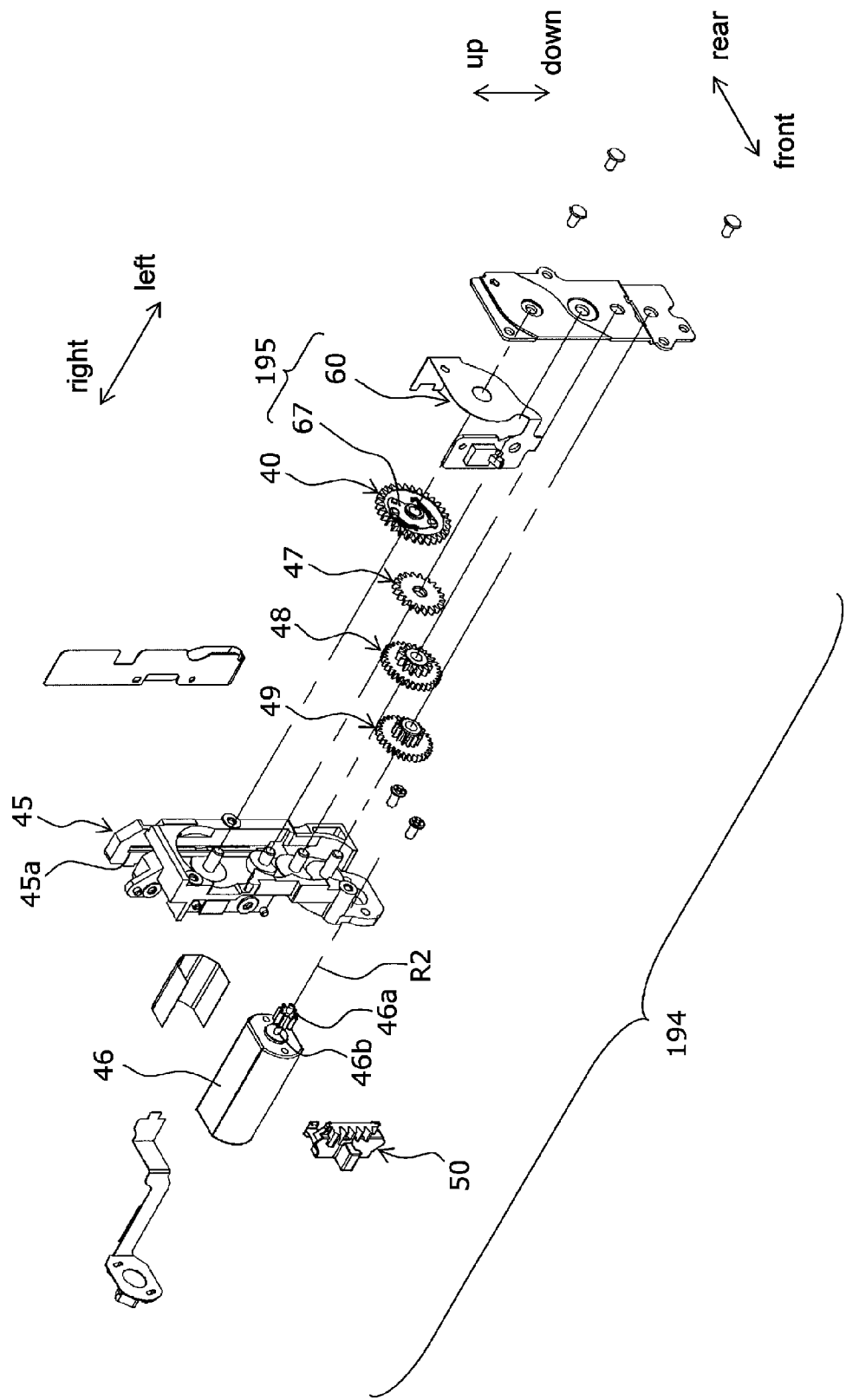
FIG. 10 is an exploded oblique view of a shutter drive device 194.

As shown in FIG. 10, the shutter drive device 194 has a gear base 45, a shutter motor 46, a first gear 49, a second gear 48, a third gear 47, the charge gear 40, and the slide lever 50.

The gear base 45 (an example of a base member) rotatably supports the first gear 49, the second gear 48, the third gear 47 and the charge gear 40, and is mounted to the side of the shutter mechanism 191. The gear base 45 also supports the slide lever 50 movably in the up and down direction (an example of a first direction). The gear base 45 has a guide groove 45a. The slide lever 50 is inserted into the guide groove 45a and is able to move up and down along the guide groove 45a. The shutter motor 46 is fixed to the gear base 45.

The shutter motor 46 (one example of an actuator) produces drive force for driving the shutter mechanism 191. The shutter motor 46 is controlled by the camera controller 140. The shutter motor 46 is a DC motor, for example, and has a drive shaft 46b and a drive gear 46a that is fixed to the end of the drive shaft 46b. The drive gear 46a meshes with the first gear 49. The drive shaft 46b rotates around a rotational axis R2. As shown in FIGS. 14 and 15, the rotational axis R2 is substantially parallel to the left and right direction, and substantially perpendicular to the up and down direction. The shutter motor 46 is disposed aligned with the shutter mechanism 191 in the up and down direction, and is disposed below the shutter mechanism 191.

Figure 13:
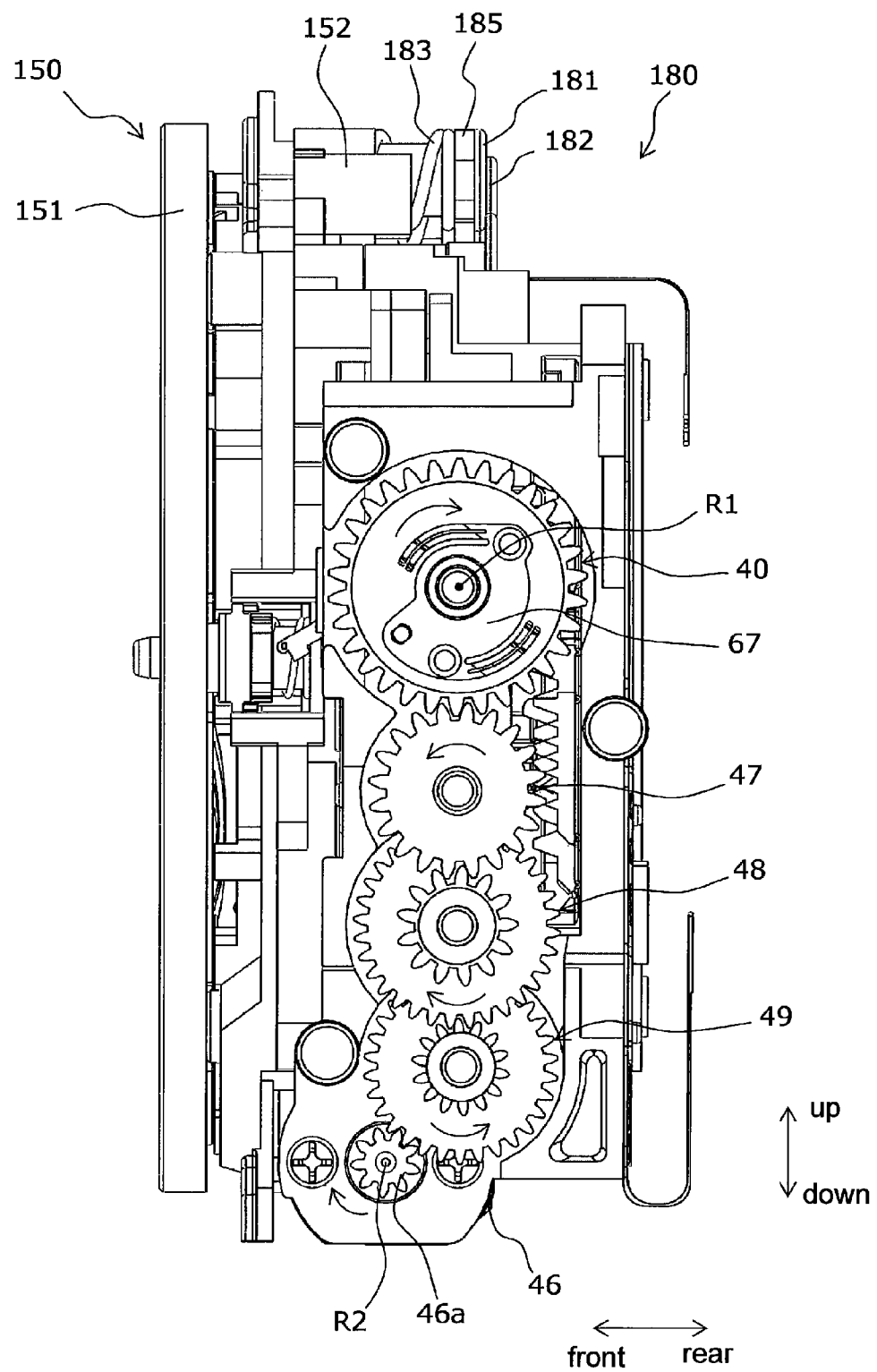
FIG. 13 is a side view of the imaging unit 125.

As shown in FIGS. 10 and 13, the first gear 49 (an example of a gear member) meshes with the drive gear 46a and second gear 48 of the shutter motor 46, reduces the rotational speed of the shutter motor 46, and transmits this rotation to the second gear 48.

The second gear 48 (an example of a gear member) meshes with the first gear 49 and third gear 47, reduces the rotational speed of the first gear 49, and transmits this rotation to the third gear 47.

The third gear 47 (an example of a gear member) meshes with the second gear 48 and charge gear 40, and transmits the rotation of the second gear 48 to the charge gear 40.

The charge gear 40 (one example of a first drive member, and one example of a transmission member) transmits the drive force produced by the shutter motor 46 to the shutter mechanism 191. More specifically, the charge gear 40 is rotatably supported by the gear base 45, and transmits the rotation of the third gear 47 to the slide lever 50. The charge gear 40 is rotationally driven by the shutter motor 46 via the first gear 49, the second gear 48, and the third gear 47, and charges the shutter mechanism 191 via the slide lever 50. The charge gear 40 also mechanically holds the open state of the shutter mechanism 191 when no power is being supplied to the shutter motor 46, and allows the shutter mechanism 191 to be switched from its closed state to its open state.

The shape of the charge gear 40 will now be described in detail.

As shown in FIGS. 16 to 18B, the charge gear 40 has a full circumference gear 41, an intermittent gear 43 (an example of a gear component), and an intermittent cam 42 (an example of a gear component). The full circumference gear 41 meshes with the third gear 47. Consequently, the charge gear 40 is rotated by the drive force of the shutter motor 46.

The intermittent gear 43 and the intermittent cam 42 are disposed on the side face of the full circumference gear 41, and are formed partially in the circumferential direction. The intermittent cam 42 is disposed aligned with the intermittent gear 43 in the circumferential direction. The intermittent gear 43 and the intermittent cam 42 transmit the rotation of the full circumference gear 41 to the slide lever 50. The intermittent gear 43 transmits the rotation of the full circumference gear 41 to the slide lever 50 from the start of charging until just prior to the completion of charging.

Meanwhile, the intermittent cam 42 is provided so that it can slide with a cam follower 54 of the slide lever 50, and holds the charging completed state of the shutter mechanism 191 via the slide lever 50. More specifically, the intermittent cam 42 has a cam body 42g and a guide component 42f that protrudes forward in the rotational direction from the cam body 42g. The guide component 42f transmits the rotation of the full circumference gear 41 to the slide lever 50, from just prior to the completion of charging until the completion of charging, and drives the slide lever 50 downward.

The cam body 42g mechanically holds the slide lever 50 at a charging completed position P12 (FIG. 15), and mechanically holds the drive lever 81 at the second lever position P2 via the slide lever 50. Therefore, the shutter drive device 194 can mechanically maintain the open state of the shutter mechanism 191. The hold of the slide lever 50 by the intermittent cam 42 can also be released by rotating the charge gear 40 in a state in which the slide lever 50 is held.

The intermittent cam 42 has a recess 42d so that the charge gear 40 will not rotate too far after the shutter motor 46 stops. The recess 42d formed on the inner peripheral side is recessed toward the rotational axis R1 of the charge gear 40.

Figure 16:
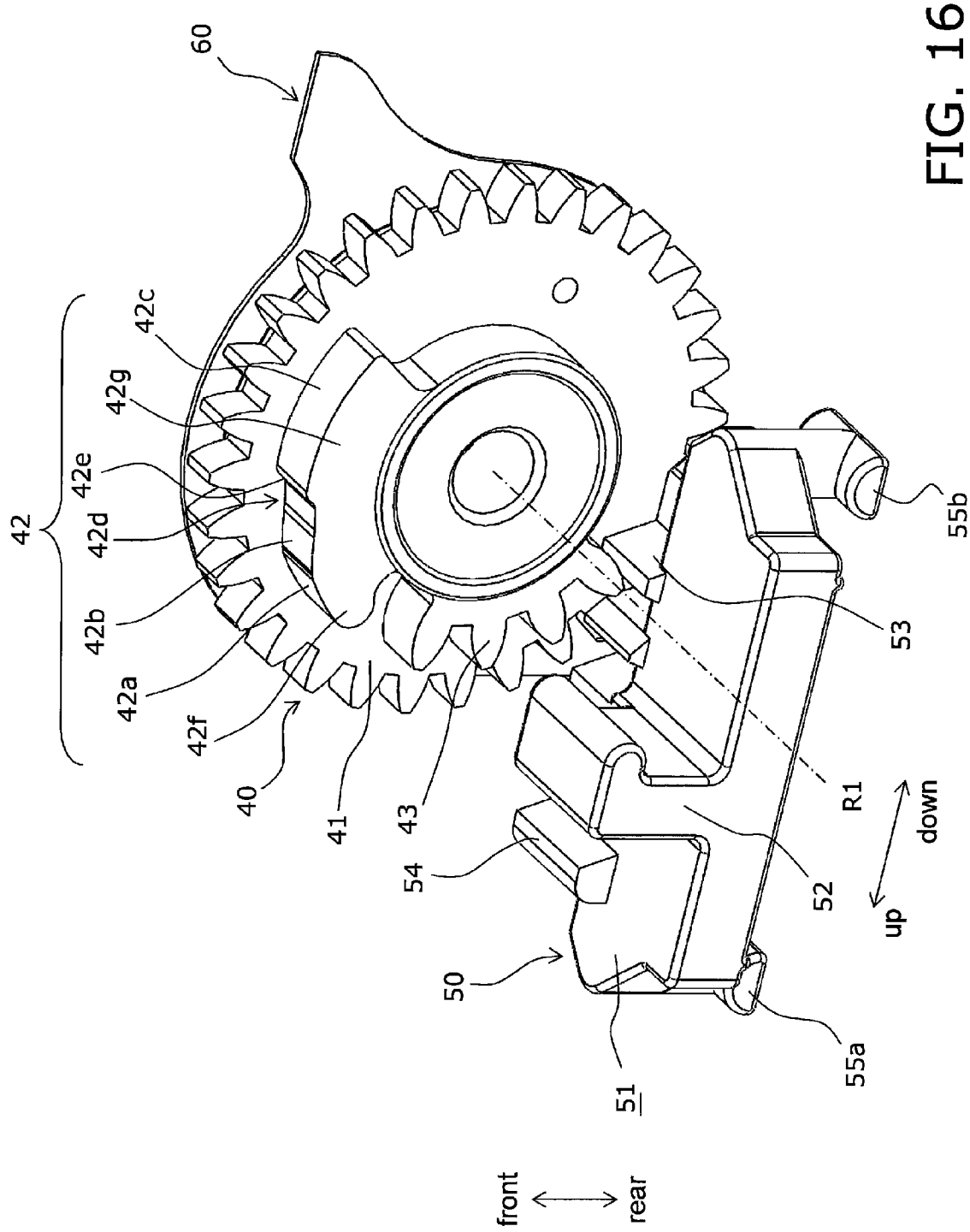
FIG. 16 is an oblique view of a charge gear 40 and a slide lever 50.
Figure 18B:
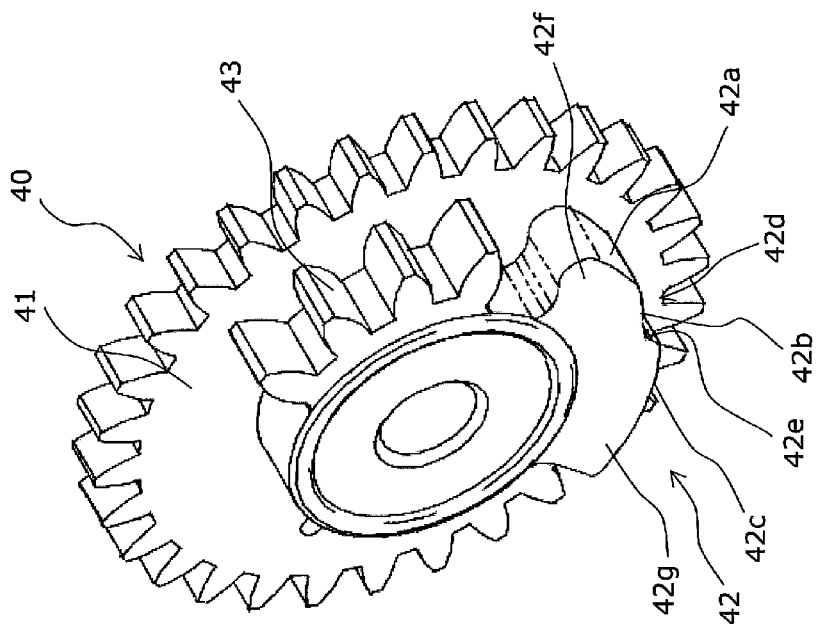
FIG. 18B is an oblique view of the charge gear 40.
Figure 18A:
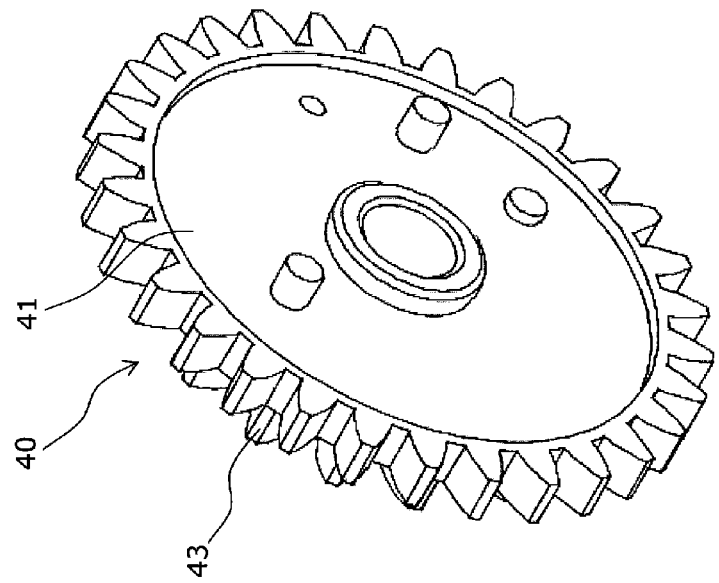
FIG. 18A is an oblique view of the charge gear 40.

More specifically, As shown in FIGS. 16 and 18B, the intermittent cam 42 has a first sliding face 42a, a second sliding face 42b, and a third sliding face 42c. The first sliding face 42a, second sliding face 42b, and third sliding face 42c slide with the cam follower 54 of the slide lever 50. The first sliding face 42a and the third sliding face 42c are formed in an arc shape around the rotational axis R1 of the charge gear 40. In this embodiment, the first sliding face 42a is disposed at substantially the same position as the third sliding face 42c in the radial direction. The second sliding face 42b constitutes the outer face of the recess 42d, and is disposed between the first sliding face 42a and the third sliding face 42c.

The first sliding face 42a, second sliding face 42b, and third sliding face 42c slide in that order with the cam follower 54. Since the second sliding face 42b constitutes the recess 42d, the rotational resistance received by the charge gear 40 from the slide lever 50 through the second sliding face 42b is greater than the rotational resistance received from the slide lever 50 through the first sliding face 42a.

More precisely, the second sliding face 42b has a guide face 42e that guides the cam follower 54 away from the rotational axis R1 of the charge gear 40. Also, as discussed above, the drive lever 81 of the shutter mechanism 191 is pressed by a spring so as to move from the second lever position P2 to the first lever position P1. Therefore, providing the guide face 42e imparts a relatively large rotational resistance from the slide lever 50 to the charge gear 40 when the cam follower 54 slides with the recess 42d. Consequently, the charge gear 40 is prevented from rotating too far after the shutter motor 46 stops, and prevents the cam follower 54 from coming out of the intermittent cam 42. The inertial rotation of the charge gear 40 stops in a state in which the cam follower 54 is fitted into the recess 42d, or in a state in which the cam follower 54 has passed the recess 42d and come into contact with the third sliding face 42c.

The slide lever 50 (one example of a second drive member) is provided in order to transmit the drive force of the shutter motor 46 to the drive lever 81 of the shutter mechanism 191, and is driven by the charge gear 40 via the cam follower 54 with respect to the gear base 45. The slide lever 50 is supported by the gear base 45 so as to be able to move rectilinearly in the up and down direction, and is driven by the charge gear 40 in the up and down direction. In this embodiment, as shown in FIGS. 14 and 15, the slide lever 50 is driven by the charge gear 40 between an initial position P11 and the charging completed position P12. The initial position P11 and the charging completed position P12 use the lower end of the slide lever 50 as a reference.

Figure 17:
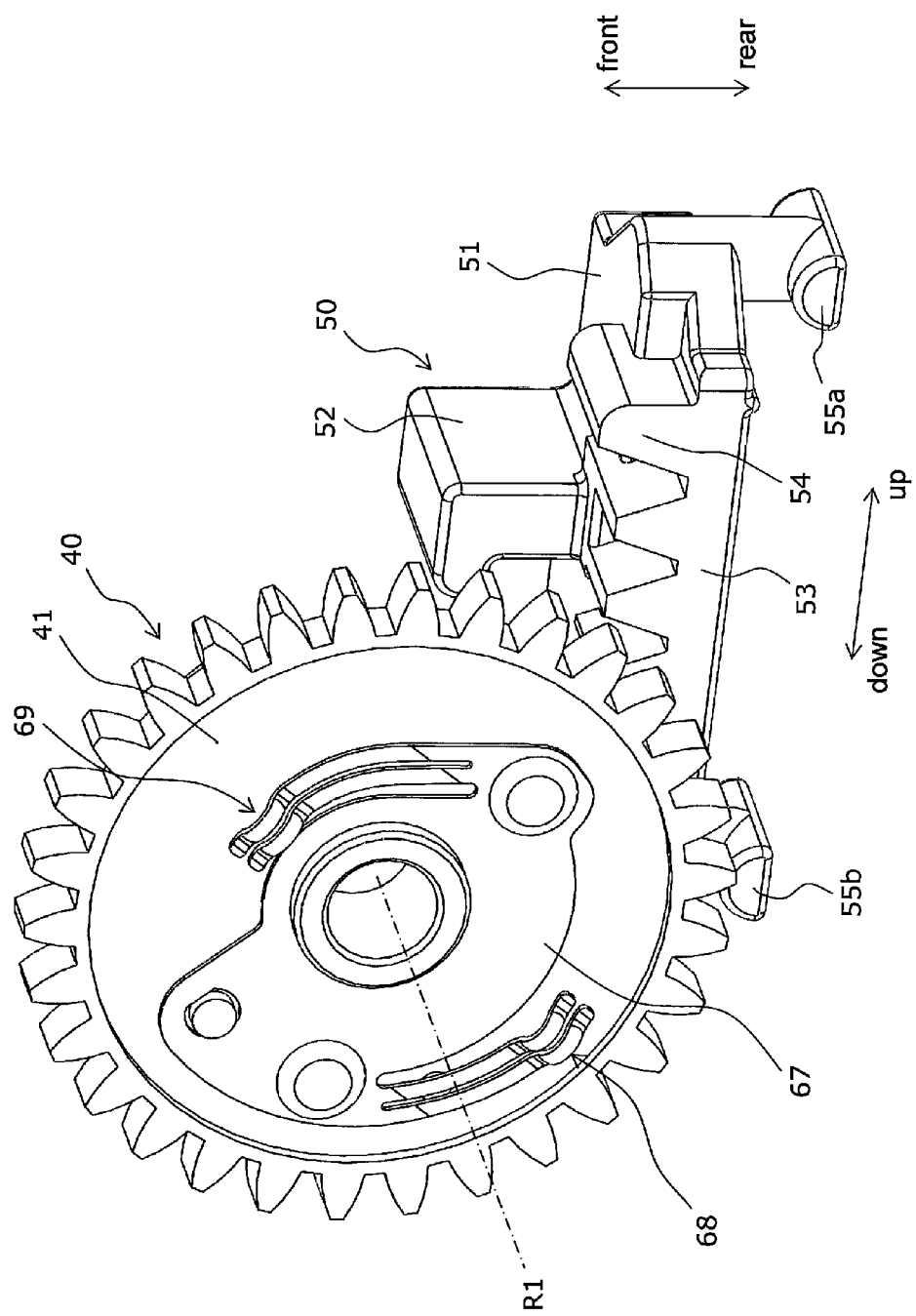
FIG. 17 is an oblique view of a charge gear 40 and a slide lever 50.

As shown in FIGS. 16 and 17, the slide lever 50 has a main body 51, a first insertion component 55a, a second insertion component 55b, a lever 52, a rack gear 53, and the cam follower 54.

The main body 51 extends in a slender shape in the up and down direction. The first insertion component 55a and the second insertion component 55b are inserted in the guide groove 45a of the gear base 45 (see FIGS. 7 and 10). This allows the slide lever 50 to move along the guide groove 45a.

The rack gear 53 and the cam follower 54 are disposed on the side face of the main body 51. The rack gear 53 (an example of a rack gear) is provided so that it can mesh with the intermittent gear 43 of the charge gear 40. The cam follower 54 (an example of a cam follower) is provided so that it can slide with the intermittent cam 42. The cam follower 54 is disposed alongside the rack gear 53 in the up and down direction. The cam follower 54 is disposed alongside the rack gear 53 along the side face of the main body 51.

The lever 52 protrudes forward from the main body 51. The lever 52 hits the distal end of the drive lever 81.

A force from the shutter drive mechanism 85 acts on the drive lever 81 so that it always moves from the second lever position P2 to the first lever position P1. Therefore, when the cam follower 54 is in contact with the intermittent cam 42, the cam follower 54 is pressed against the intermittent cam 42 by the drive lever 81.

5.3: Position Detecting Sensor 195

The position detecting sensor 195 (an example of a position detector) is provided to the focal plane shutter device 190 in order to detect the position of the charge gear 40 in the rotational direction. The position detecting sensor 195 detects the state of the shutter mechanism 191 by detecting the position of the charge gear 40 in the rotational direction. As shown in FIG. 10, the position detecting sensor 195 has a brush 67 and a switching circuit 60.

As shown in FIG. 17, the brush 67 is fixed to the charge gear 40. The brush 67 has a first brush 68 and a second brush 69. The first brush 68 is disposed at a different position from that of the second brush 69 in the circumferential direction. The first brush 68 is also disposed more on the outer peripheral side than the second brush 69.

Figure 19:
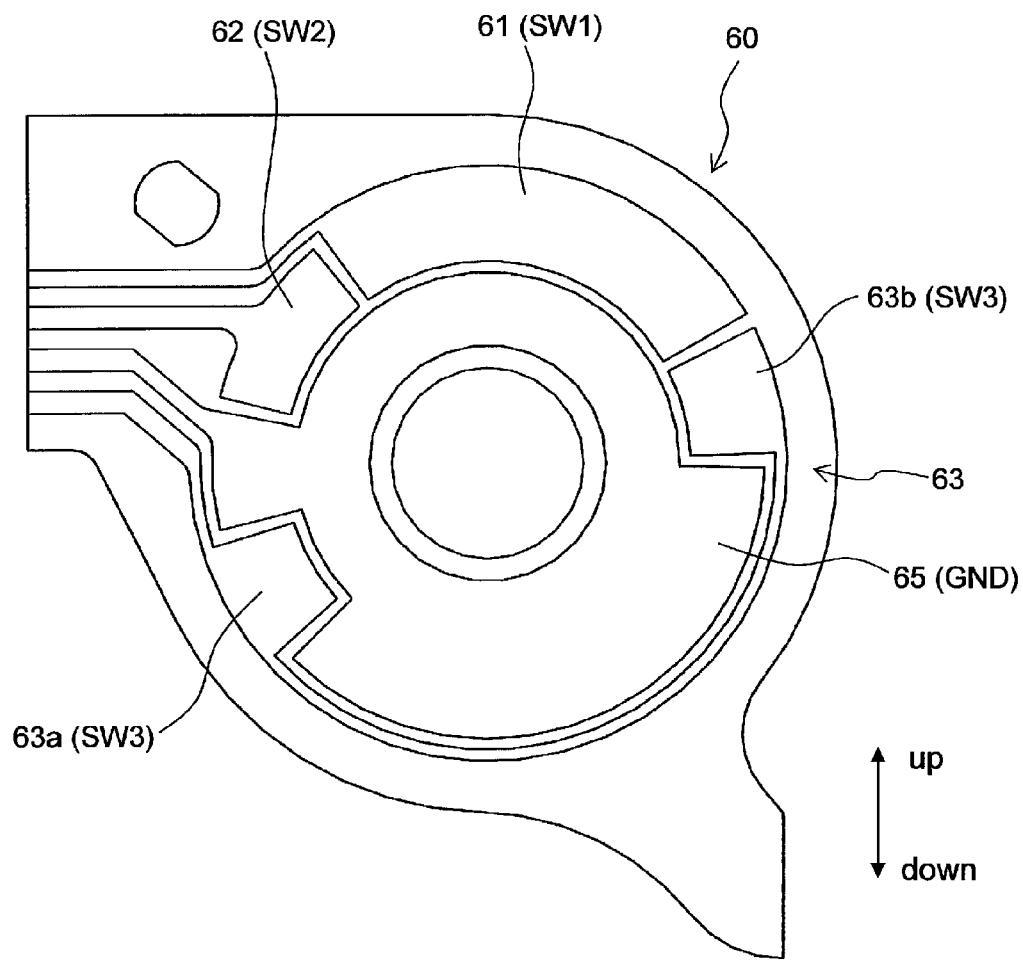
FIG. 19 is a plan view of a switching circuit 60.

As shown in FIG. 10, meanwhile, the switching circuit 60 is fixed to the gear base 45. The first brush 68 and second brush 69 of the brush 67 are in contact with the switching circuit 60. As shown in FIG. 19, the switching circuit 60 has a first contact 61, second contact 62, a third contact 63, and a ground component 65. A first switch SW1 (see FIGS. 37 to 40) is constituted by the first contact 61 and the brush 67, a second switch SW2 (see FIGS. 37 to 40) is constituted by the second contact 62 and the brush 67, and a third switch SW3 (see FIGS. 37 to 40) is constituted by the third contact 63 and the brush 67.

As shown in FIG. 19, in this embodiment, the third contact 63 has a first portion 63a and a second portion 63b. Providing the first portion 63a and the second portion 63b allows the third switch SW3 to be used to detect the position of the charge gear 40 at two places. As will be discussed below, the first portion 63a produces a first ON signal of the third switch SW3. The first ON signal of the third switch SW3 is used to adjust the timing at which the charging of the shutter mechanism 191 is started (time T2). The second portion 63b produces a second ON signal of the third switch SW3. The second ON signal of the third switch SW3 indicates that the charge gear 40 is disposed at the first position shown in FIG. 24, and is used to determine whether or not the shutter mechanism 191 has left the closed state prior to the completion of reading the image data. The position detecting sensor 195 detects that the charge gear 40 is disposed at the first position shown in FIG. 24, and thereby detects a first state from the start of charging of the shutter mechanism 191 until the shutter mechanism 191 leaves the closed state.

Figure 25:
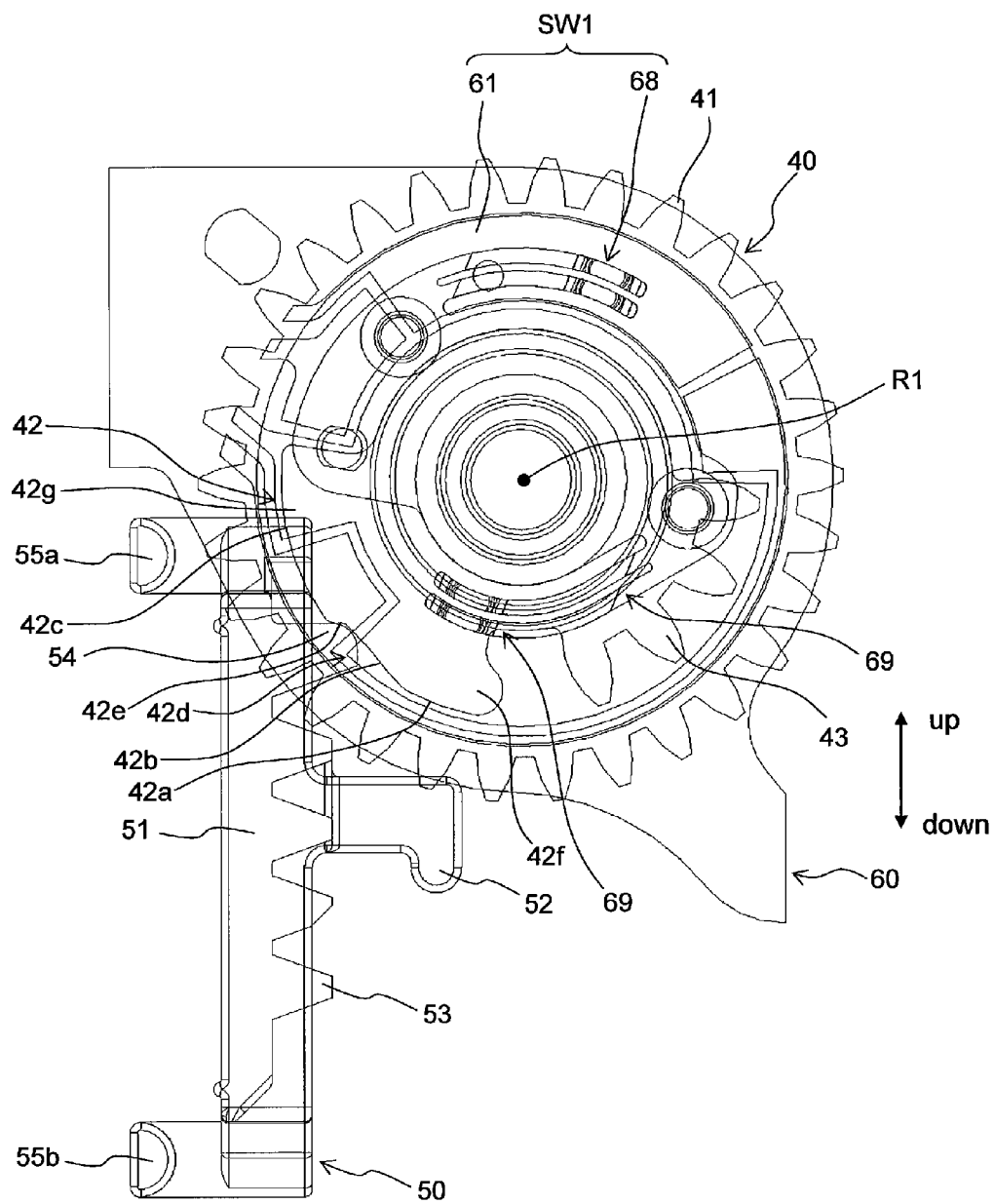
FIG. 25 is a plan view of the charge gear 40 and the slide lever 50 (states C and D)

The ON signal of the first switch SW1 indicates that the charge gear 40 is disposed at the second position shown in FIG. 25, and is used to detect a second state immediately after the shutter mechanism 191 has entered its open state. The position detecting sensor 195 detects that the charge gear 40 is disposed at the second position shown in FIG. 25, and thereby detects a second state of the shutter mechanism 191.

The second brush 69 is always in contact with the ground component 65, but the first brush 68 is in contact with either the first contact 61, the second contact 62, the third contact 63, or the ground component 65, depending on the rotational angle of the charge gear 40. The switching circuit 60 is electrically connected to the camera controller 140. The position of the charge gear 40 in the rotational direction can be detected by the brush 67 and the switching circuit 60, and the state of the shutter mechanism 191 can also be detected based on the detected position of the charge gear 40 in the rotational direction by the camera controller 140.

6: Detailed Configuration of Camera Controller 140

The camera controller 140 controls the CMOS image sensor 110 and the shutter drive device 194. The camera controller 140 performs its control as described below in order to shorten the overall drive time of the focal plane shutter device 190.

For example, as shown in FIGS. 37 to 40, the camera controller 140 instructs the shutter drive device 194 to start charging the shutter mechanism 191 while image data is being read from the CMOS image sensor 110. Consequently, the start of live-view display starts sooner and the continuous capturing rate can be increased than when charging is started after the image data has all been read.

However, if the charging of the shutter mechanism 191 is started during the reading of the image data, it is possible that the shutter mechanism 191 will leave its closed state before the reading of the image data is complete. If the shutter mechanism 191 leaves its closed state before the reading of the image data is complete, light will be incident on the CMOS image sensor 110, so this affects the reading of the image data.

In view of this, along with the above-mentioned control, the camera controller 140 controls the shutter drive device 194 so that the timing at which the shutter mechanism 191 leaves its closed state is delayed when the position detecting sensor 195 detects that the shutter mechanism 191 is in a state just prior to leaving the closed state (a first state) before the CMOS image sensor 110 has completed reading the image data.

Figure 38:
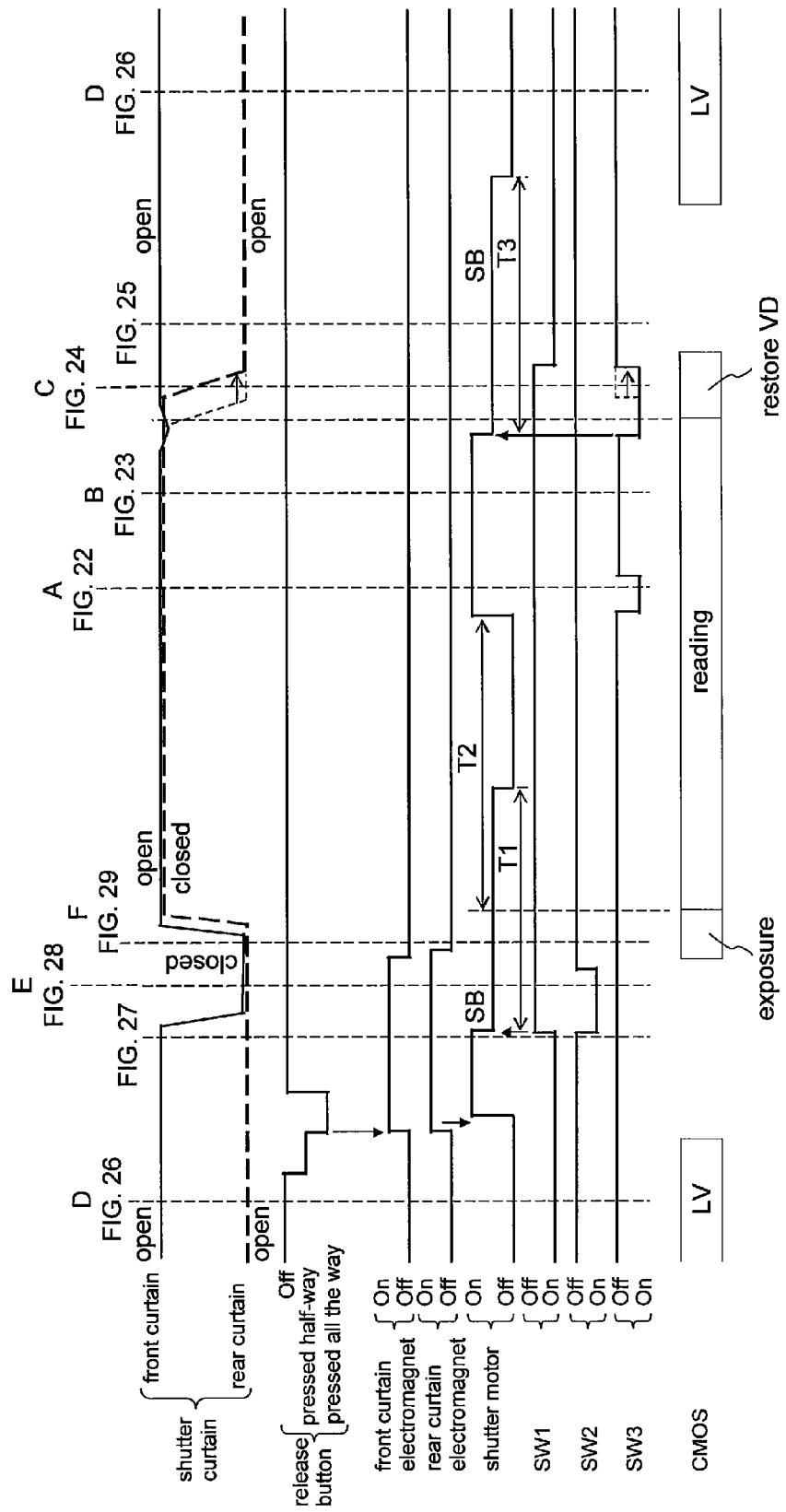
FIG. 38 is a time chart (single capture mode: pattern 2)
Figure 40:
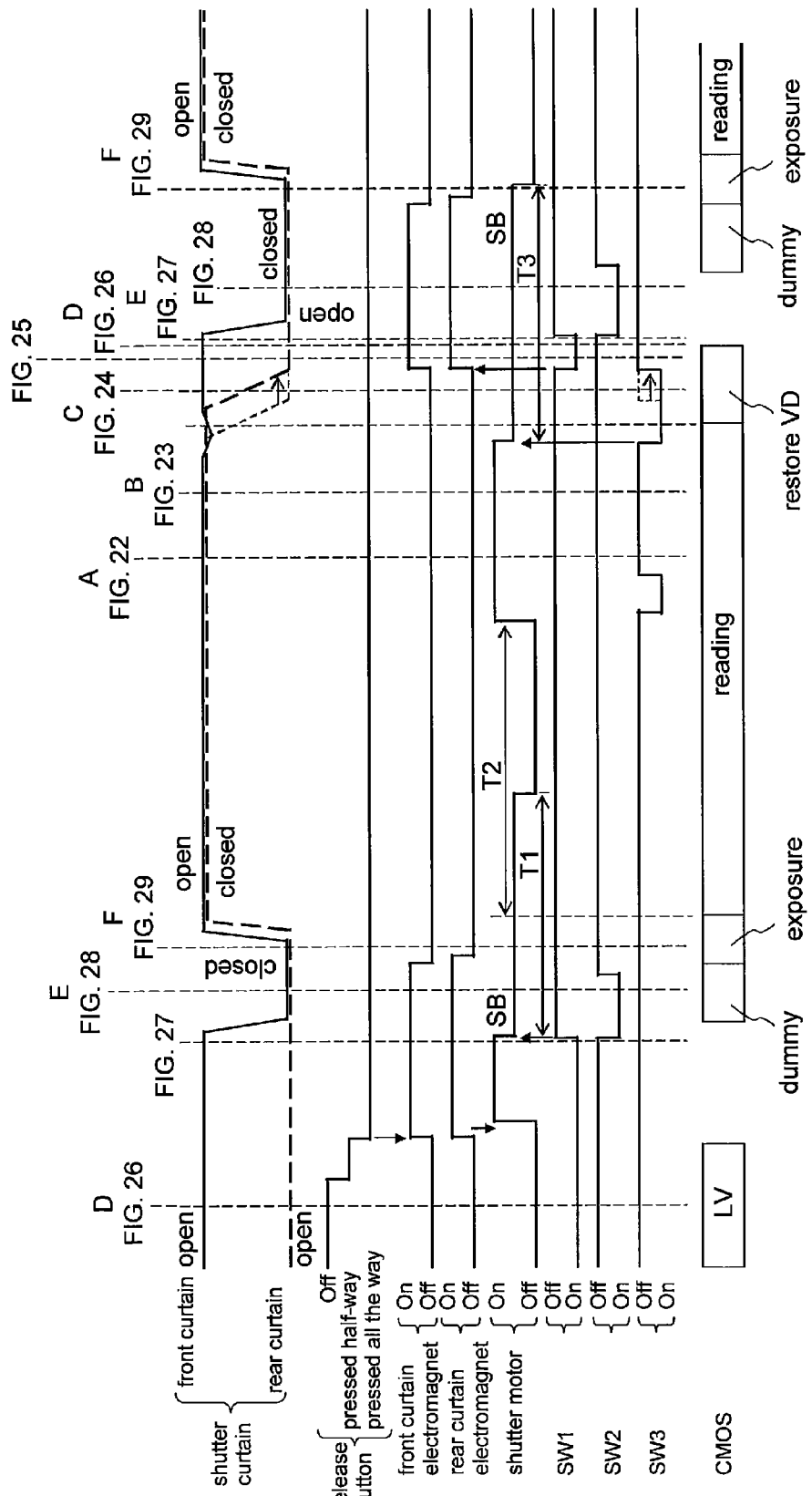
FIG. 40 is a time chart (continuous capture mode: pattern 2)

More specifically, the camera controller 140 restricts the drive of the shutter mechanism 191 by the shutter drive device 194 at a timing that is earlier than when the shutter mechanism 191 is in the first state after the completion of reading the image data when the position detecting sensor 195 has detected that the shutter mechanism 191 is in the first state before the CMOS image sensor 110 has completed reading the image data (see FIGS. 38 and 40). Here, the camera controller 140 electrically brakes the shutter motor 46 in order to restrict the drive of the shutter mechanism 191 by the shutter drive device 194. In this embodiment, the camera controller 140 short-brakes the shutter motor 46. Consequently, the shutter mechanism 191 is prevented from leaving its closed state prior to the completion of the reading of image data, which would otherwise be caused by the inertial rotation of the charge gear 40.

Further, in order to keep the shutter mechanism 191 from leaving its closed state prior to the completion of the reading of image data, the camera controller 140 controls the timing at which charging is started by the shutter motor 46 on the basis of the stopping position of the charge gear 40 detected by the position detecting sensor 195.

More specifically, the camera controller 140 adjusts the time from when the CMOS image sensor 110 starts reading the image data until the drive of the shutter motor 46 is started, on the basis of the stopping position of the charge gear 40 detected by the position detecting sensor 195. In continuous capture mode, the shutter motor 46 is driven continuously, so the temperature of the shutter motor 46 will be higher than in single capture mode, for example, and the charge gear 40 is more likely to rotate too far in continuous capturing than in single capture mode. Therefore, in this embodiment, the camera controller 140 sets the time T2 in continuous capture mode to be longer than the time T2 in single capture mode (an example of stand-by time).

For example, as will be discussed below, when the position detecting sensor 195 has detected that the charge gear 40 has stopped at a first stopping position (a position at which the second switch SW2 is ON) in single capture mode, the camera controller 140 sets the time T2 from when the CMOS image sensor 110 starts reading the image data until the drive of the shutter motor 46 is started to be a time T21A (an example of a first time, and an example of a first single capture stand-by time). Also, when the position detecting sensor 195 has detected that the charge gear 40 has stopped at a second stopping position (a position at which the second switch SW2 is OFF and the third switch SW3 is OFF) in single capture mode, the camera controller 140 sets the time T2 from when the CMOS image sensor 110 starts reading the image data until the drive of the shutter motor 46 is started to be a time T22A (an example of a second time, and an example of a second single capture stand-by time). Further, when the position detecting sensor 195 has detected that the charge gear 40 has stopped at a third stopping position (a position at which the third switch SW3 is ON) in single capture mode, the camera controller 140 sets the time T2 from when the CMOS image sensor 110 starts reading the image data until the drive of the shutter motor 46 is started to be a time T23A (an example of a third time, and an example of a third single capture stand-by time).

Meanwhile, when the position detecting sensor 195 has detected that the charge gear 40 has stopped at the first stopping position (a position at which the second switch SW2 is ON) in continuous capture mode, the camera controller 140 sets the time T2 (an example of a stand-by time) to be a time T21B (an example of a first time, and an example of a first continuous capture stand-by time) that is longer than the time T21A. Also, when the position detecting sensor 195 has detected that the charge gear 40 has stopped at the second stopping position (a position at which the second switch SW2 is OFF and the third switch SW3 is OFF) in continuous capture mode, the camera controller 140 sets the time T2 to be a time T22B (an example of a second time, and an example of a second continuous capture stand-by time) that is longer than the time T22A. Further, when the position detecting sensor 195 has detected that the charge gear 40 has stopped at the third stopping position (a position at which the third switch SW3 is ON) in continuous capture mode, the camera controller 140 sets the time T2 to be a time T23B (an example of a third time, and an example of a third continuous capture stand-by time) that is longer than the time T23A.

Thus, the camera controller 140 adjusts the time T2 on the basis of the imaging mode and the stopping position of the charge gear 40.

7: Operation of Focal Plane Shutter Device 190

The operation of the focal plane shutter device 190 will now be described through reference to FIGS. 20 to 29. The cam line in FIG. 21 shows the distance from the rotational axis R1 of the charge gear 40 to the outer peripheral face of the intermittent cam 42.

Figure 20:
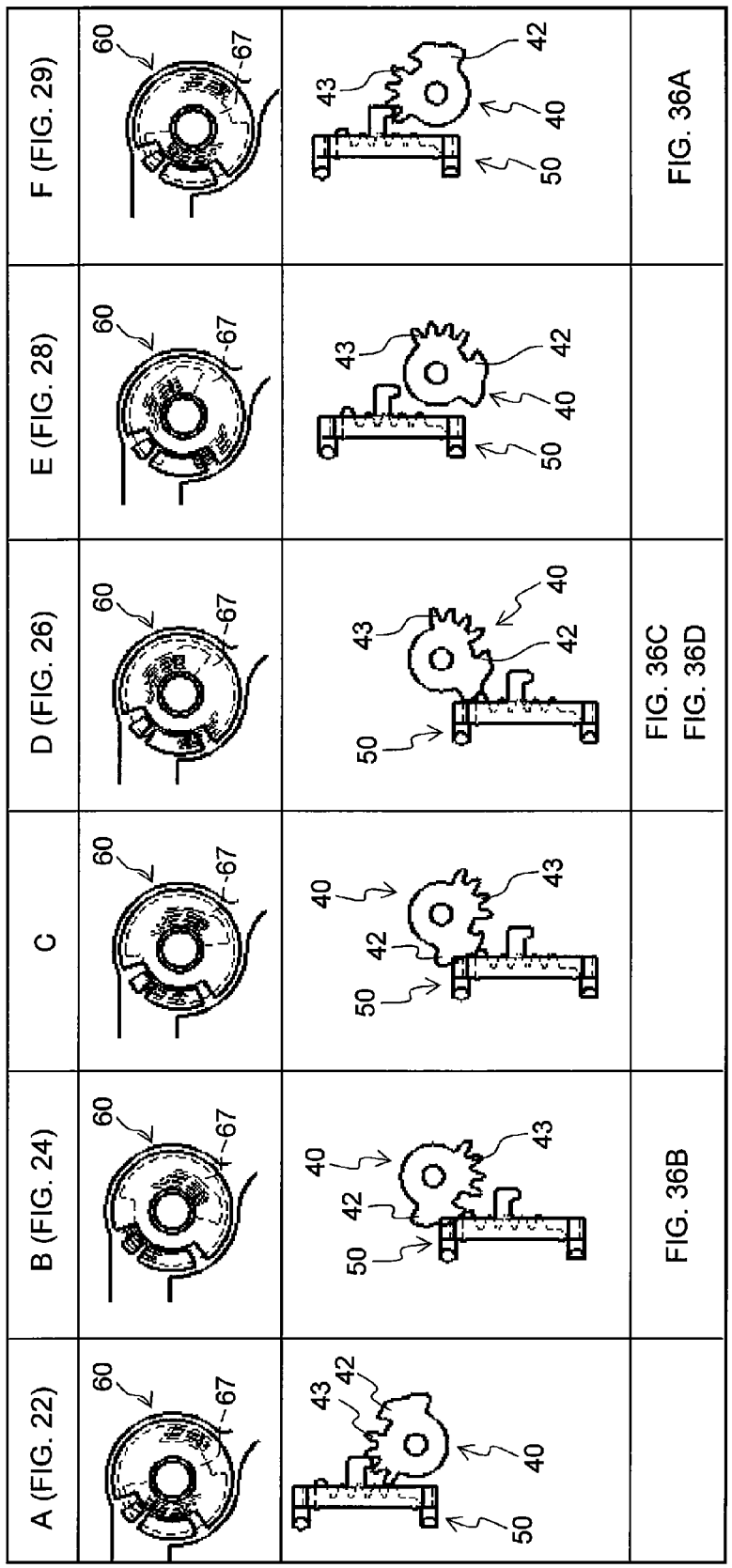
FIG. 20 shows the state of the charge gear 40 and the slide lever 50.
Figure 21:
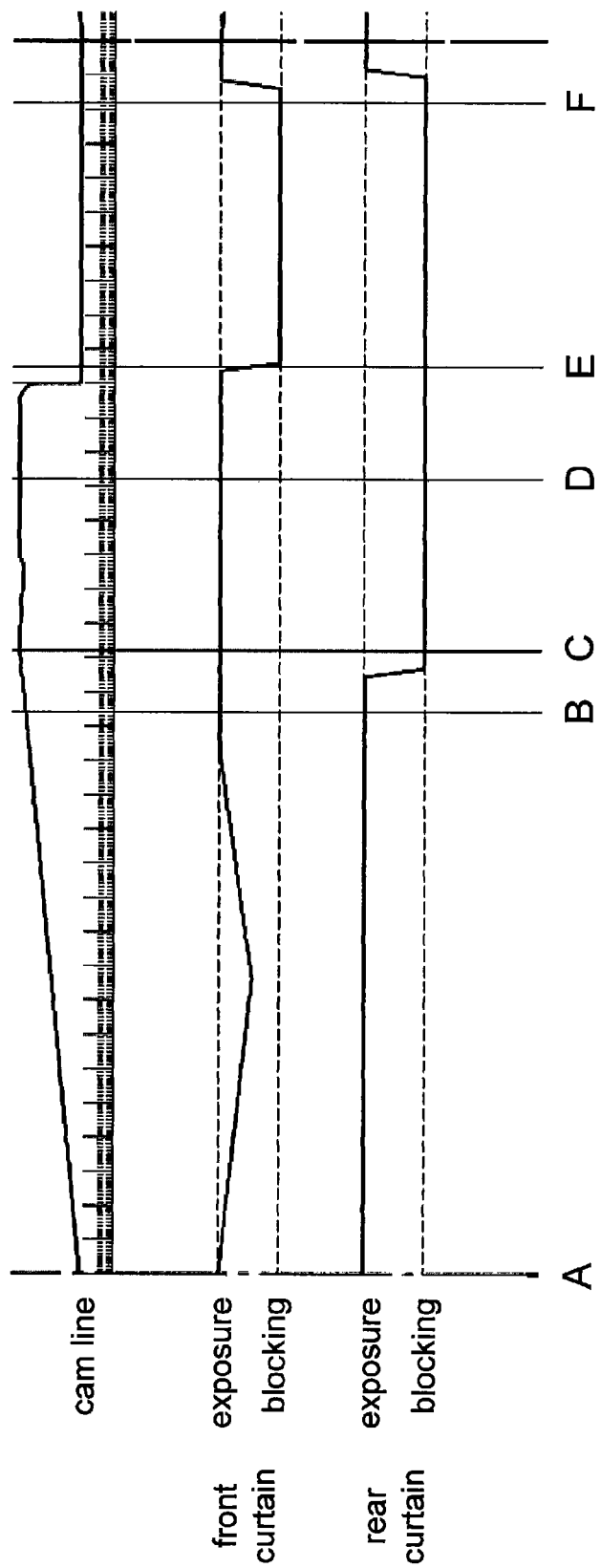
FIG. 21 is a cam curve of an intermittent cam 42.
Figure 22:
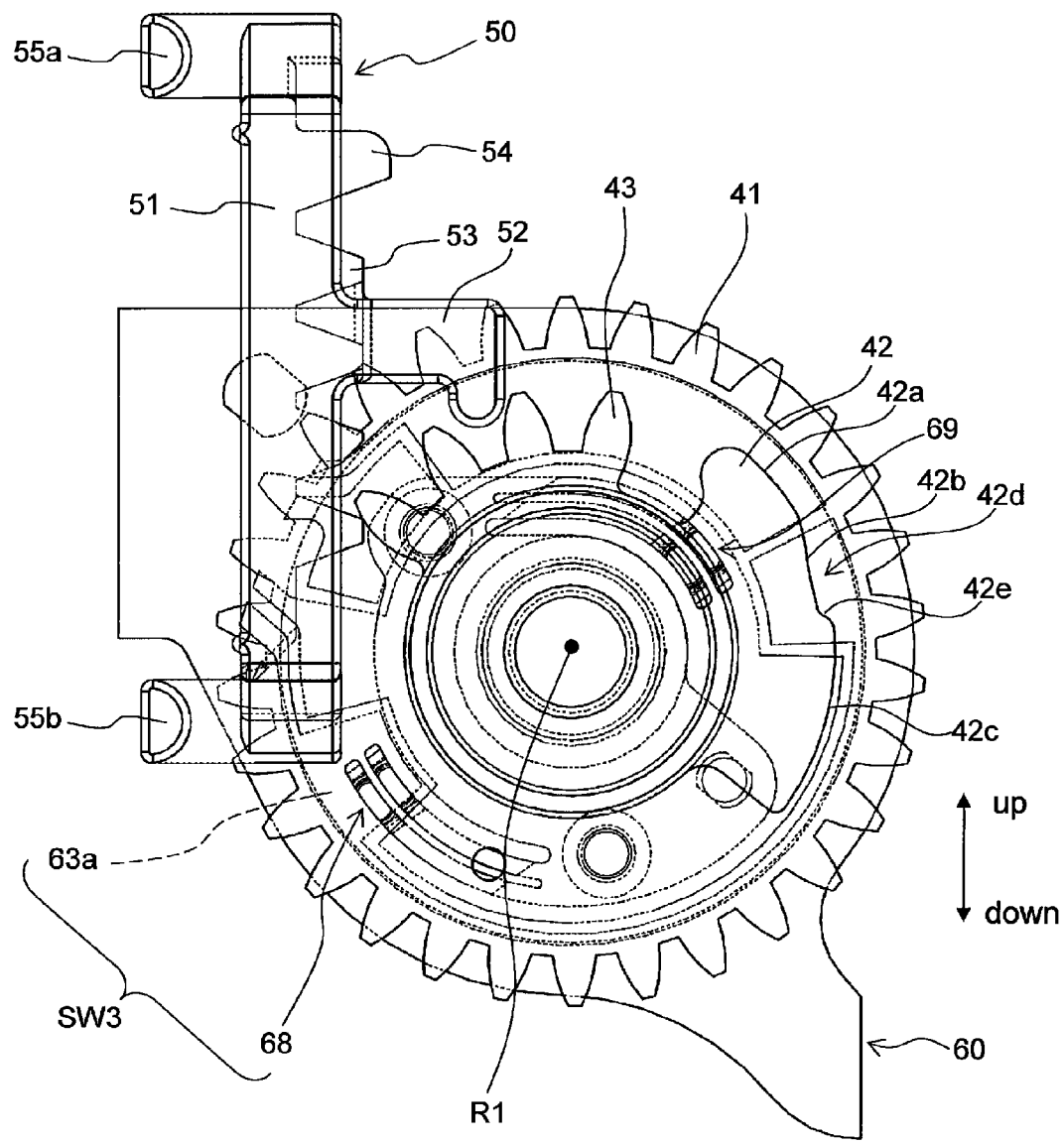
FIG. 22 is a plan view of the charge gear 40 and the slide lever 50 (state A)
Figure 23:
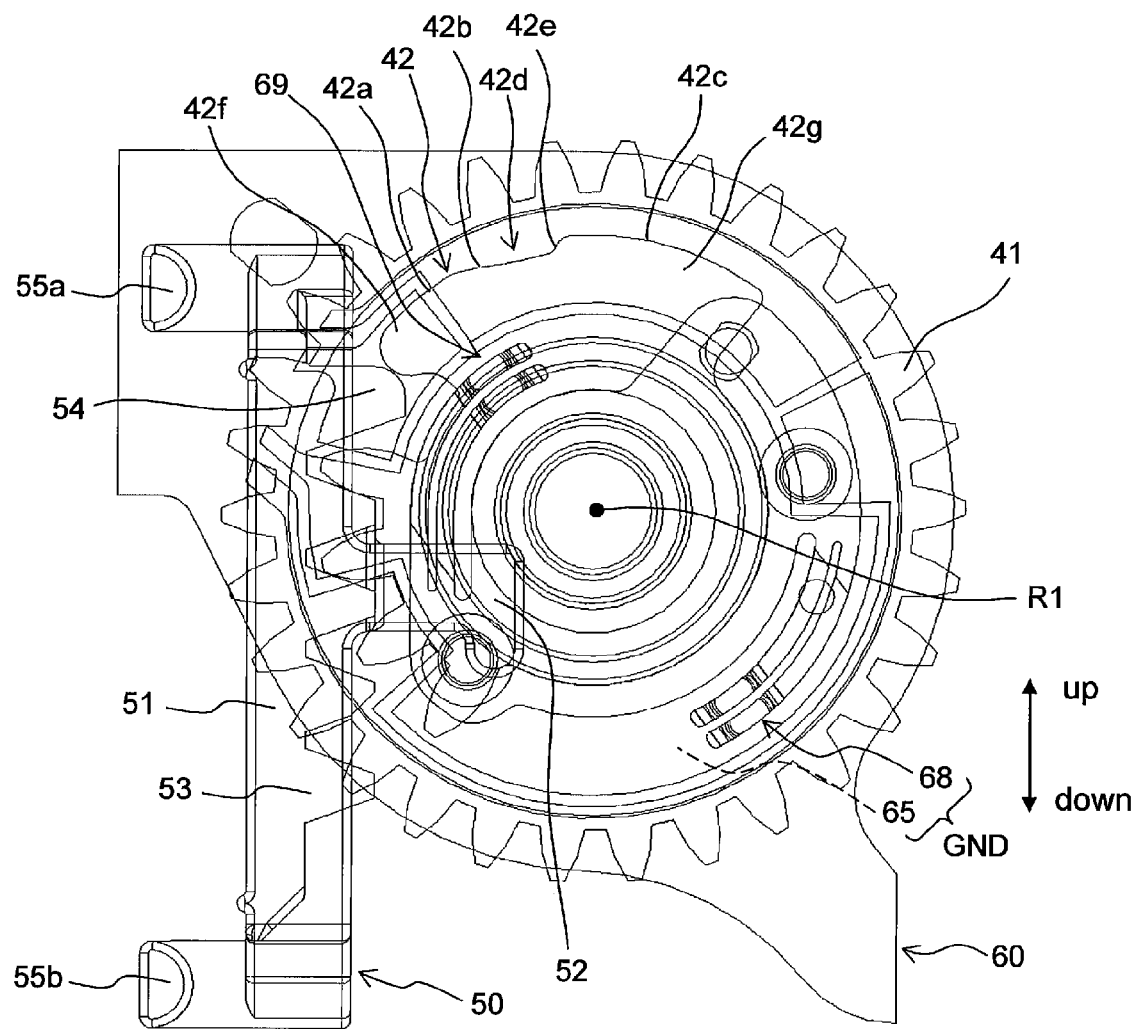
FIG. 23 is a plan view of the charge gear 40 and the slide lever 50.
Figure 24:
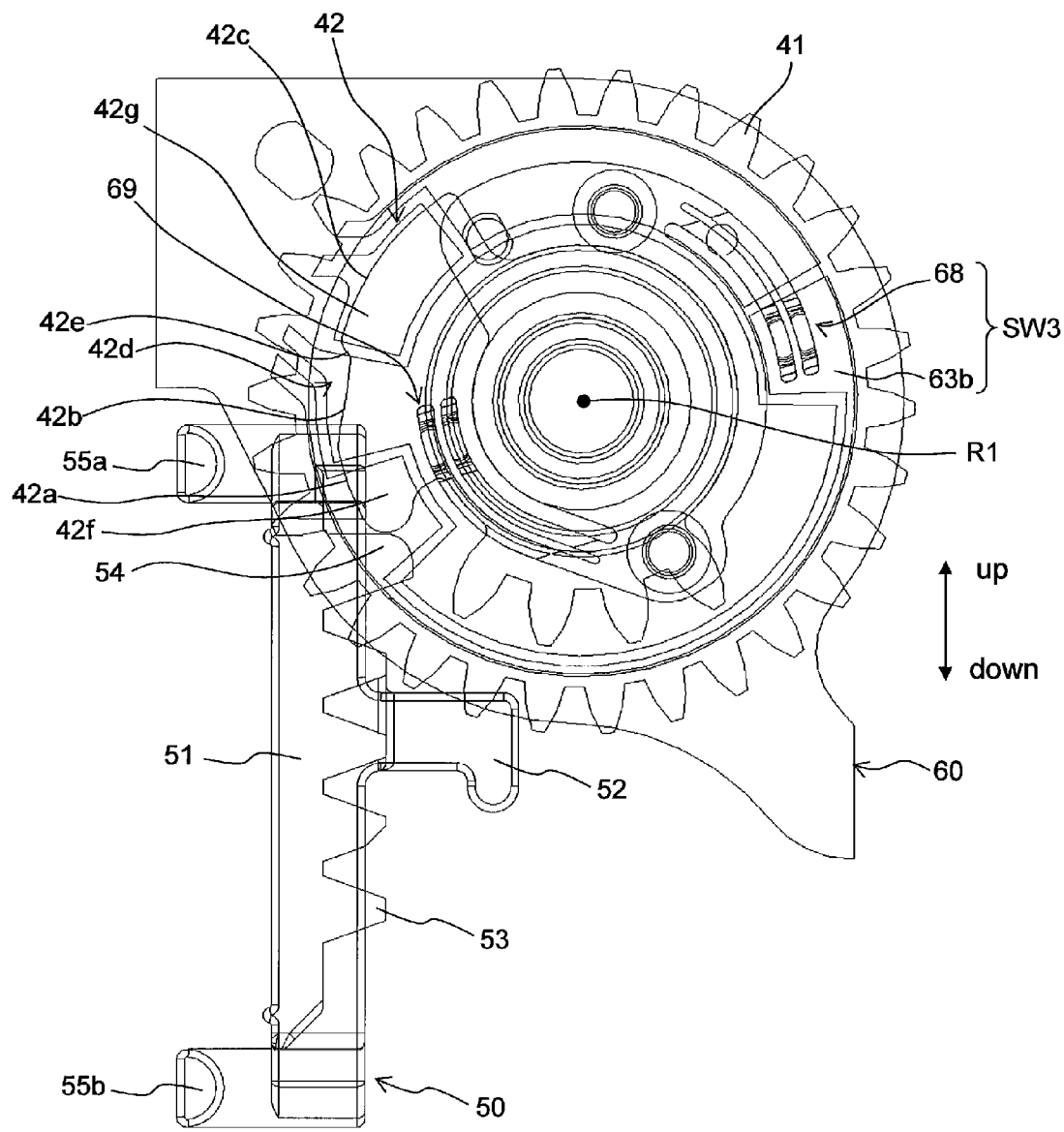
FIG. 24 is a plan view of the charge gear 40 and the slide lever 50 (state B)

As shown in FIGS. 20 and 21, if the positional relation between the charge gear 40 and the slide lever 50 is expressed as states A to F, state A is the state just prior to when the slide lever 50 is driven by the charge gear 40. In this state A, the intermittent gear 43 of the charge gear 40 is in contact with the rack gear 53 of the slide lever 50 (FIG. 22). When the charge gear 40 rotates from this state A, the intermittent gear 43 meshes with the rack gear 53, and the slide lever 50 is driven downward by the intermittent gear 43. The intermittent cam 42 comes into contact with the cam follower 54 just before the intermittent gear 43 unmeshes from the rack gear 53 (FIG. 23). When the charge gear 40 rotates further, the intermittent gear 43 and the rack gear 53 unmesh, and the cam follower 54 is pushed by the intermittent cam 42 (FIG. 24). As a result, the charge gear 40 and the slide lever 50 enter state B, and the shutter mechanism 191 enters the state shown in FIG. 36B. This state B corresponds to a first state just prior to when the shutter mechanism 191 leaves its closed state.

Figure 26:
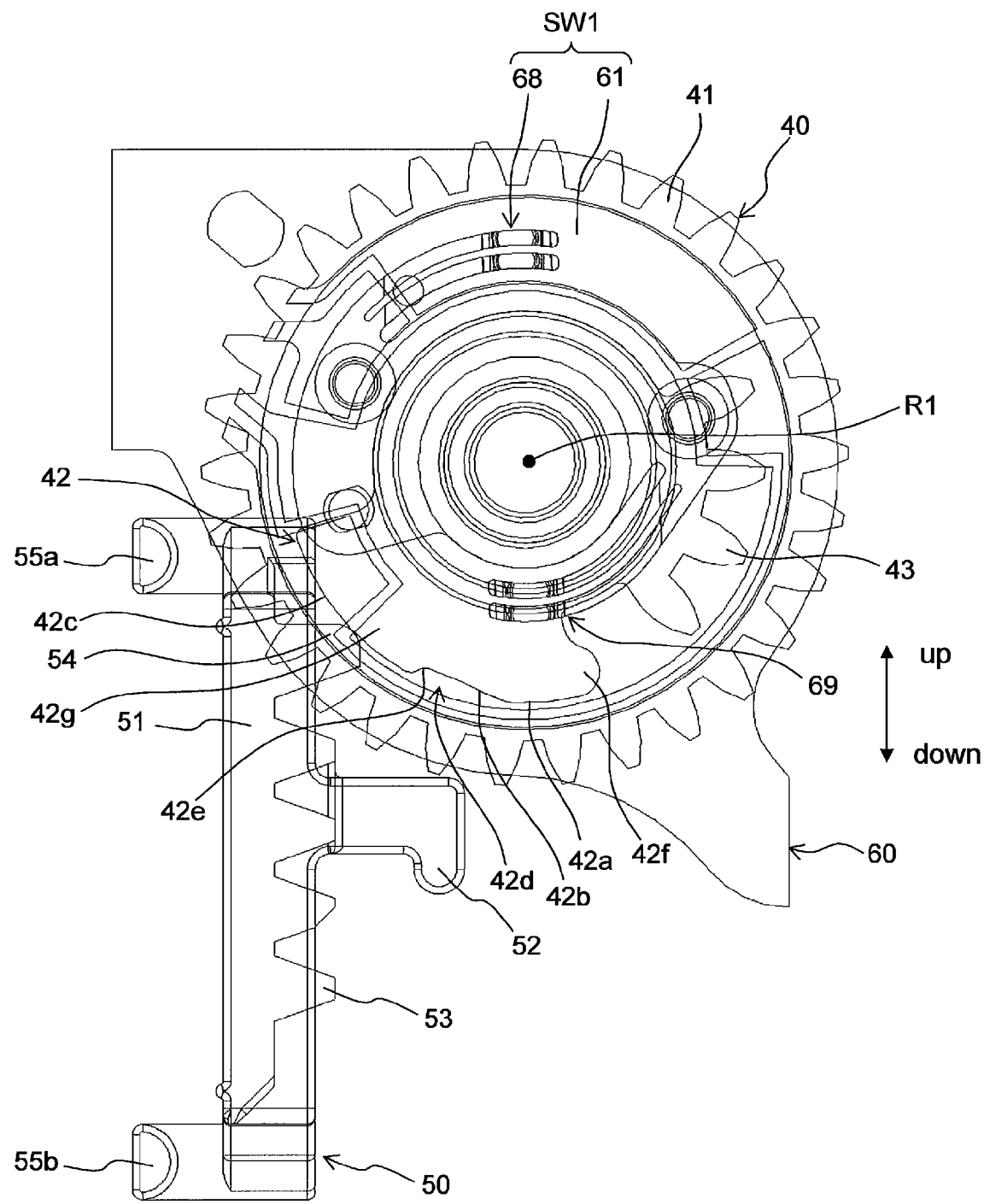
FIG. 26 is a plan view of the charge gear 40 and the slide lever 50 (state D)

When the charge gear 40 rotates further, the cam follower 54 slides with the intermittent cam 42 while being guided downward by the intermittent cam 42, and the charge gear 40 and the slide lever 50 enter the state C. This state C corresponds to a second state immediately after the shutter mechanism 191 has entered its open state. In state C, short braking is applied to the shutter motor 46, and the shutter motor 46 comes to a halt. The rotation of the charge gear 40 continues somewhat by momentum even while the short braking is being applied or after it has been completed, and the cam follower 54 can drop into the recess 42d of the intermittent cam 42, for example (FIG. 25). Since rotational resistance is imparted to the charge gear 40 when the cam follower 54 drops into the recess 42d and rides up over the guide face 42e of the recess 42d, the size of the intermittent cam 42 in the rotational direction can be smaller and the charge gear 40 can be prevented from rotating too far by momentum and causing the cam follower 54 to come out of the intermittent cam 42. For instance, the rotation of the charge gear 40 can stop in state D in which the cam follower 54 is in contact with the third sliding face 42c of the intermittent cam 42 (FIGS. 20 and 26). The shutter mechanism 191 here is in the state shown in FIG. 36C. In state D, since the position of the slide lever 50 is mechanically held by the intermittent cam 42, the drive lever 81 is held at the second lever position P2 even when no power is supplied to the shutter motor 46. Therefore, the open state of the shutter mechanism 191 can be mechanically maintained after the completion of charging.

Figure 27:
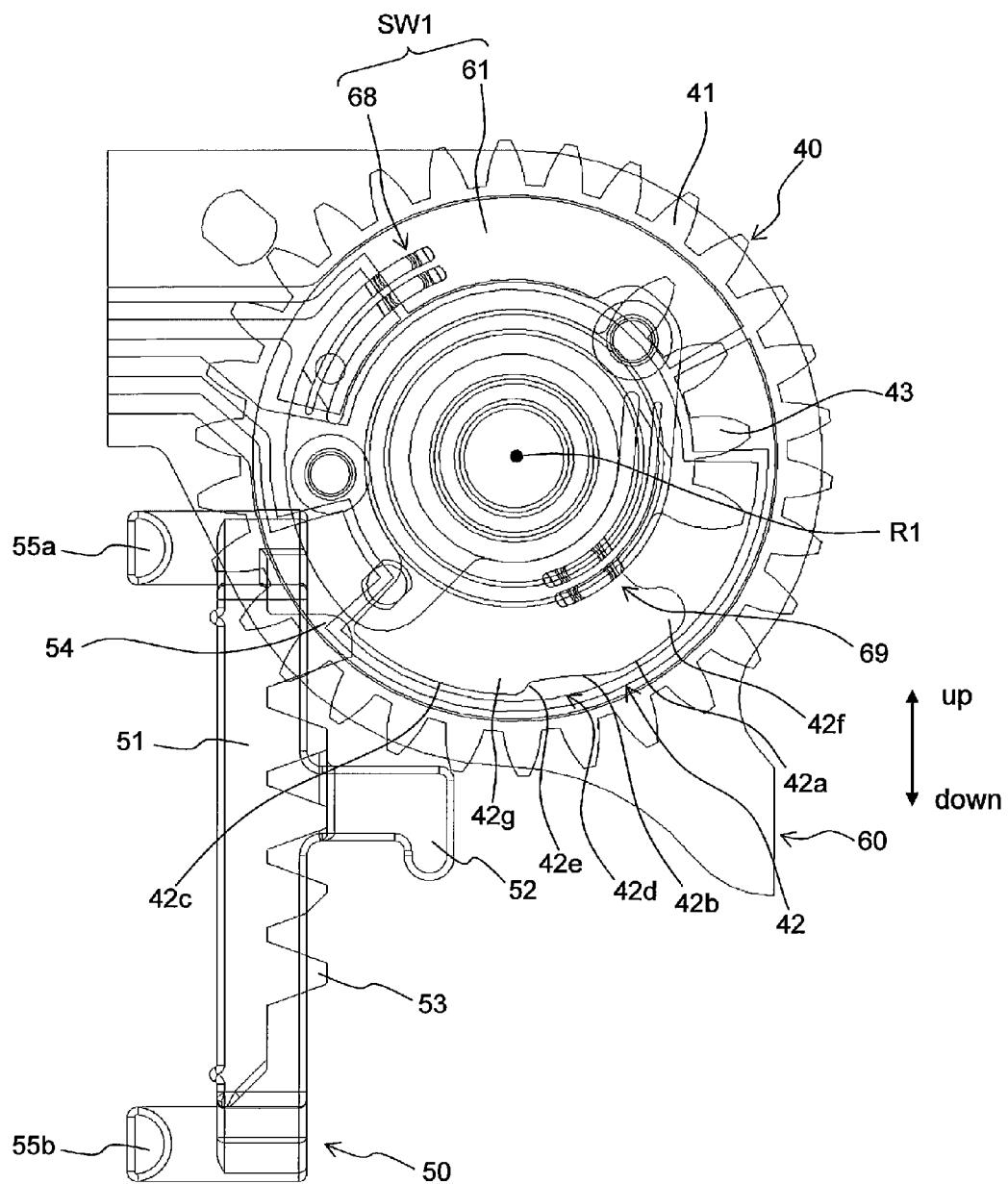
FIG. 27 is a plan view of the charge gear 40 and the slide lever 50 (state E)

When slit exposure imaging is performed, drive of the shutter motor 46 is begun from state D shown in FIG. 20, and the charge gear 40 rotates. When the charge gear 40 rotates, this disconnects the intermittent cam 42 and the cam follower 54 (FIG. 27). As a result, the slide lever 50 is pushed upward this time by the drive lever 81 of the shutter mechanism 191, and the slide lever 50 moves upward along with the drive lever 81 (state E in FIG. 20, and FIG. 28).

Figure 29:
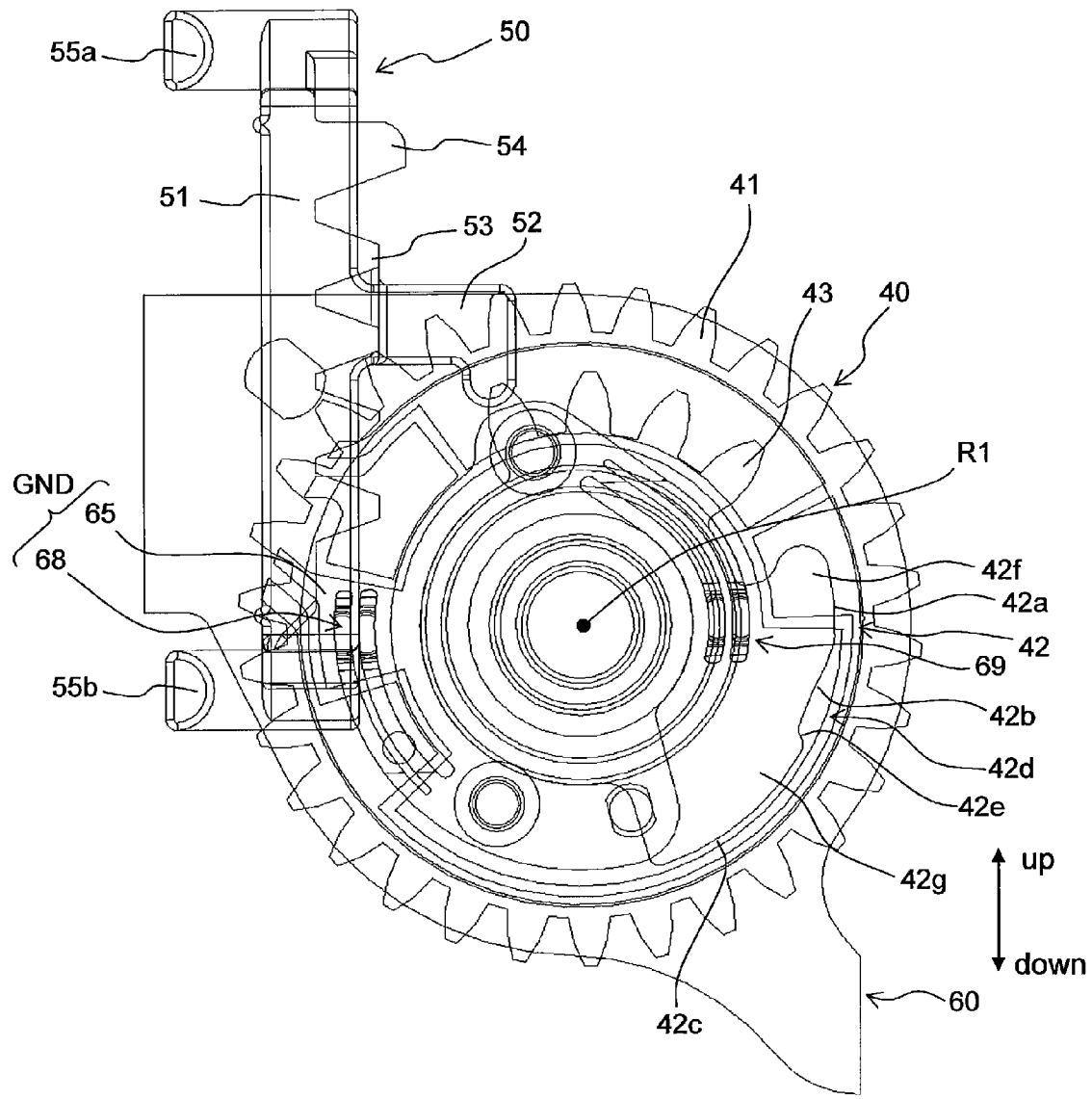
FIG. 29 is a plan view of the charge gear 40 and the slide lever 50 (state F)

After this, the shutter motor 46 stops, the charge gear 40 rotates under momentum to the position shown in FIG. 29 (state F in FIG. 20), and the shutter mechanism 191 enters the state shown in FIG. 36A. Even if the charge gear 40 should rotate too far under momentum, as shown in FIG. 22, rotation of the charge gear 40 will stop when the intermittent gear 43 comes into contact with the rack gear 53 (state A in FIG. 20). Therefore, the charge gear 40 can be prevented from rotating too far by the rack gear 53 of the slide lever 50.

8: Operation of Digital Camera 1

8.1: Operation in Single Capture Mode

Figure 30:
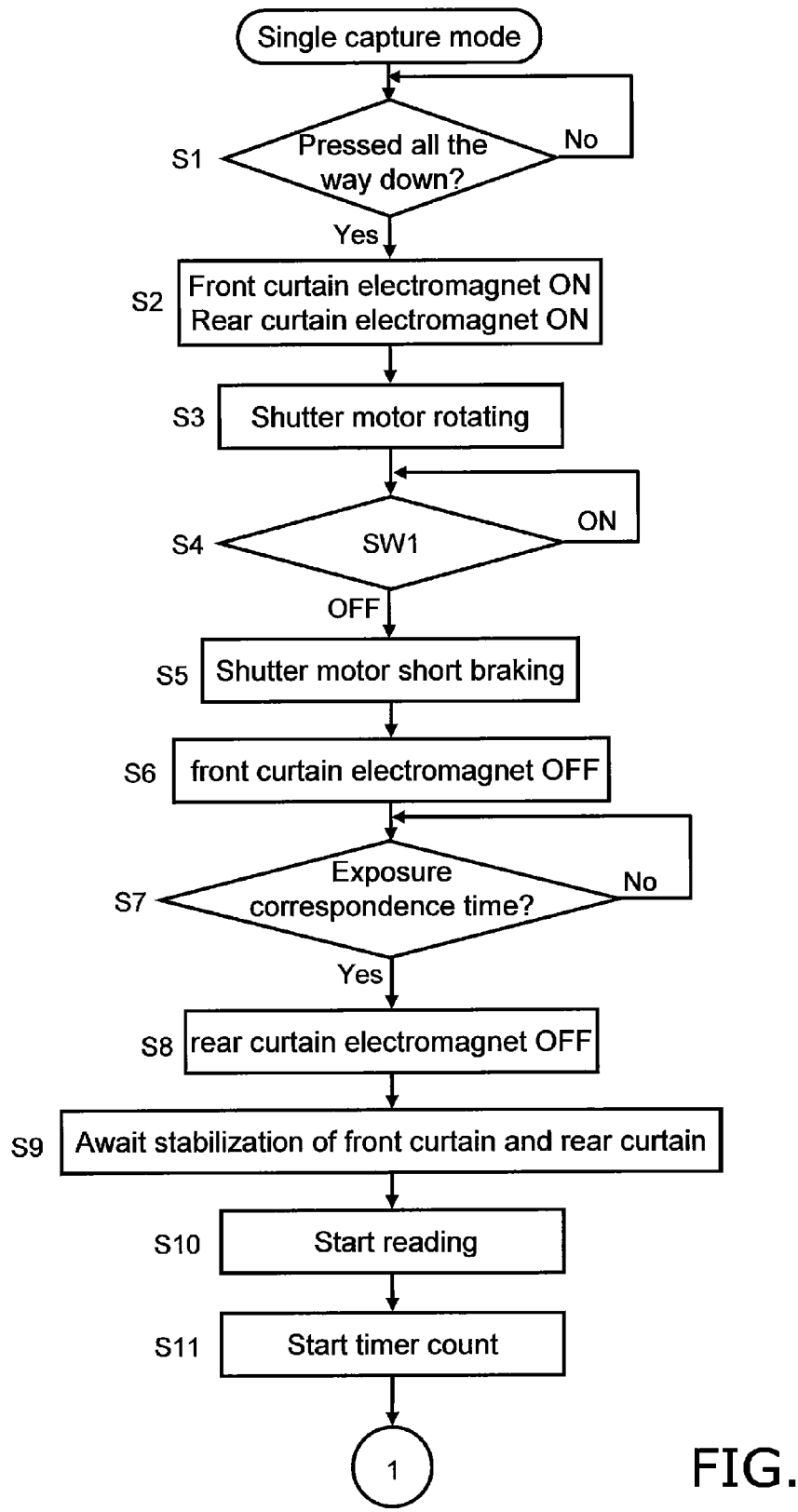
FIG. 30 is a flowchart (single capture mode)
Figure 31:
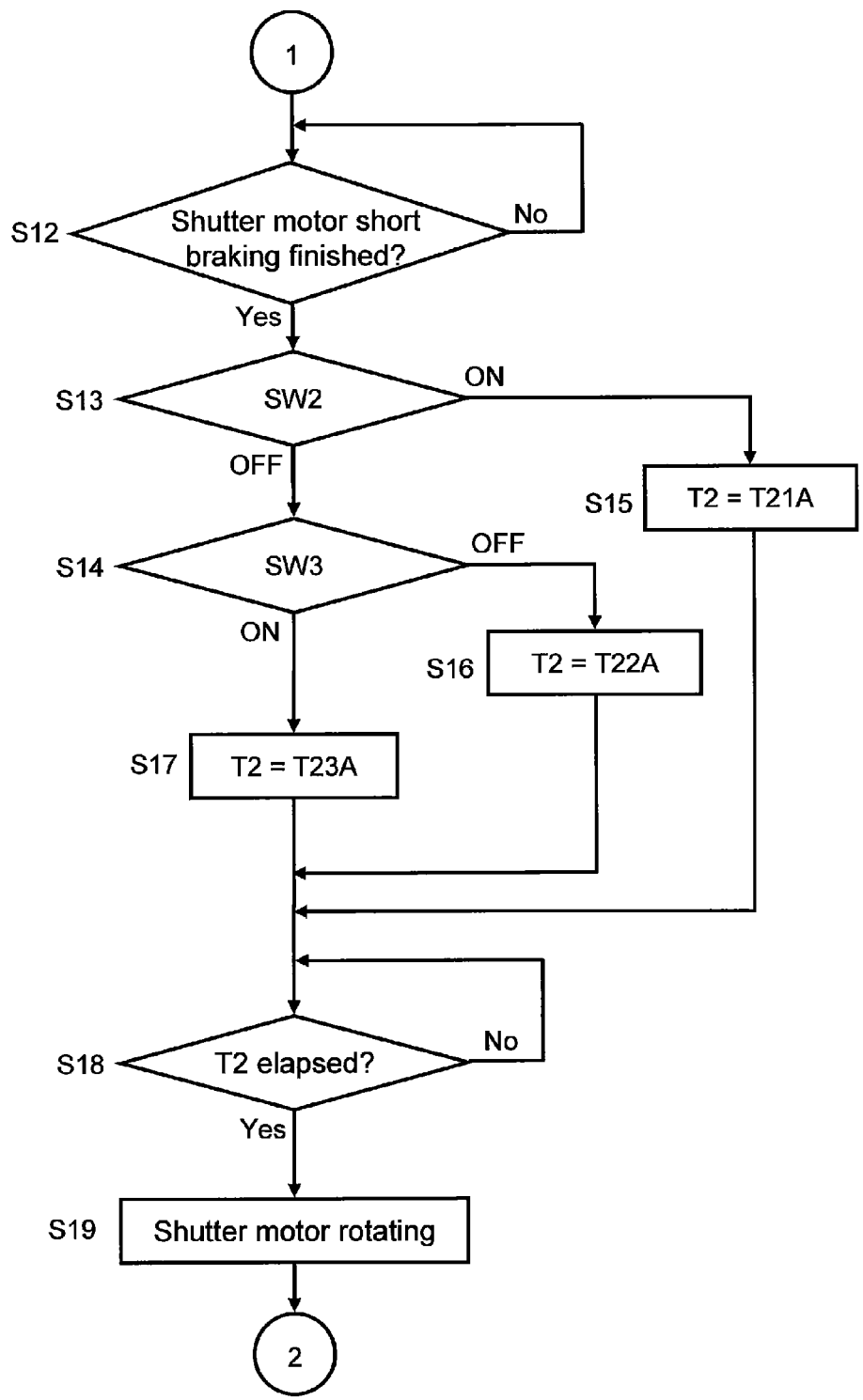
FIG. 31 is a flowchart (single capture mode)
Figure 32:
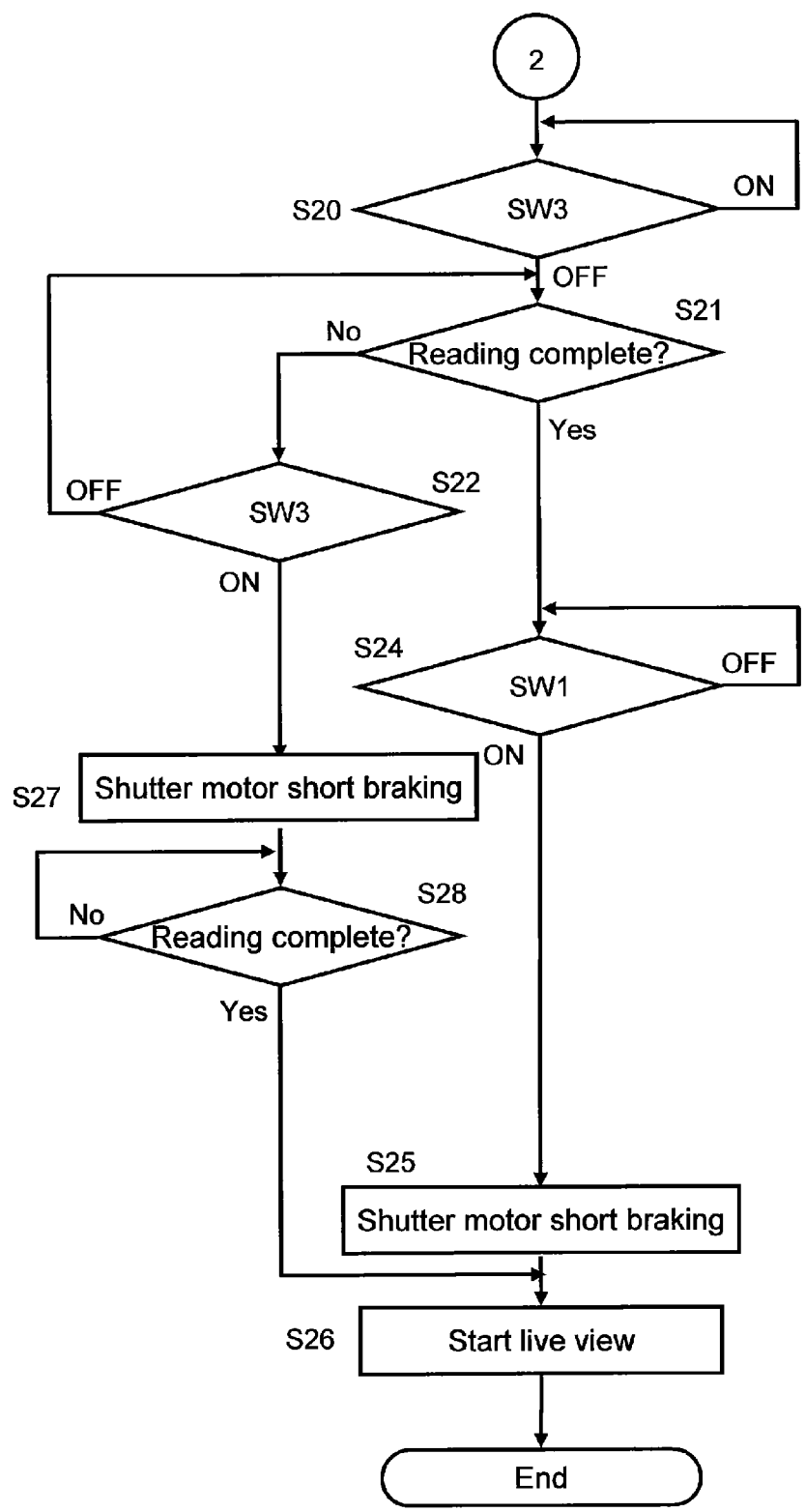
FIG. 32 is a flowchart (single capture mode)
Figure 37:
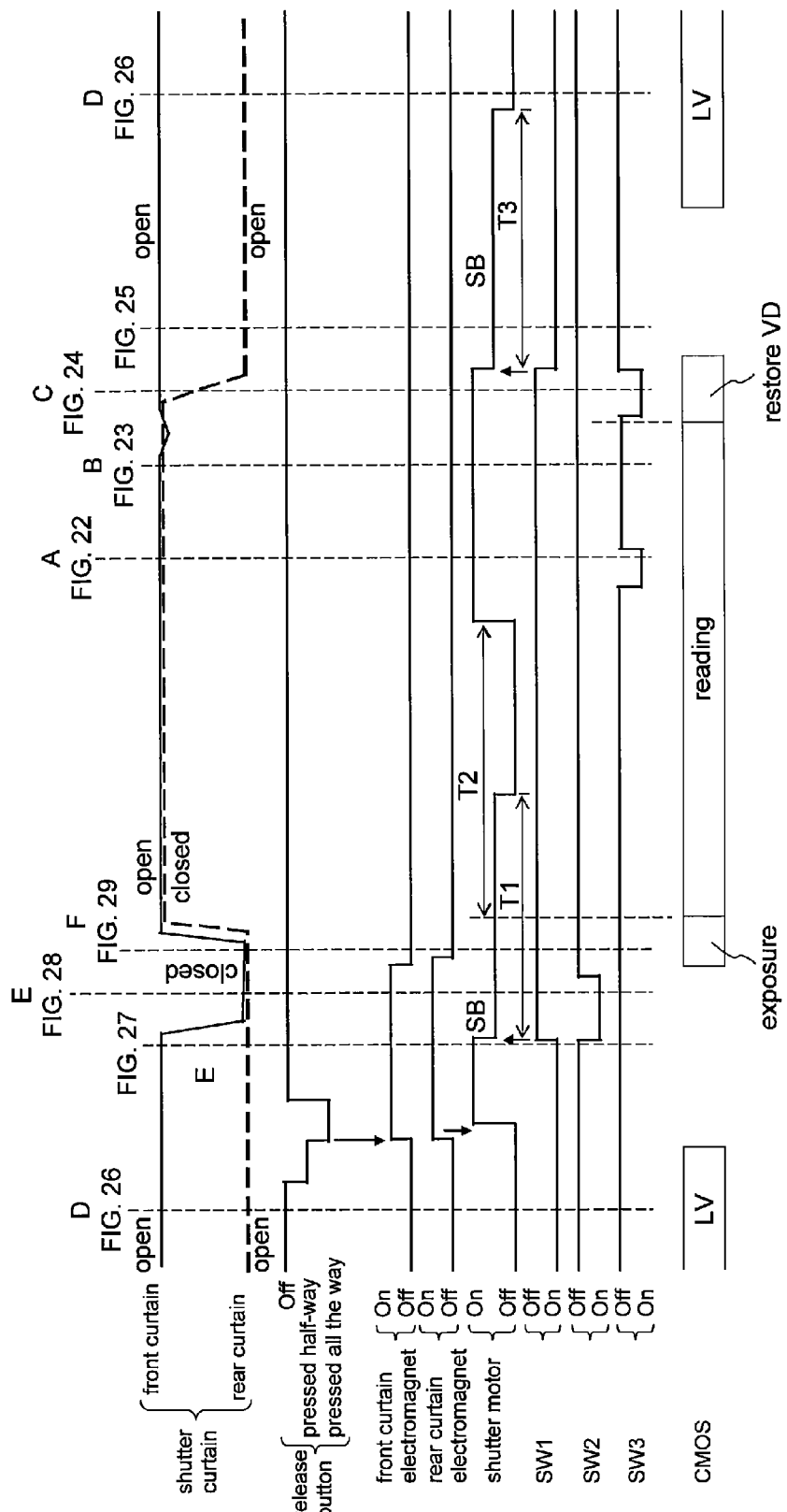
FIG. 37 is a time chart (single capture mode: pattern 1)

The operation in single capture mode will be described. FIGS. 30 to 32 are flowcharts of single capture mode. FIGS. 37 and 38 are timing charts of single capture mode.

As shown in FIG. 37, in the imaging stand-by state of the digital camera 1, a live-view display is given on the camera monitor 120, for example. To perform live-view display, the front curtain 21 and rear curtain 31 both retract from the opening 11a. More specifically, the focal plane shutter device 190 is in the above-mentioned state D (FIGS. 26 and 36C), and the slide lever 50 is mechanically held at the charging completed position by the intermittent cam 42 of the charge gear 40. In this state D, as shown in FIG. 36C, since the drive lever 81 is at the second lever position P2, the front curtain 21 and rear curtain 31 are both retracted from the opening 11a, and the charging of the front curtain 21 and rear curtain 31 is complete, but the front curtain chucking piece is not chucked by the front curtain electromagnet 26, and the rear curtain chucking piece is not chucked by the rear curtain electromagnet 36.

If the release button 131 is pressed in this state D, the camera controller 140 causes the various components to begin imaging operations. More specifically, as shown in FIG. 30, the camera controller 140 sends current to the front curtain electromagnet 26 and the rear curtain electromagnet 36 (steps S1 and S2). As a result, the front curtain chucking piece of the front curtain 21 is chucked to the front curtain electromagnet 26, and the rear curtain chucking piece of the rear curtain 31 is chucked to the rear curtain electromagnet 36.

After current is sent to the front and rear curtain electromagnets, the camera controller 140 rotates the shutter motor 46 forward until it is detected that the first switch SW1 is OFF (steps S3 and S4). As a result, as shown in FIG. 27, the intermittent cam 42 and the cam follower 54 are disconnected, so the front curtain 21 enters a closed state under the elastic force of the front curtain set spring, but the charging state of the front curtain 21 and rear curtain 31 is maintained by the front curtain electromagnet 26 and the rear curtain electromagnet 36. That is, the focal plane shutter device 190 enters a slit imaging stand-by state (a travel preparation completed state).

Figure 28:
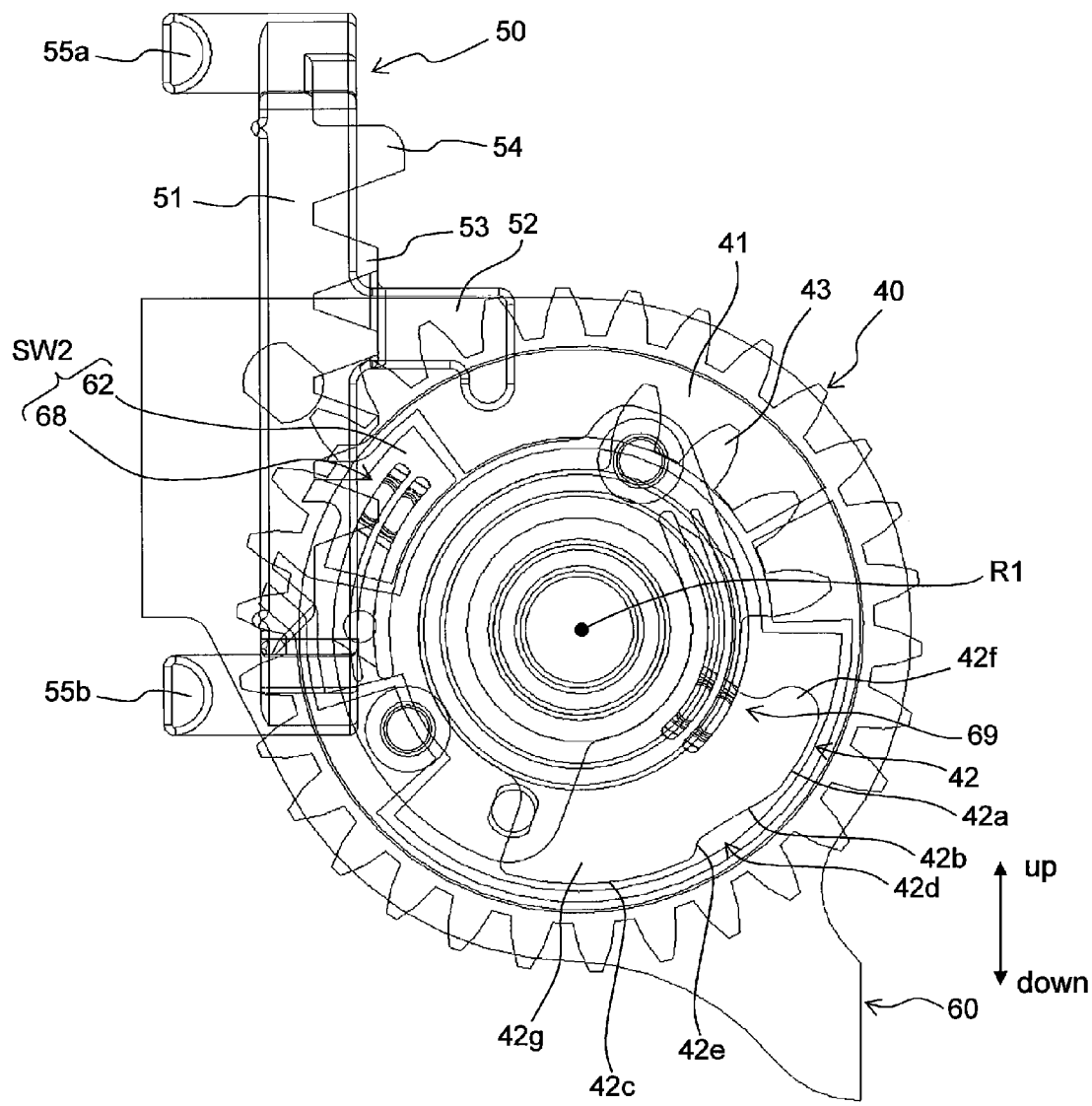
FIG. 28 is a plan view of the charge gear 40 and the slide lever 50 (states E and F)

When the camera controller 140 detects that the first switch SW1 is OFF, the camera controller 140 applies short braking by a specific time of T1 to the shutter motor 46 in order to stop the forward rotation of the shutter motor 46 (steps S4 and S5). As a result, the rotation of the charge gear 40 comes to a halt. The charge gear 40 continues to rotate a little at this point, but the effect of the short braking is that the rotation of the charge gear 40 stops relatively quickly, for example, as shown in FIG. 28 or 29.

Also, when the camera controller 140 detects that the first switch SW1 is OFF, the camera controller 140 moves the front curtain 21 by halting the flow of current to the front curtain electromagnet 26 (step S6). When the flow of current to the front curtain electromagnet 26 stops, the chucking of the front curtain chucking piece 24b is released, and the front curtain travel spring causes the front curtain 21 to travel from its closed position to its open position.

Then, after a specific time set by the user or the camera controller 140 (exposure correspondence time) has elapsed, the camera controller 140 moves the rear curtain 31 by stopping the flow of current to the rear curtain electromagnet 36 (steps S7 and S8). When the flow of current to the rear curtain electromagnet 36 stops, the chucking of the rear curtain chucking piece is released, and the rear curtain travel spring causes the rear curtain 31 to move from its open position to its closed position.

Upon completion of the travel of the rear curtain 31, the system waits a specific length of time for the state of the front curtain 21 and rear curtain 31 to stabilize (step S9). In parallel with this, the camera controller 140 controls the CMOS image sensor 110 so as to begin reading image data (step S10). Simultaneously with the start of reading, the counting of the time T2 is begun in order to determine the drive timing of the shutter motor 46 (step S11).

Also, the camera controller 140 checks whether or not the short braking of the shutter motor 46 is complete (step S12).

If the stopping position of the charge gear 40 is different, however, the timing at which the focal plane shutter device 190 enters its closed state in the subsequent driving of the charge gear 40 by the shutter motor 46 will also be different.

In view of this, upon completion of the short braking of the shutter motor 46, the camera controller 140 adjusts the timing at which charging is started by the shutter motor 46 according to the stopping position of the charge gear 40.

More specifically, upon completion of the short braking of the shutter motor 46, the camera controller 140 detects the stopping position of the charge gear 40 via the position detecting sensor 195. Possible stopping positions for the charge gear 40 here include a position in which the second switch SW2 is ON (a position in which the first brush 68 is in contact with the second contact 62), a position in which the first to third switches SW1 to SW3 are all OFF (a position in which the first brush 68 is in contact with the ground component 65), and a position in which the third switch SW3 is ON (a position in which the first brush 68 is in contact with the first portion 63a of the third contact 63).

Therefore, upon completion of the short braking, the camera controller 140 detects the second switch SW2 and the third switch SW3 (steps S13 and S14).

When the second switch SW2 is ON, the rotation of the charge gear 40 stops relatively quickly, so the time T2 is set to a time T21A that is a little shorter than the preparation time T22A in order to make the timing at which the drive of the shutter motor 46 begins a little sooner (steps S13 and S15). Also, as shown in FIGS. 37 and 38, when the second switch SW2 is OFF and the third switch SW3 is OFF after the end of the short braking of the shutter motor 46, the rotation of the charge gear 40 stops at approximately the predetermined timing, so the time T2 is set to the preparation time T22A (steps S13, S14, and S16). Further, when the second switch SW2 is OFF and the third switch SW3 is ON, the rotation of the charge gear 40 stops relatively slowly, so the time T2 is set to a time T23A that is slightly longer than the preparation time T22A in order to delay slightly the timing at which the drive of the shutter motor 46 begins (steps S13, S14, and S17).

Thus, the camera controller 140 adjusts in stages the timing at which the shutter motor 46 starts charging, according to the stopping position of the charge gear 40, so the timing at which the focal plane shutter device 190 enters its open state, based on the start of reading the image data, is substantially constant. Therefore, the time it takes from the end of reading until the focal plane shutter device 190 enters its open state can be shortened, while the focal plane shutter device 190 can be prevented from entering its open state before the reading is complete.

After the setting of the time T2, the camera controller 140 checks whether or not the time T2 has elapsed (step S18). After the time T2 has elapsed from the start of reading, the camera controller 140 rotates the shutter motor 46 forward and starts the shutter charging operation (step S19). When the shutter motor 46 starts rotating forward, as shown in FIG. 22, the intermittent gear 43 comes into contact with the rack gear 53, and the drive lever 81 begins moving to the second lever position P2.

As shown in FIG. 32, when the camera controller 140 detects that the third switch SW3 is OFF during the forward rotation of the shutter motor 46 (step S20), the camera controller 140 monitors whether or not the third switch SW3 goes back ON prior to the completion of reading of the image data, in order to prevent the rear curtain 31 from opening prior to the reading of the image data. As discussed above, the second time the third switch SW3 goes ON serves as a signal for detecting that the shutter mechanism 191 is in the first state just prior to leaving the closed state.

First, the camera controller 140 confirms the completion of reading the image data from the CMOS image sensor 110 (step S21). If the reading of the image data has not been completed, the camera controller 140 checks that the third switch SW3 is ON (step S22).

If the third switch SW3 is OFF, the camera controller 140 repeats the confirmation of the completion of image data reading and the output of the third switch SW3 (steps S21 and S22). If the third switch SW3 has not changed from OFF to ON, and the image data reading from the CMOS image sensor 110 has been completed, as shown in FIG. 37, the image data reading ends before the shutter mechanism 191 has left its closed state, so the camera controller 140 directly confirms that the first switch SW1 has changed from ON to OFF (steps S21 and S24).

If the first switch SW1 is ON, the camera controller 140 applies short braking to the shutter motor 46 for a specific time of T3 (step S25). As a result, the rotation of the charge gear 40 comes to a halt, the open state of the front curtain 21 and the rear curtain 31 is held by the intermittent cam 42 of the charge gear 40, and the focal plane shutter device 190 enters a normally-open state.

Thus, if the position detecting sensor 195 does not detect that the shutter mechanism 191 is in the first state until the completion of the reading of image data, the camera controller 140 restricts the drive of the shutter mechanism 191 by the shutter motor 46 after the position detecting sensor 195 has detected that the shutter mechanism 191 is in the second state (in which the first switch SW1 is ON) (steps S21, S24, and S25).

After the short braking of the shutter motor 46 has started, the camera controller 140 starts a live-view display on the camera monitor 120 (step S26).

Meanwhile, as shown in FIG. 38, if the third switch SW3 is ON before the completion of the reading of image data, it is possible that the shutter mechanism 191 will leave its closed state before the reading of image data is complete. Therefore, when the third switch SW3 is ON before the reading of image data is complete, the camera controller 140 imposes an early restrict to the drive of the shutter motor 46 before the reading of the image data is complete. More specifically, the camera controller 140 lowers the rotational speed of the charge gear 40 by applying short braking to the shutter motor 46 for the specific time of T3 prior to the completion of the reading of image data (steps S21, S22, and S27). As a result, as shown in FIG. 38, the time it takes for the rear curtain 31 to retract downward from the opening 11*a* is longer than the usual charging time, so the time in which image data is read from the CMOS image sensor 110 can be taken advantage of to prevent the rear curtain 31 from opening and light being incident on the CMOS image sensor 110 during the reading of image data.

Thus, if the position detecting sensor 195 detects that the shutter mechanism 191 is in the first state prior to the completion of the reading of image data, the camera controller 140 controls the shutter motor 46 so as to delay the timing at which the shutter mechanism 191 leaves its closed state (steps S21, S22, and S27).

When short braking is applied to the shutter motor 46, the rotation of the charge gear 40 comes to a halt, and the open state of the front curtain 21 and rear curtain 31 is mechanically held by the intermittent cam 42 of the charge gear 40. Consequently, the focal plane shutter device 190 enters a normally-open state.

After short braking has been applied to the shutter motor 46, the camera controller 140 checks whether the reading of image data is complete. After the reading is complete, the camera controller 140 starts a live-view display on the camera monitor 120 (steps S28 and S26).

8.2: Operation in Continuous Capture Mode

Figure 33:
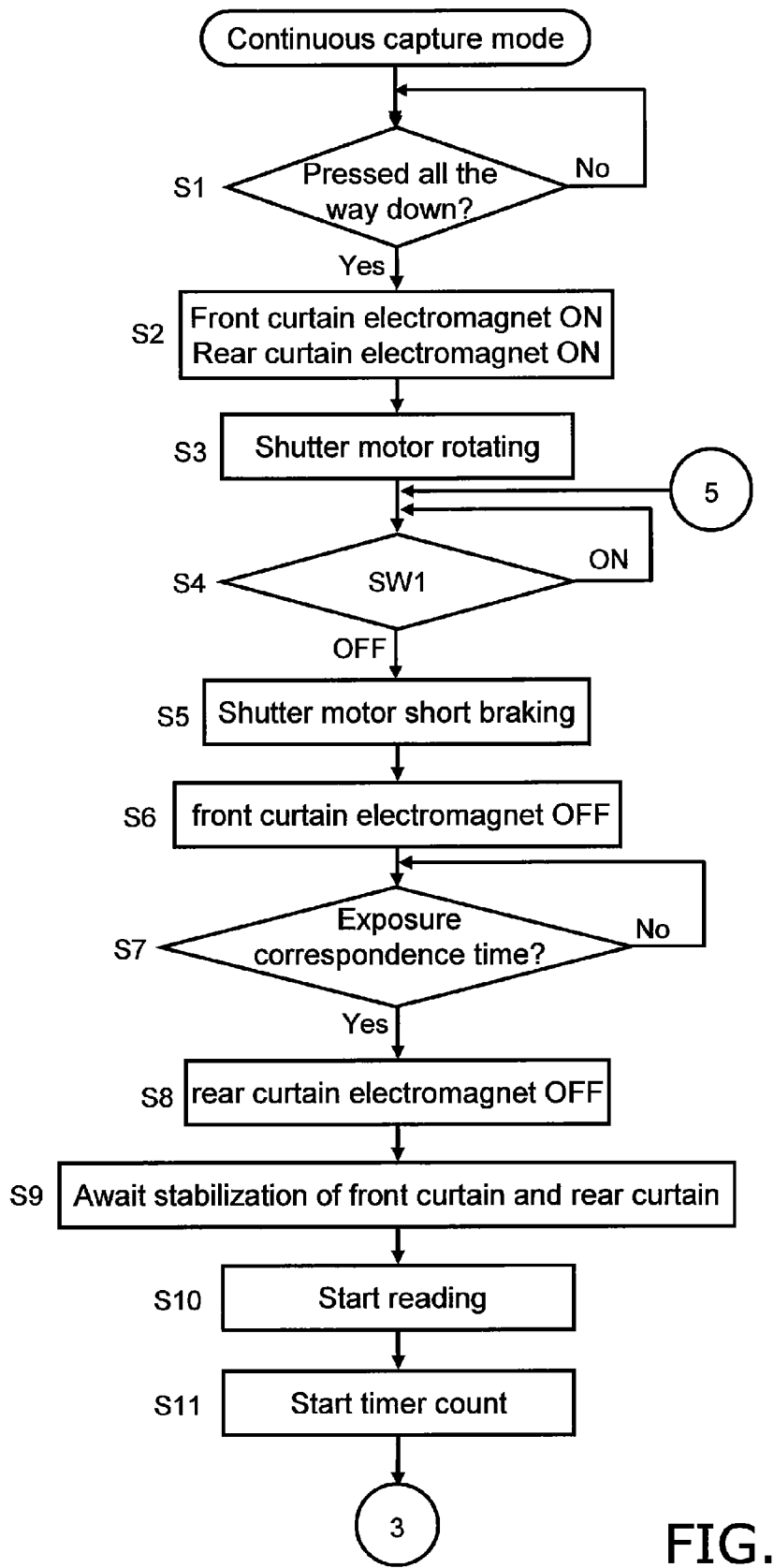
FIG. 33 is a flowchart (continuous capture mode)
Figure 34:
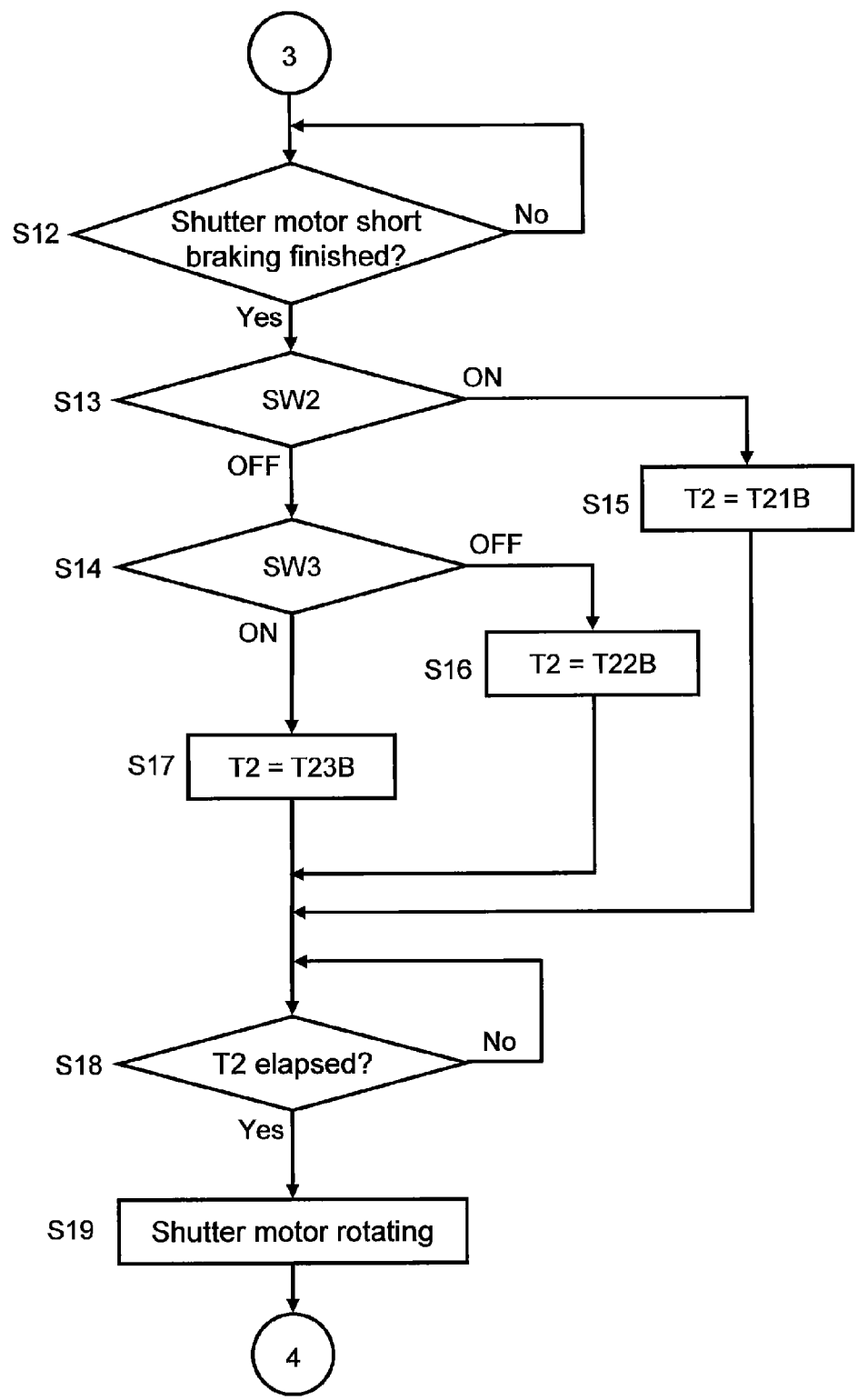
FIG. 34 is a flowchart (continuous capture mode)
Figure 35:
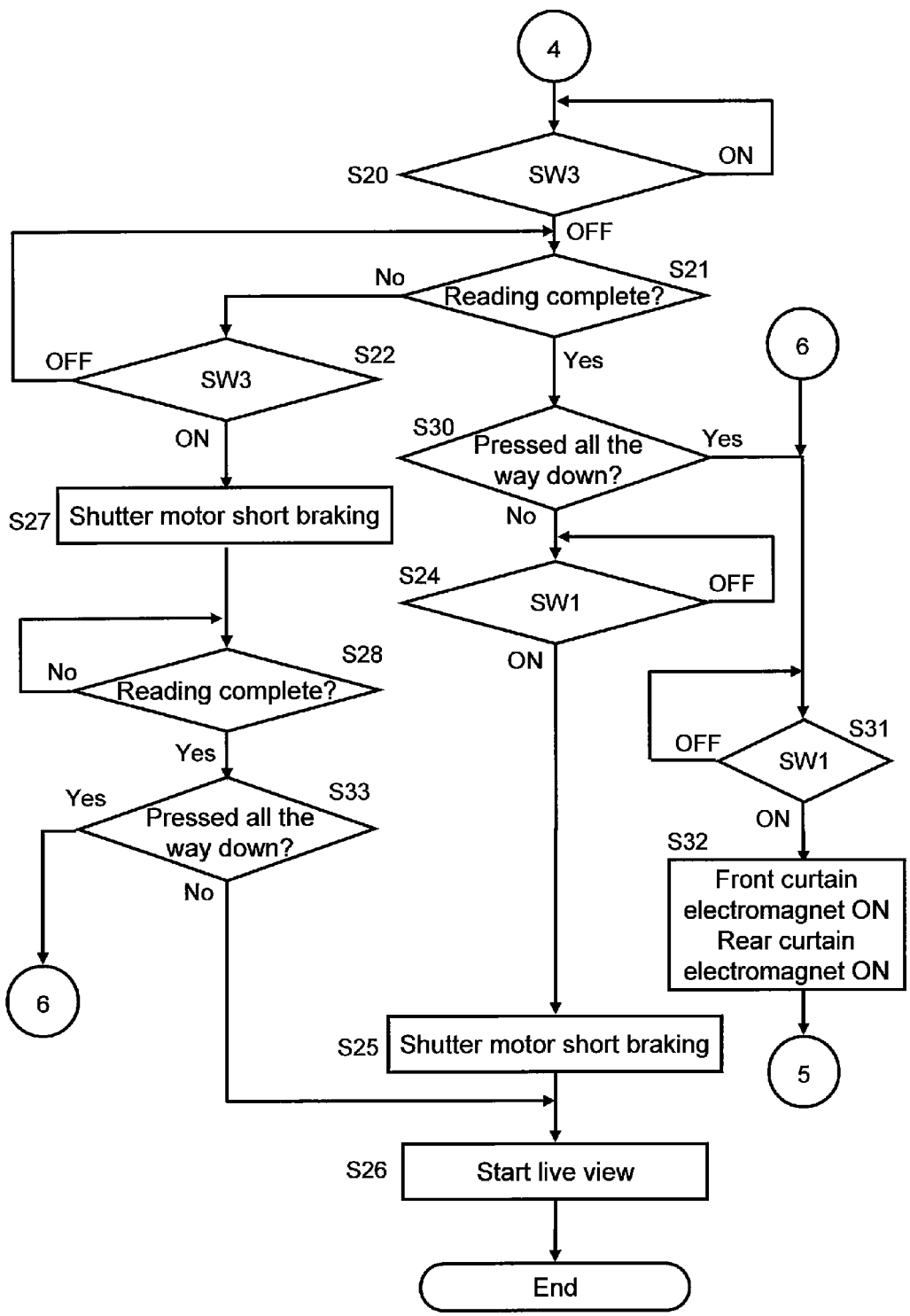
FIG. 35 is a flowchart (continuous capture mode)
Figure 39:
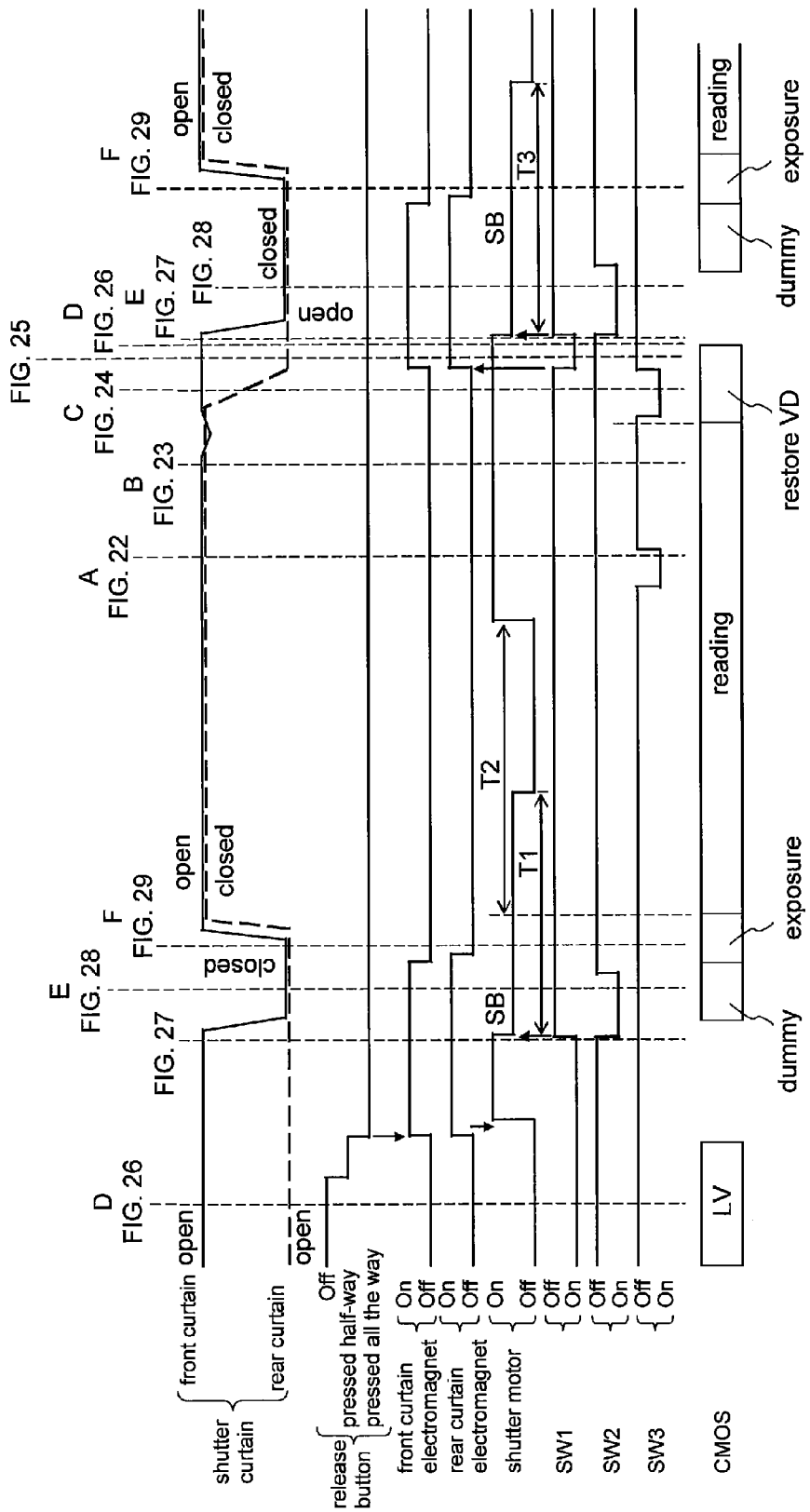
FIG. 39 is a time chart (continuous capture mode: pattern 1)

FIGS. 33 to 35 are flowcharts of continuous capture mode. FIGS. 39 and 40 are timing charts of continuous capture mode.

In continuous capture mode, the basic operation of the digital camera 1 is the same as that in single capture mode, but the processing after confirming the completion of the reading of image data is slightly different. More specifically, as shown in FIG. 35, if the reading of image data is complete in step S21, the camera controller 140 confirms the state of the release button 131 (step S30). If the release button 131 has been pushed all the way down, the camera controller 140 determines that continuous capture mode has been selected, and continues with the next imaging operation. More specifically, in step S30, if the release button 131 has been pushed all the way down, the camera controller 140 checks whether the first switch SW1 is ON (step S31). If the first switch SW1 is ON, current is sent to the front curtain electromagnet 26 and the rear curtain electromagnet 36 (step S32), and the front curtain chucking piece and the rear curtain chucking piece are chucked to the front curtain electromagnet 26 and the rear curtain electromagnet 36, respectively. After this, the processing returns to step S4 in FIG. 33, and the processing from step S4 on is executed. If the release button 131 is held all the way down, the processing from step S4 on (the processing shown in FIGS. 33 to 35) is repeated.

Meanwhile, if the release button 131 is not pushed all the way down in step S30, the camera controller 140 determines that continuous capture has been completed, and determines whether or not the first switch SW1 is ON (step S24). If the first switch SW1 is ON, short braking is applied for the specific time of T3 to the shutter motor 46 (steps S24 and S25). As a result, the rotation of the charge gear 40 comes to a halt, the open state of the front curtain 21 and the rear curtain 31 is mechanically held by the intermittent cam 42 of the charge gear 40, and the focal plane shutter device 190 enters a normally-open state. Just as in single capture mode, after the start of short braking of the shutter motor 46, the camera controller 140 starts a live-view display on the camera monitor 120 (step S26).

Also, if the reading of image data is complete in steps S21, S22, and S27, just as in step S30, the camera controller 140 checks the state of the release button 131 (step S33). If the release button 131 has been pushed all the way down, the camera controller 140 determines that continuous capture mode has been selected, the processing of steps S31 and S32 is executed, and then the processing from step S4 is executed. If the release button 131 is held all the way down, the processing from step S4 on is repeated.

Meanwhile, if the release button 131 is not pushed all the way down in step S30, the camera controller 140 starts a live-view display on the camera monitor 120 (step S26), just as in single capture mode.

Furthermore, in continuous capture mode, the basic operation of the digital camera 1 is the same as that in single capture mode, but the time T2 is set longer than in single capture mode. More specifically, as shown in FIG. 34, if the second switch SW2 is ON in step S13, the rotation of the charge gear 40 stops relatively soon, so the time T2 is set to be a little shorter than the preparation time T22B in continuous capture mode in order to make the timing at which the next drive of the shutter motor 46 begins a little sooner (steps S13 and S15).

Also, when the second switch SW2 is OFF and the third switch SW3 is OFF after the end of the short braking of the shutter motor 46, the rotation of the charge gear 40 stops at approximately the predetermined timing, so the time T2 is set to the preparation time T22B (steps S13, S14, and S16).

Further, when the second switch SW2 is OFF and the third switch SW3 is ON, the rotation of the charge gear 40 stops relatively slowly, so the time T2 is set to the time T23B that is slightly longer than the preparation time T22B in order to delay slightly the timing at which the drive of the shutter motor 46 begins (steps S13, S14, and S17).

Here, the time T21B in continuous capture mode is longer than the time T21A in single capture mode, and the time T22B in continuous capture mode is longer than the time T22A in single capture mode. Furthermore, the time T23B in continuous capture mode is longer than the time T23A in single capture mode. Therefore, when the charge gear 40 stops in the same position, the time T2 will be set longer in continuous capture mode than in single capture mode.

Thus, even in continuous capture mode, the camera controller 140 adjusts in stages the timing at which the drive of the shutter motor 46 begins, according to the stopping position of the charge gear 40, so the timing at which the focal plane shutter device 190 enters its open state, based on the start of reading the image data, is substantially constant.

Therefore, the time it takes from the end of reading until the focal plane shutter device 190 enters its open state can be shortened, while the focal plane shutter device 190 can be prevented from entering its closed state before the reading is complete.

Also, since the time T2 is set longer in continuous capture mode than in single capture mode, the focal plane shutter device 190 can be effectively prevented from leaving its closed state before reading is complete in continuous capture mode, in which the charge gear 40 tends to rotate more.

FIG. 39 is a time chart during normal operation when the third switch SW3 is ON after the completion of reading of image data, and FIG. 40 is a time chart during abnormal operation when it is detected that the third switch SW3 goes ON before the completion of image data reading. In the time chart shown in FIG. 40, just as with the time chart shown in FIG. 38, the timing at which the shutter mechanism 191 leaves its closed state is later, so the focal plane shutter device 190 can be prevented from leaving its closed state before the completion of reading.

9: Features of Digital Camera 1

As described above, with the digital camera 1, the timing at which the shutter motor 46 starts charging is controlled by the camera controller 140 on the basis of the position of the charge gear 40 detected by the position detecting sensor 195, so even if the stopping position of the charge gear 40 should fluctuate for some reason, the timing at which the shutter mechanism 191 leaves its closed state after the completion of charging will tend to be stable. Therefore, even if the time from the completion of image data reading until the shutter mechanism leaves its closed state is set shorter, the shutter mechanism 191 can be prevented from leaving its closed state prior the completion of the reading of the image data.

Thus, with the digital camera 1, the reading of image data can be kept stable while the imaging interval is shortened.

OTHER EMBODIMENTS

The present invention is not limited to the embodiment given above, and various modifications are possible without departing from the gist of the present invention.

(1) In the above embodiment, an imaging device was described by using the interchangeable lens type of digital camera 1 and camera body 100 as an example, but the imaging device is not limited to being the digital camera 1 and the camera body 100. For example, the imaging device can be an integrated type of camera in which a lens unit is fixed to a camera body.

(2) In the above embodiment, an imaging element was described by using the CMOS image sensor 110 as an example, but the imaging element is not limited to being the CMOS image sensor 110. For example, the imaging element can be a CCD (charge coupled device) image sensor or other such device that can produce image data for a subject by opto-electrical conversion.

(3) In the above embodiment, a position detector was described by using the position detecting sensor 195 as an example, but the position detector is not limited to being the position detecting sensor 195. For example, the position detector can have any configuration so long as it can detect a state immediately prior to when the shutter mechanism 191 leaves its closed state. For example, the position detecting sensor 195 detects the state of the shutter mechanism 191 by detecting the position of the charge gear 40 in the rotational direction, but a sensor can be provided for detecting the position of the first gear 49, the second gear 48, or the third gear 47 in the rotational direction, or the position of the slide lever 50 in the up and down direction. Further, a sensor such as an encoder can be provided to the shutter motor 46.

(4) In the above embodiment, a shutter drive device was described by using the shutter drive device 194 as an example, but the shutter drive device is not limited to being the shutter drive device 194. For example, the shutter drive device can have any configuration that can drive the drive lever 81 of the shutter mechanism 191. The shutter drive device 194 has the first gear 49, the second gear 48, and the third gear 47, but these members can be omitted, and conversely the shutter drive device 194 can have other members.

Also, for example, the recess 42*d* is formed in the intermittent cam 42 for generating rotational resistance, but the intermittent cam 42 need not have the recess 42*d*.

(5) In the above embodiment, a drive controller was described by using the camera controller 140 as an example, but the drive controller is not limited to being the camera controller 140. For example, the above-mentioned control need not be performed by the camera controller 140.

For instance, in the above embodiment, the camera controller 140 adjusts the time from the start of reading the image data from the CMOS image sensor 110 until the start of the drive of the shutter motor 46 on the basis of the stopping position of the charge gear 40 detected by the position detecting sensor 195. However, as long as the camera controller 140 controls the timing at which the charging of the focal plane shutter device 190 begins on the basis of the stopping position detected by the position detecting sensor 195, the exact control is not limited that that in the above embodiment.

Also, in the above embodiment, the camera controller 140 adjusts the length of time T2 in three stages on the basis of three stopping positions, namely, a first stopping position, a second stopping position, and a third stopping position, but the camera controller 140 need only adjust the time T2 in at least two stages. In this case, the stopping position of the charge gear 40 need only be detected at two or more places.

Also, the camera controller 140 can adjust the length of the time T2 in four or more stages. In this case, the stopping position of the charge gear 40 can be detected at four or more places.

Furthermore, it is also possible for the camera controller 140 to adjust the time T2 continuously. In this case, the stopping position of the charge gear 40 will be detected continuously.

(6) In the above embodiment, the time T2 in continuous capture mode is set to be longer overall than the time T2 in single capture mode, but the time T2 can be the same in both single capture mode and continuous capture mode. For example, the times T21B, T22B, and T23B can be the same as the times T21A, T22A, and T23A, respectively. Also, one or two of the times T21B, T22B, and T23B can be the same as one or two of the times T21A, T22A, and T23A, respectively.

Another possible way to set the time T2 in continuous capture mode to be longer overall than the time T2 in single capture mode is to calculate the stand-by time in continuous capture mode by adding a specific adjustment time to the time T2 in single capture mode. For instance, this adjustment time can be stored ahead of time in the camera controller 140, or it can be adjusted by using feedback according to the operating state of the focal plane shutter device 190. More specifically, the camera controller 140 can pre-store the stopping position and frequency of the charge gear 40 in single capture mode and continuous capture mode as data, and adjust the length of the adjustment time on the basis of this past data.

(7) In the above embodiment, the camera controller 140 delays the timing at which the shutter mechanism 191 leaves its closed state by applying short braking to the shutter motor 46, but the digital camera 1 need not have this function.

Also, the method for limiting the drive of the shutter motor 46 is not limited to or by the above embodiment. For example, another method can be used in which the drive of the shutter motor 46 is limited by applying electrical braking such as regeneration brake or reverse rotation to the shutter motor 46.

Further, it is possible to delay the timing at which the shutter mechanism 191 leaves its closed state by another method, such as applying braking mechanically to another mechanism of the shutter drive device 194, without limiting the drive of the shutter motor 46.

(8) In the above embodiment, an actuator was described by using the shutter motor 46 as an example, but the actuator is not limited to being a DC motor such as the shutter motor 46. For example, the actuator can be another type of motor such as a stepping motor, or an electromagnetic actuator made up of a coil and a magnet, or a piezoelectric actuator that has a piezoelectric element.

(9) In the above embodiment, a transmission member was described by using the charge gear 40 as an example, but the transmission member is not limited to being the charge gear 40. For example, the intermittent cam 42 has the recess 42*d* in order to impart rotational resistance to the charge gear 40, but the charge gear 40 need not have the recess 42*d*.

Figure 41:
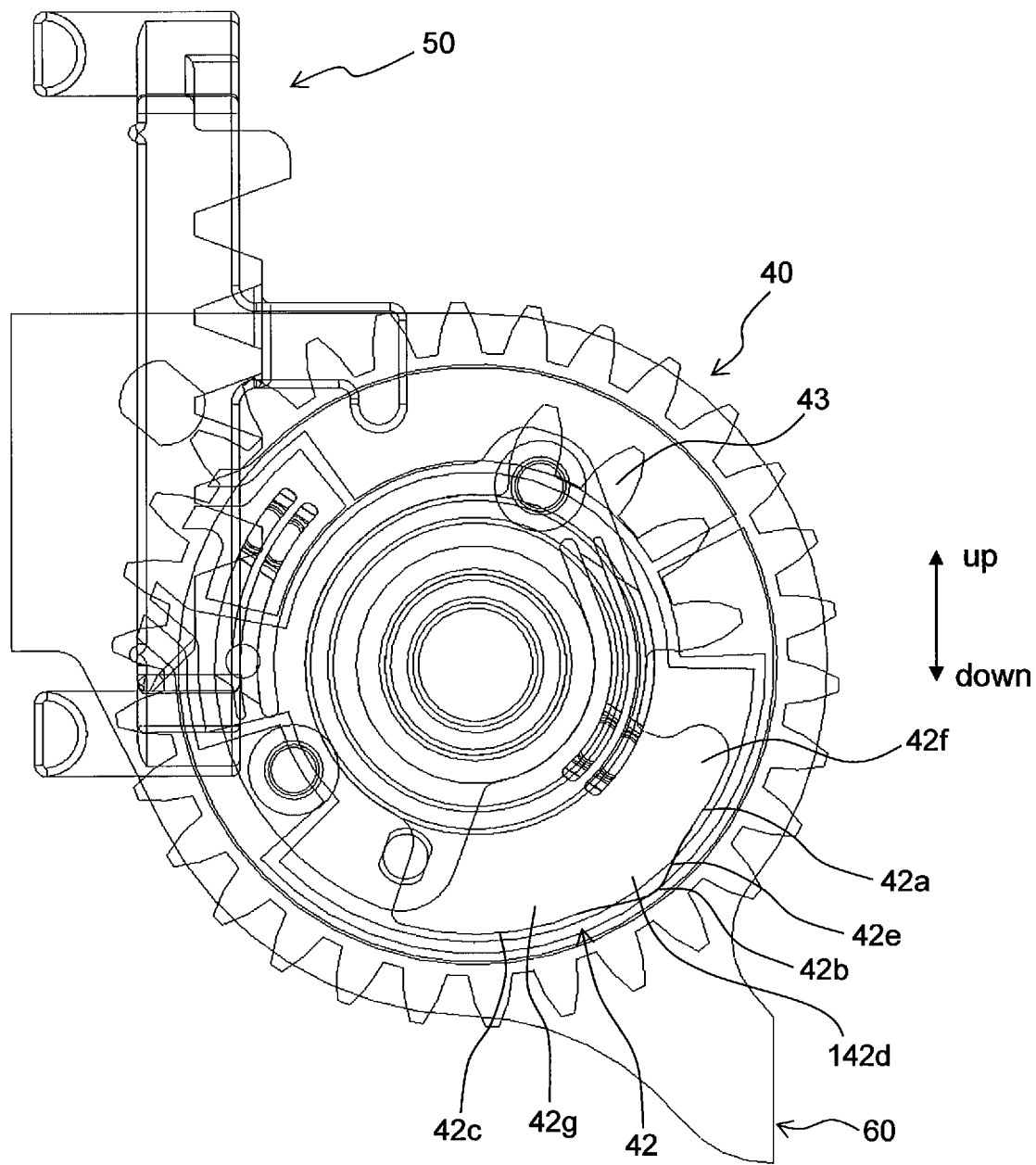
FIG. 41 is a plan view of the charge gear 40 and the slide lever 50 (other embodiment)

Also, the recess 42*d* need not be what forms the second sliding face 42*b*. For example, as shown in FIG. 41, the second sliding face 42*b* can be formed by a protrusion 142*d*. In this case, the second sliding face 42*b* constitutes the outer face of the protrusion 142*d*, and the guide face 42*e* is on the first sliding face 42*a* side of the protrusion 142*d*.

Figure 42:
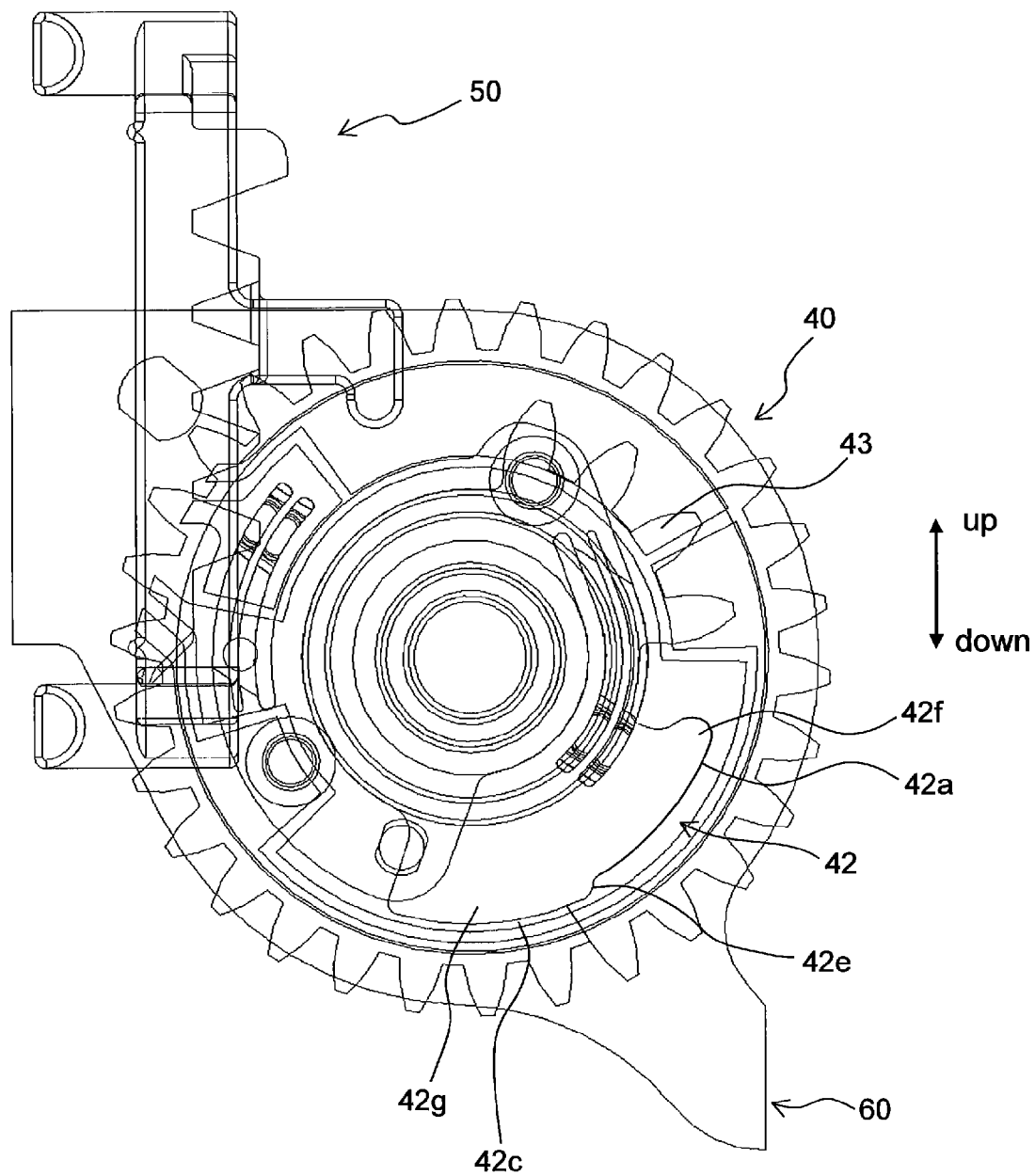
FIG. 42 is a plan view of the charge gear 40 and the slide lever 50 (other embodiment).

Furthermore, the first sliding face 42*a* is disposed in the same radial direction position as the third sliding face 42*c*, but the first sliding face 42*a* can be disposed in a different radial direction position from that of the third sliding face 42*c*. For example, the first sliding face 42*a* can be disposed more to the inner peripheral side than the third sliding face 42*c*. In this case, the shape of the intermittent cam 42 is as shown in FIG. 42, for example.

GENERAL INTERPREATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention, should be interpreted relative to the imaging device.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An imaging device comprising:
   an imaging element configured to produce image data of a subject by opto-electrical conversion;
   a shutter mechanism switchable between an open state and a closed state, in the open state light is incident on the imaging element and in the closed state light that would have been incident on the imaging element is blocked;
   an actuator configured to produce and store a driving force to drive the shutter mechanism;
   a rotatable transmission member configured to transmit the driving force to the shutter mechanism;
   a position detector configured to detect the position of the transmission member in the direction of rotation; and
   a drive controller configured to direct the actuator to begin storing the driving force to drive the shutter mechanism while the image data is being read from the imaging element and to control the timing at which the actuator begins driving the shutter mechanism based on the position of the transmission member detected by the position detector, the drive controller being further configured to switch the shutter mechanism from the closed state to the open state after the actuator has stopped storing the driving force to drive the shutter mechanism.

2. The imaging device according to claim 1, wherein the drive controller is configured to control the timing at which the actuator begins driving the shutter mechanism based on the position of the transmission member before the shutter mechanism is driven by the actuator.

3. The imaging device according to claim 1, wherein the drive controller is configured to direct the actuator to begin storing the driving force to drive the shutter mechanism after a specific stand-by time has elapsed, the stand-by time starts once the image data has been read from the imaging element.

4. The imaging device according to claim 3, wherein the drive controller is configured to adjust the stand-by time based on the position of the transmission member detected by the position detector.

5. The imaging device according to claim 3, wherein
the drive controller is configured to set the stand-by time to a first time and a second time, the first time corresponding to when the position detector has detected that the transmission member has stopped at a first position in the rotational direction, and the second time corresponding to when the position detector has detected that the transmission member has stopped at a second position in the rotational direction.

6. The imaging device according to claim 5, wherein
the drive controller is configured to set the stand-by time to a third time that corresponds to when the position detector has detected that the transmission member has stopped at a third position in the rotational direction.

7. The imaging device according to claim 3, wherein
the imaging device is configured to operate in a continuous capture mode and a single capture mode, in the continuous capture mode a plurality of sets of image data are acquired continuously, and in the single capture mode a single set of image data is acquired, the drive controller is configured to set the stand-by time to be longer in the continuous capture mode than the stand-by time in the single capture mode.

8. The imaging device according to claim 7, wherein
the drive controller is configured to set the stand-by time to a first single capture stand-by time and a first continuous capture stand-by time which is longer than the first single capture stand-by time, the first single capture stand-by time corresponds to the time when the position detector has detected that the transmission member has stopped at a first position in the rotational direction while the imaging device is in the single capture mode, and the first continuous capture stand-by time corresponds to the time when the position detector has detected that the transmission member has stopped at a first position in the rotational direction while the imaging device is in the continuous capture mode.

9. The imaging device according to claim 8, wherein
the drive controller is configured to set the stand-by time to a second single capture stand-by time and a second continuous capture stand-by time which is longer than the second single capture stand-by time, the second single capture stand-by time corresponds to the time when the position detector has detected that the transmission member has stopped at a second position in the rotational direction while the imaging device is in the single capture mode, and the second continuous capture stand-by time corresponds to the time when the position detector has detected that the transmission member has stopped at a second position in the rotational direction while the imaging device is in the continuous capture mode.

10. The imaging device according to claim 9, wherein
the drive controller is configured to set the stand-by time to be a third single capture stand-by time and a third continuous capture stand-by time which is longer than the third single capture stand-by time, the third single capture stand-by time corresponds to the time when the position detector has detected that the transmission member has stopped at a third position in the rotational direction while the imaging device is in the single capture mode, and the third continuous capture stand-by time corresponds to the time when the position detector has detected that the transmission member has stopped at a third position in the rotational direction while the imaging device is in the continuous capture mode.

11. The imaging device according to claim 1, wherein
the transmission member is rotatably driven by the actuator.

12. The imaging device according to claim 1, wherein
the transmission member is configured to keep the shutter mechanism in the open state even when no power is being supplied to the actuator.

* * * * *